(12) United States Patent
Gorniak et al.

(10) Patent No.: US 6,502,686 B2
(45) Date of Patent: Jan. 7, 2003

(54) POWERED CONVEYOR SYSTEM

(75) Inventors: Theodore S. Gorniak, North East, PA (US); John H. Zelina, Jr., North East, PA (US)

(73) Assignee: Ridg-U-Rak, Inc., North East, PA (US)

(*) Notice: Subject to any disclaimer, the term of this patent is extended or adjusted under 35 U.S.C. 154(b) by 2 days.

(21) Appl. No.: 09/810,362

(22) Filed: Jul. 23, 2001

(65) Prior Publication Data

US 2002/0066641 A1 Jun. 6, 2002

Related U.S. Application Data

(62) Division of application No. 09/322,433, filed on May 28, 1999, now Pat. No. 6,286,654.
(60) Provisional application No. 60/118,868, filed on Feb. 5, 1999, and provisional application No. 60/087,243, filed on May 29, 1998.

(51) Int. Cl.$^7$ .............................................. B65G 37/00
(52) U.S. Cl. .................................................... 198/347.4
(58) Field of Search ........................... 198/347.1, 347.4, 198/575, 576

(56) References Cited

PUBLICATIONS

Brochure—Load Bank II—Conveyor Logic, Inc., Dulton, MI 3 pgs.
Brochure—Speedways Transporters—Speedways, Buffalo, NY 12/77 6 pgs.
Brochure—Pallet Live Storage—Speedways Conveyors, Inc., Buffalo, NY 7/81 6 pgs.
Catalog—Power Conveyors—Speedways Conveyors, Inc., Buffalo, NY 14 pgs.
Catalog—Q50—Speedways Conveyors, Inc., Buffalo, NY 4 pgs.
Catalog—Gravity Wheel & Roller Conveyors—Speedways Conveyors, Inc., Buffalo, NY 12 pgs.

*Primary Examiner*—James R. Bidwell
(74) *Attorney, Agent, or Firm*—Edward W. Goebel, Jr., Esq.; Macdonald, Illig, Jones & Britton LLP

(57) ABSTRACT

A conveyor system has a load support structure which enables loads to be moved along the conveyor. The load support structure has an input position at which loads can be placed into the conveyor system, an unload position at which loads can be removed from the conveyor system and a load storage area located between the input position and the unload position. The conveyor system also includes a plurality of sensors including an input sensor which senses when a load is at the input position, an unload sensor which senses when a load is at the unload position, and a filled sensor which determines when a pre-selected portion of the load structure has been filled with loads. A propulsion system moves loads along the load support structure. One such propulsion system includes a tram which reciprocates along the load support system. A control system responds to the sensors to cause the propulsion system to move one or more loads to the unload position whenever the unload position is empty. It also causes the propulsion system to move a load from the input position to the storage area when the unload position is full, until such time as the filled sensor determines the pre-selected portion of the conveyor support structure has been filled.

14 Claims, 28 Drawing Sheets

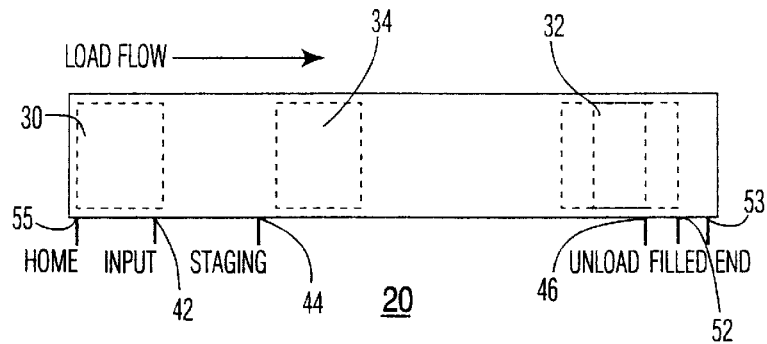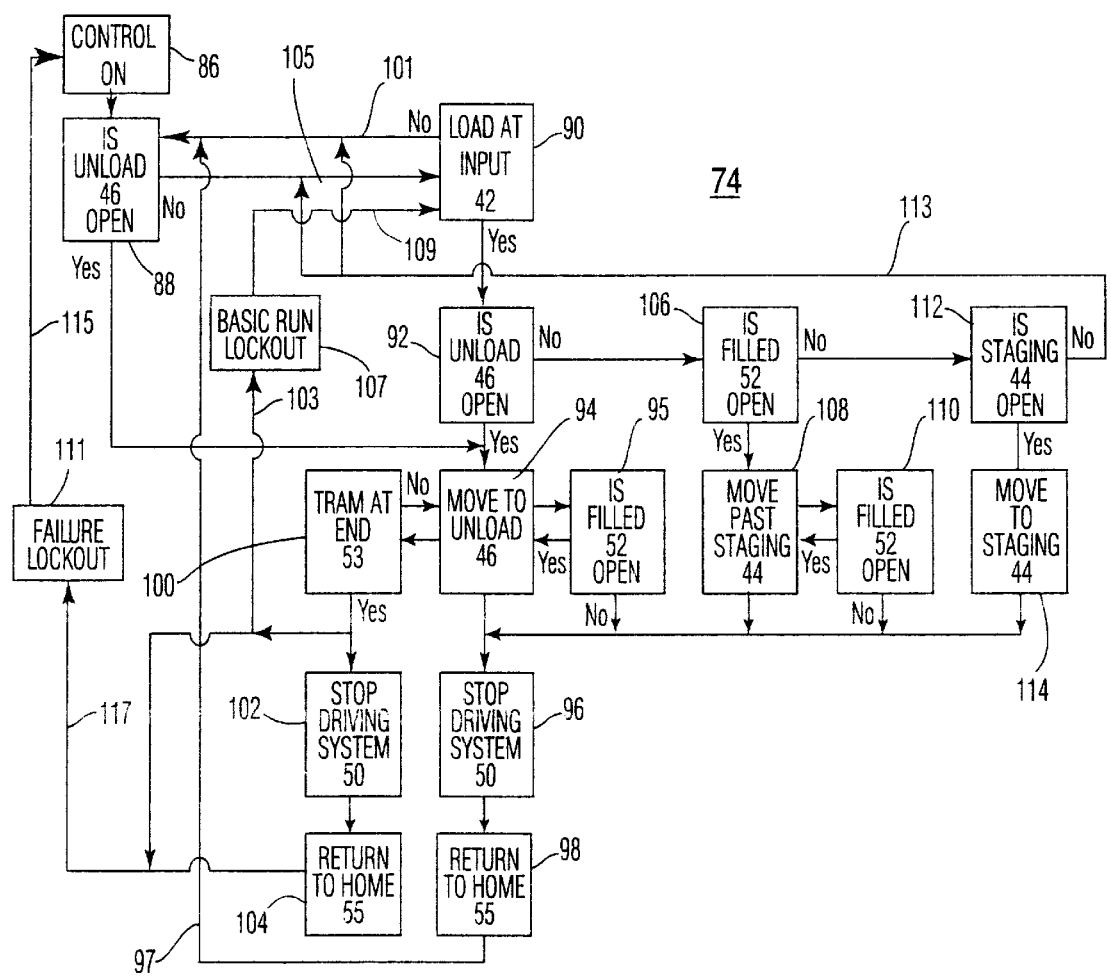
Fig.2

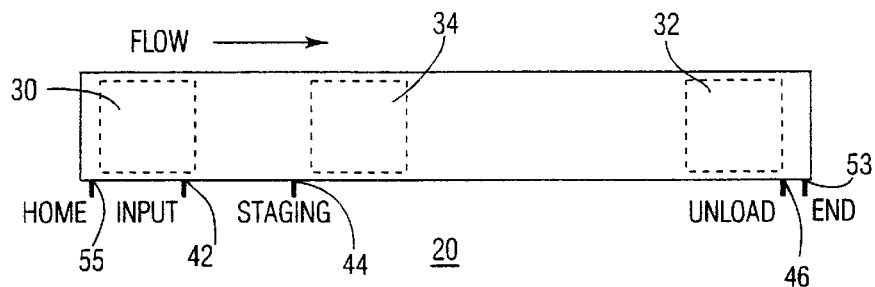
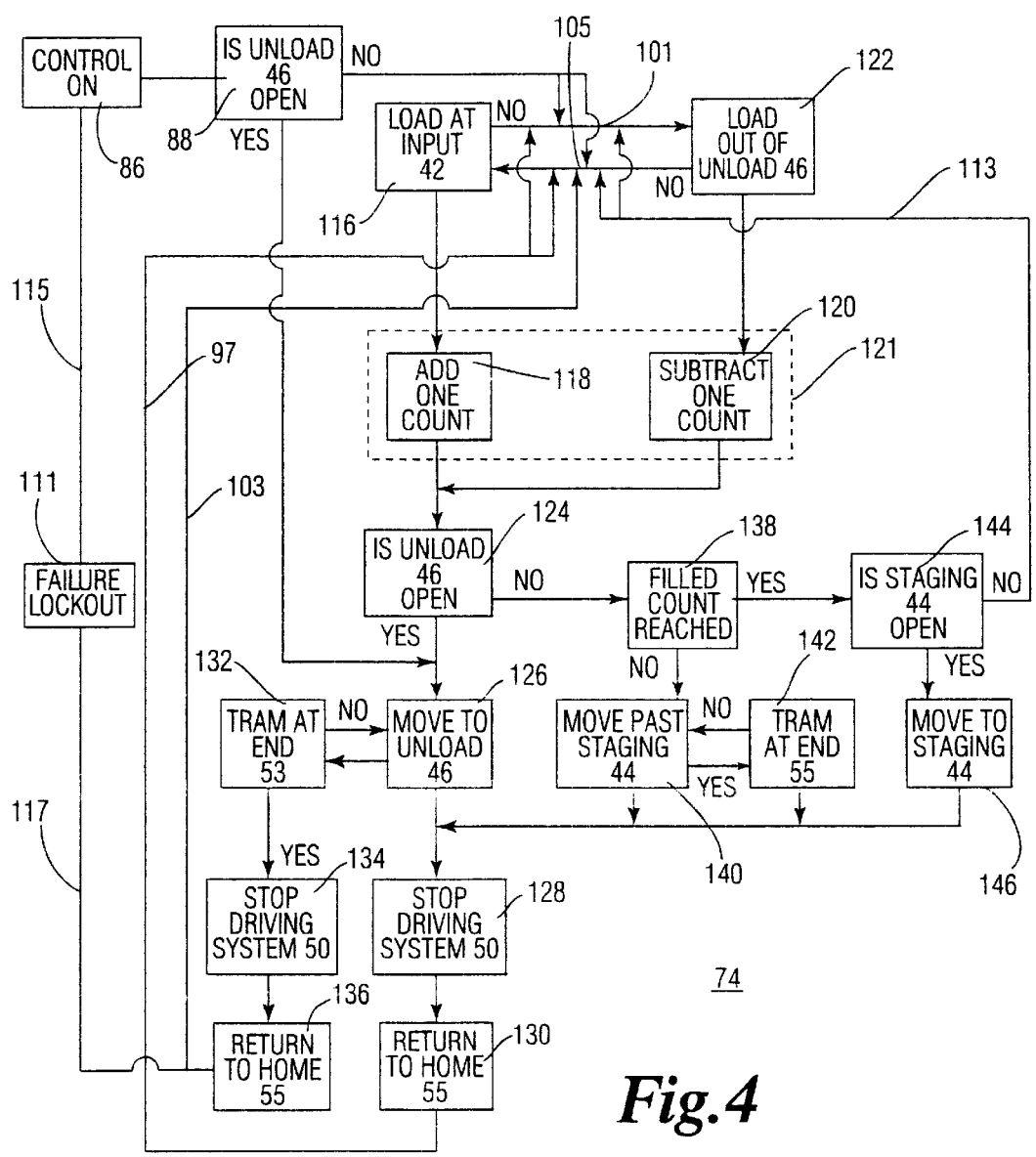
Fig.4

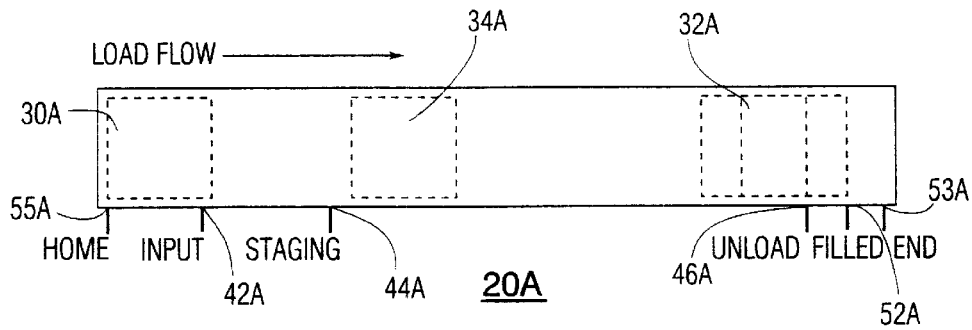
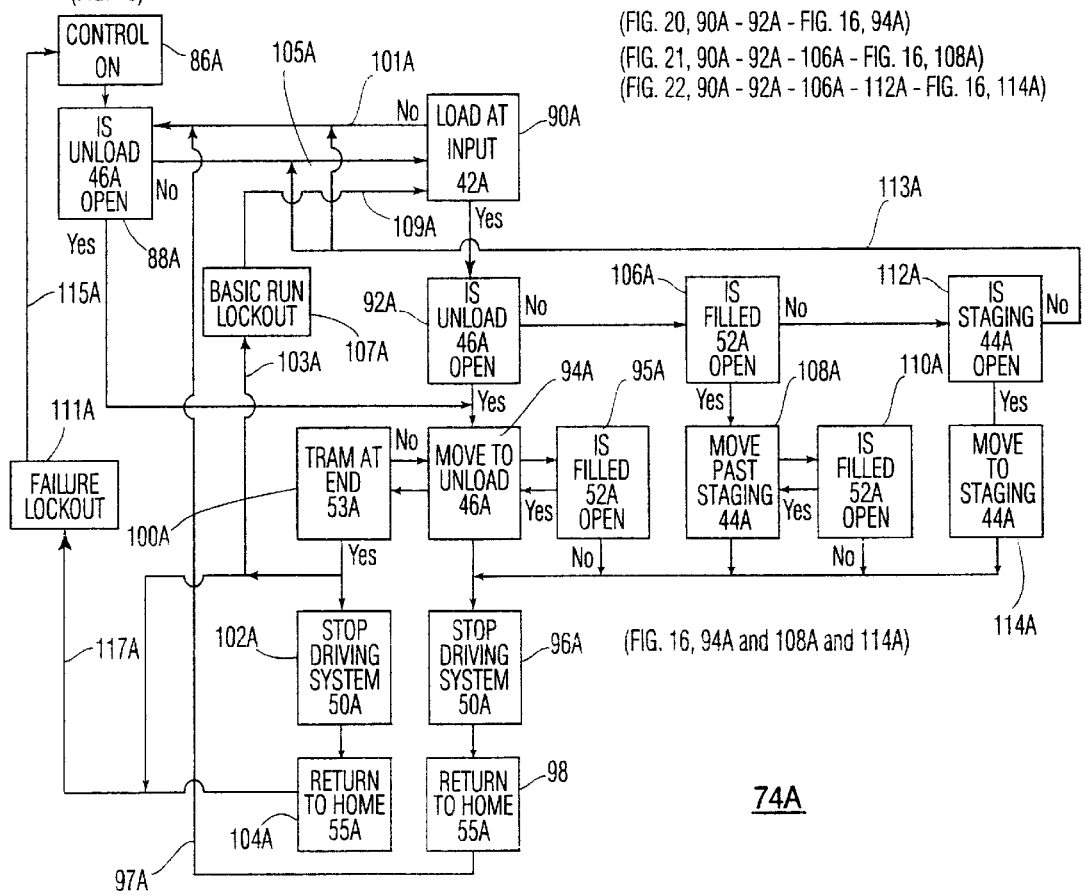
Fig.6A

MOVE TRAM FORWARD

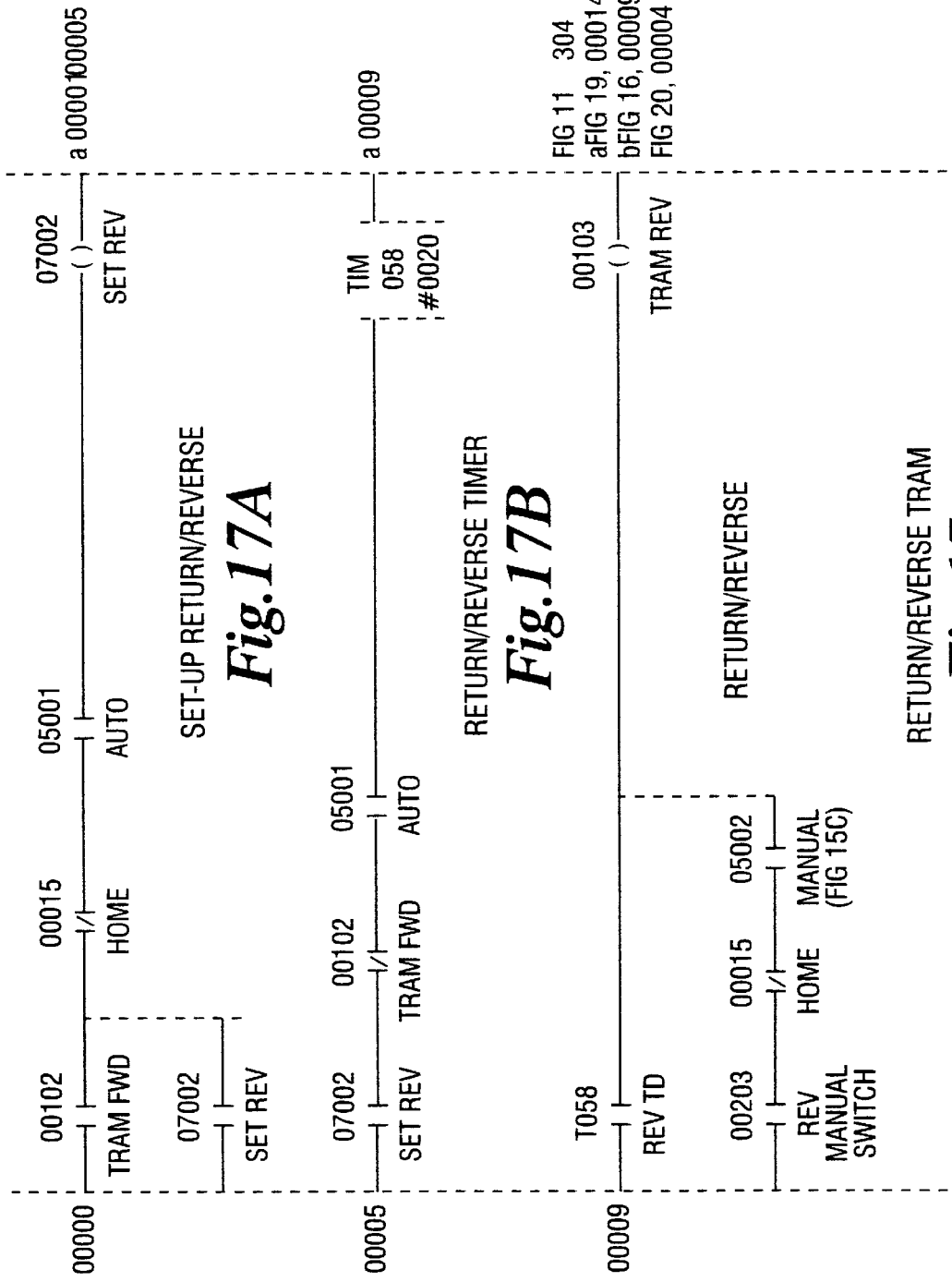

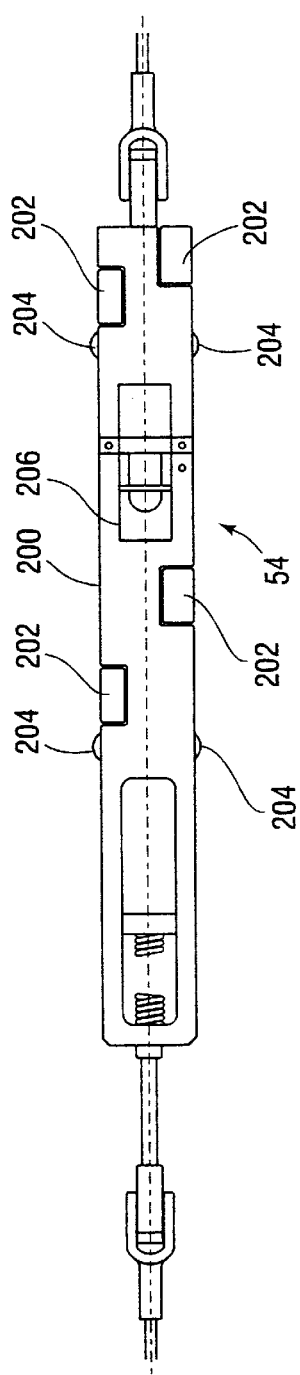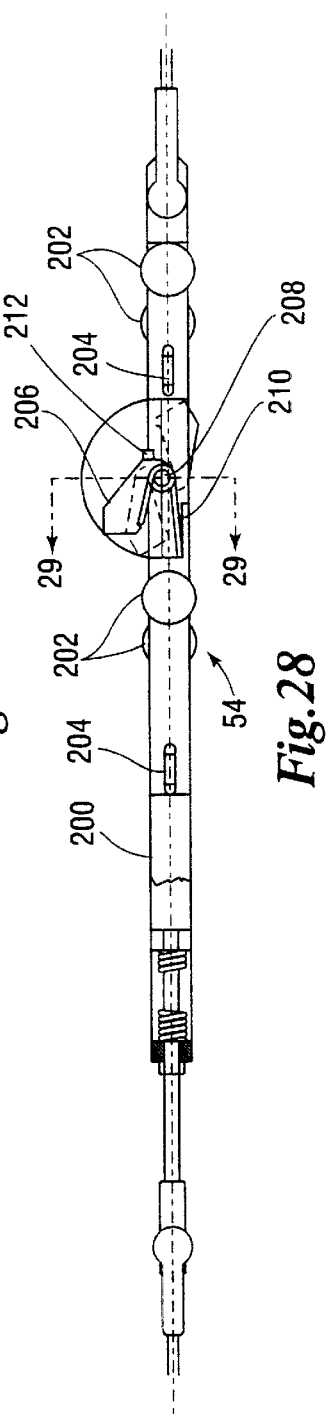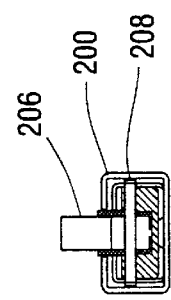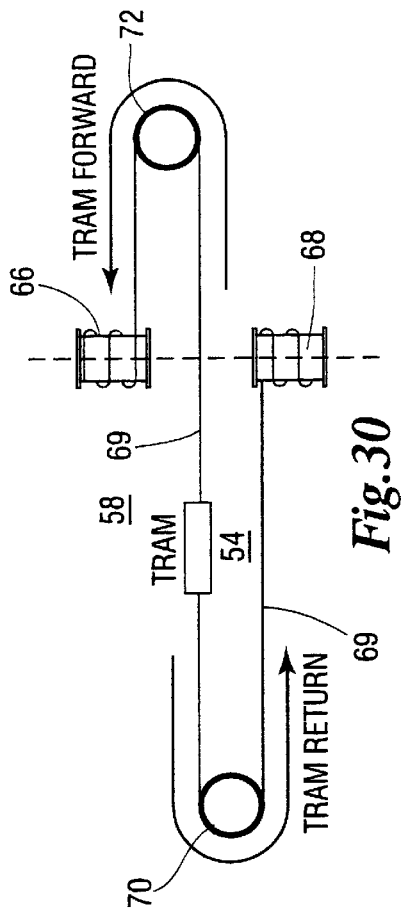
Fig.27
Fig.28
Fig.29
Fig.30

POWERED CONVEYOR SYSTEM

This application is a division of a patent application Ser. No. 09/322,433 filed on May 28, 1999 by the present inventors and entitled Powered Conveyor System which is incorporated herein by reference, Pat. No. 6,286,654.

BACKGROUND OF THE INVENTION

This invention relates to a powered conveyor system for moving loads from an input position to an unload position on the conveyor, and more particularly, to a powered conveyor system which can be used as a storage rack for high density storage of a number of loads between the input position and the unload position of the conveyor.

In the material handling industry items which are to be moved and stored are normally mounted on pallets. Generally speaking, there are two common and widely used types of systems for moving pallets with a positive, forward motion: gravity flow systems and powered conveyor systems. There are many, different designs of both types of systems used for commercial and industrial purposes.

Gravity flow systems are most commonly used because they are more easily adapted to end users' needs, are reliable first-in, first-out, or FIFO, high density storage systems and are considerably more inexpensive than powered conveyor systems. Gravity flow systems must be inclined to allow pallets loaded on them to flow forward on wheels or rollers or on other low friction supports for the pallets. The slope of the incline for each system is usually between 5/16ths of an inch per foot of horizontal run and as much as 1 inch per foot of horizontal run.

Gravity flow systems have several problems. Among the most significant is the need to balance the slope required to allow enough break away momentum for the range of anticipated loads, with the need to keep the loaded pallets flowing at a controlled, safe speed. Most manufacturers of gravity flow systems recommend that the loads be kept as uniform as possible and that the weight of the lightest load should be no less than about half the weight of the heaviest load. If the range of load weights becomes too great, the greater incline necessary to move lighter loads causes heavier loads to travel much faster. This increases the risk that heavier loaded pallets will travel at an unsafe speed and will be involved in accidents, causing damage and/or injury.

Another problem faced by gravity flow systems is the height required at their input ends due to the slope of the system. The longer the run of a system, the higher the input end must be to allow for the required slope. For example, a gravity flow system designed to store 12 loaded pallets which are each 4 feet deep requires about 50 feet of horizontal run. If the slope of the incline is ½ inch per horizontal foot, then the input end must be 25 inches higher than the unload end of the system. As a result, the end user may be limited in height with respect to the number of rows of storage which can be stacked vertically using a gravity flow conveyor.

Other problems with gravity flow systems include a high line stack weight of each system, that is the amount of force being applied to the pallet first in line to be removed due to weight of the loads on the pallets behind it. As the line stack weight becomes greater it decreases the safety of personnel who free pallets that hang up in the system. Additionally, gravity flow system performance depends greatly on the type and physical conditions of pallets being used. Pallets may be made from a variety of materials such as wood, metals, and various plastics. Each type of pallet material presents its own unique problems with regard to the ability of pallets to flow on a gravity flow conveyor system. The physical condition of the pallets being used may also cause additional problems. Powered conveyor systems are often used to avoid these problems.

Powered conveyor systems are more reliable but not as flexible as gravity flow systems. Because powered conveyor systems are powered by motors and the speed of pallets or other loads on these systems can be controlled more easily, powered conveyor systems are reliable and readily transfer pallets from place-to-place.

However, powered conveyor systems have several undesirable qualities when being used as storage rack systems. For example, powered conveyor systems which move loads by driving a sequential series of individual rollers or conveyor belts often require side mounted sections which house motors, gears, sprockets and other drive mechanisms. The use of these drive sections makes it difficult to use them as a storage rack system which is more than one level high. Since generally speaking a separate drive section and its associated motor and housing must be used for each individual powered conveyor, no more than two conveyors can be installed side by side, with a maintenance lane between adjacent sets of conveyors. This results in a two wide conveyor system which is one level high, thereby wasting valuable warehouse space.

Another problem with some powered conveyor systems is that due to the high cost of each powered section, not all sections of the conveyor are powered. The sections which are powered generally do not exceed twelve feet in length. In contrast, the non-powered sections are normally much longer, with some being several sections longer than the powered sections being used. Pallets on the non-powered sections of the conveyor have to be pushed onto the powered sections as subsequent loads are moved on the powered sections, and they are not easily removed when the system must be emptied. As a result, loads may not be as tightly packed together as is common with gravity flow systems. It is not uncommon to have some powered conveyor systems leave large gaps between adjacent loads, even when the systems are considered to be full. This, too, wastes valuable warehouse space and leads to an inefficient movement of loads to the unload position of these systems.

Other powered conveyor systems move loads through the use of complex mechanical equipment and computer tracking systems. These powered conveyor systems become too expensive to be used as a general storage system and are normally designed to meet the particular needs of a specific application. A system of this type is shown as U.S. Pat. No. 4,732,524 Suominen. Even powered roller and conveyor belt systems can cost three to four times the cost of a gravity flow system.

Some powered conveyor systems have been designed, at least in part, to solve some of these problems by using transport carriages to move loads. The transport carriages are mounted on rollers which roll within a set of channel irons upon which loaded pallets are placed. These transport carriages each move loaded pallets by lifting them off the channel irons one at a time, moving each lifted load to an open area in the row of the storage rack system in which the transport carriage is operating. These systems require separate mechanisms to cause the transport carriages to lift loads and to move the loads horizontally. Many of these systems also use computer systems to track the locations where the loads have been set by the transport carriages to enable these systems to move loads from an input position to an unload position of the conveyor in an automated manner. These separate mechanisms and computer systems add to the complexity and cost of this type of powered conveyor system. These systems have the disadvantage that each transport carriage can only move one load at a time. As a result, loaded pallets cannot flow steadily from the input position of this type of powered conveyor system to its unload position.

SUMMARY OF THE INVENTION

According to the principles of this invention, a conveyor system has a load support structure that includes load supporters which enable loads to be moved. The load support structure has an input position at which loads can be placed onto the conveyor system, an unload position at which loads can be removed from the conveyor system and a load storage area located between the input position and the unload position.

The conveyor system also has a plurality of sensors which include an input sensor which senses when a load is at the input position, an unload sensor which senses when a load is at the unload position, and a filled sensor which determines when a pre-selected portion of the load support structure has been filled with loads.

The conveyor system also includes a propulsion system which moves loads along the load support structure. In one preferred embodiment of this invention the propulsion system includes a driver which reciprocates along the load support system. A control system responds to the sensors to cause the propulsion system to move one or more loads to the unload position of the load support structure whenever the unload position is empty. It also causes the propulsion system to move a load from the input position to the storage area of the load support structure when the unload position is full, until such time as the filled sensor determines the pre-selected portion of the conveyor support structure has been filled.

In accordance with one aspect of this invention, while a load is waiting to be removed from the conveyor system, the controller causes the propulsion system to store additional loads contiguous one another behind it, starting at the staging position. When the load is removed from the unload position, the controller causes the propulsion system to move the stored loads toward the unload position until a load is sensed by the unload sensor, indicating the unload position has been filled.

In one embodiment of this invention, which includes a zone control system, the filled sensor includes a sensor which can determine when a load has moved past the unload position. When the unload position is full, the control system causes the propulsion system to move each new load from the input position to the storage area of the load support structure, until such time as loads which have been moved to the storage area push at least a portion of the load at the unload position past that position. The filled sensor then indicates the preselected portion of the load support structure has been filled with loads, and the propulsion system does not move a load to the storage area until a load is removed from the unload position.

In accordance with another embodiment of this invention, which includes a counter control system, the filled sensor includes a counter and sensors coupled to the counter which change the count of the counter in a first direction when the load is placed on the input position of the load support structure. The sensors change the count in a second direction when the load is removed from the unload position of the load support structure. When the counter reaches a predetermined count in the first direction, the filled sensor determines that the pre-selected portion of the load support structure has been filled with loads. Thereafter, the propulsion system does not move a load to a storage area until a load is removed from the unload position and the count in the first direction is reduced from the predetermined count.

An additional advantage of this invention is that it can be used as a storage system which includes a series of successive conveyor systems. In this configuration, the load support structure of each successive conveyor system includes, in effect, a portion of the load support structure of the immediately preceding conveyor system. The unload position of the immediately preceding conveyor system becomes the input position of the load support structure of each successive conveyor system. As a result, as long as the unload position of one of the successive conveyor systems is empty, a load placed on the immediately preceding conveyor system is moved by the system's propulsion system onto the successive conveyor system. Thus, the control system of this series of conveyor systems causes loads to accumulate initially on the last conveyor system in the series, and then accumulate on each immediately preceding conveyor system until that system's load support structure has received its capacity of loads.

This invention can be used to provide a single conveyor system, or, if desired, a series of successive conveyor systems installed in a straight line or at angles with respect to one another. Due to the structure of the single conveyor systems and the various series of successive conveyor systems resulting from this invention, multiple units of either type of system can be installed side-by-side and/or they can be stacked vertically above one another to produce efficient storage systems.

This invention does not reside in any one of the features of the conveyor system which are disclosed above and in the Description of the Preferred Embodiments and claimed below. Rather, this invention is distinguished from the prior art by its particular combination of features of the conveyor system disclosed. Important features of this invention have been disclosed in the Detailed Description of the Preferred Embodiments as shown and described below to illustrate the best mode contemplated to date for carrying out this invention.

Those skilled in the art will realize that this invention is capable of embodiments which are different from those shown and that details of the structure of the conveyor system can be changed in various manners without departing from the scope of this invention. Accordingly, the drawings and descriptions are to be regarded as illustrative in nature and are not to restrict the scope of this invention. Thus, the claims are to be regarded as including such equivalent conveyor systems as do not depart from the spirit and scope of this invention.

BRIEF DESCRIPTION OF THE DRAWINGS

For a more complete understanding and appreciation of this invention and many of its advantages, reference should be made to the following, detailed description taken in conjunction with the accompanying drawings wherein:

FIG. 2 is a block diagram of a zone control system, constructed in accordance with one embodiment of this invention; for the single conveyor system shown in FIG. 1;

FIG. 4 is a block diagram of a count control system for a single conveyor constructed in accordance with another embodiment of this invention;

FIG. 6A is a block diagram showing relationship between the basic functions of a zone control system built in accordance with this invention and a programmable logic controller used in a preferred embodiment;

FIG. 17 is a ladder diagram of controls for tram reverse movement, returning the tram to the home position;

FIG. 27 is a top view of a tram which can be used to move loads on conveyor systems designed in accordance with this invention and shown in FIG. 1;

FIG. 28 is a side view of the tram shown in FIG. 27;

FIG. 29 is a view taken through section "29"—"29" shown through FIG. 28.

FIG. 30 is a schematic diagram of one type of tram drive which can use the tram shown in FIGS. 27–29 to move loads on conveyor systems constructed in accordance with this invention as shown in FIG. 1;

DETAILED DESCRIPTION OF PREFERRED EMBODIMENTS

Figure 1:
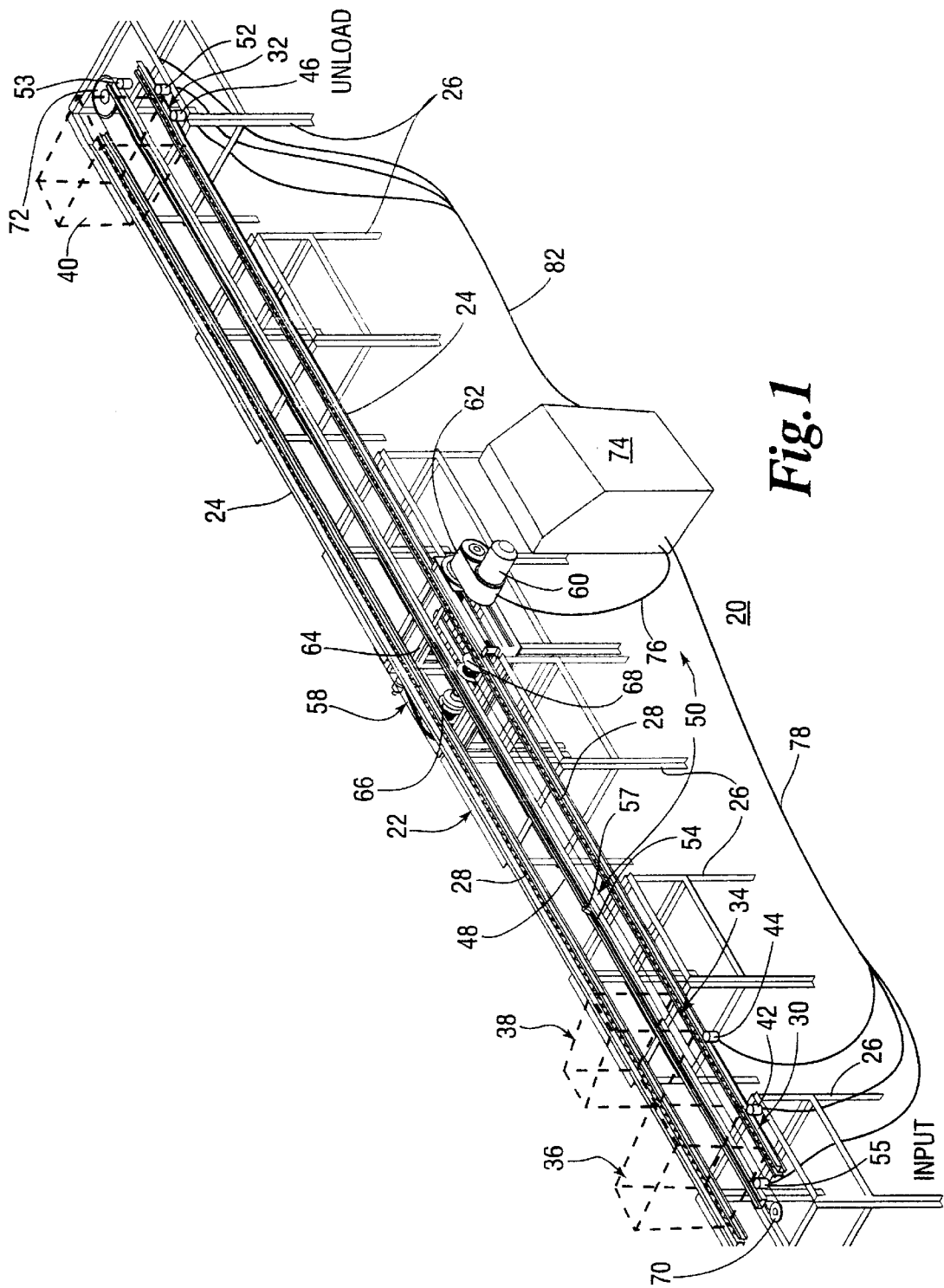
FIG. 1 is a perspective view of a single conveyor system assembled in accordance with one embodiment of this invention.

Referring to the drawings, identical reference numerals and letters designate the same or corresponding parts throughout the several figures shown in the drawings.

A powered conveyor system constructed according to this invention is now described with reference to FIG. 1 of the drawings. A conveyor system 20 has a load support structure including any type of rack or other framework which can support the loads being placed on it. As shown in FIG. 1, the load support structure 22 includes a lane 24 shown as a pair of rails supported by sets of structural framework 26. The lane 24 could comprise two or three or four or any other number of rails which may be convenient to use. The rails and structural framework shown in FIG. 1 are typically manufactured out of hot rolled steel, called structural steel, or cold formed steel, referred to as roll formed steel. This racking is normally assembled using bolted, slip-fit, pinned, pressed-fitted or welded connections.

The load support structure 22 is mounted substantially horizontally either without any slope or with a slope less than is needed for gravity flow of loads on the conveyor system 20. The load support structure 22 has load supporters 28, shown schematically, which enable loads to be moved. The load supporters 28 used in the preferred embodiment are wheels of the type used to enable pallets or other loads to move on conveyors. They can be manufactured out of steel or aluminum or another metal, as well as out of plastic or any other material which is adapted to a particular application of the conveyor system 20. The load supporters could also be rollers, a pneumatic supporting system, low friction plastic material or any other type of support member or system which would enable loads to be moved readily with or without being lifted.

The load support structure 22 has an input position 30 at its left end in FIG. 1 at which loads can be placed onto the conveyor system 20, it has an unload position 32 at its right end at which loads can be removed from the conveyor system 20, and a load staging position 34 located in a load storage area between the input position 30 and the unload position 32. A load 36 is shown at the input position 30, a load 38 is shown at the load staging position 34, and a load 40 is shown at the unload position 32.

The conveyor system 20 also includes a plurality of sensors including an input sensor 42 which senses when a load is at the input position 30, a staging sensor 44 which senses when a load has passed it and is thus at the staging position 34 in the load storage area , and an unload sensor 46 which senses when a load has reached the unload position 32. In the preferred embodiment of the invention, the input sensor 42, the staging sensor 44 and the unload sensor 46 react to the movement of a load to their positions. But they do not respond to the movement of a tram 54, a component of a propulsion system shown as driving system 50, which is used to move loads on the conveyor system 20 and will be more fully described below. The sensors can be of any type suitable for the application of the conveyor system including, but not limited to, photo-optical sensors, ultrasonic sensors, mechanical presence indicators, limit switches, laser detectors and motion sensors. Alternatively, one or more of the sensors could include a human operator who activates a switch when he determines a particular operation of the conveyor system should take place. For example, an operator could push a button or otherwise signal to an appropriate portion of the conveyor system 20 when a load is placed at the input position 30 and should be moved forward on the conveyor. The operator thus becomes the input sensor 42. The sensors can be mounted on a track or channel 48, which is also a component of a driving system 50, or on the rails 24. Alternatively, the sensors can be mounted anywhere on or near the conveyor which can conveniently determine whether loads are present at the input, unload and staging positions of the conveyor system 20.

Since the embodiment of this invention shown in FIG. 1 includes a zone control system, the conveyor system 20 also includes a filled sensor 52 which determines when a preselected portion of the load support structure has been filled with loads. An end sensor 53 at the unload end of the load support structure 22 responds to the presence of the tram 54 of driving system 50 at its location, indicating that the tram has reached the limit of its travel and the movement of the driver 50 must be stopped. A "home" sensor 55 at the input end of the load support structure 22 detects when the tram 54 is at the normal starting point of its operation. In the embodiment of this invention shown in FIG. 1, the end sensor 53 and the home sensor 55 are limit switches.

The filled sensor 52 is shown as a single sensor located to the right of the unload sensor 46, signifying the conveyor is full. It responds when a load has been moved on the load support structure 22 beyond the unload sensor 46. However, the filled sensor could comprise any component or series of components which can determine when a pre-selected portion of the conveyor support structure has been filled with loads. As will be discussed below with respect to an embodiment of this invention using a count control system, the filled sensor could comprise a counter, the input sensor 42 and the unload sensor 46 which operate in conjunction with one another and their associated circuitry to count the number of loads on the load support structure 22.

In the embodiment of this invention shown in FIG. 1, a propulsion system comprising driving system 50 moves loads on the load support structure by causing a tram 54 to reciprocate along that structure. However, the propulsion system can be any system which can move one or more loads from a position at or beyond the input position 30 toward the unload position 32, and then get ready to move one or more additional loads in the same manner without affecting the position of the loads that were moved. For example, one type of propulsion system has separate, individually liftable groups of wheels mounted along a conveyor support structure. The groups of wheels can be lifted sequentially under a load, with each group of wheels moving the load a short distance in the desired direction of travel. After it has moved the load, each group of wheels is lowered and returned to its starting position. Alternatively, air or hydraulically activated pushing arms mounted along the support structures can be used to push loads forward. Additionally an air jet propulsion system in which air blows through jets against the loads or blows into expandable bladders located beneath the loads can move the loads. Or a worm screw drive could be used to move loads along the conveyor. Many different propulsion systems are available to those skilled in the art. However, when operating according to the principles of this invention, the driving system must become ready to move additional loads toward the unload position 32 without affecting the loads previously moved.

As shown in FIG. 1, the driving system 50 includes the previously mentioned tram 54 and the channel 48 within which the tram is mounted. The tram 54 is more fully described below with respect to FIGS. 27–30. It includes a spring loaded tram dog 57 which can contact pallets or other loads on the conveyor system 20 to push them from left to right in FIG. 1 toward the unload position 32. The tram dog deflects downward against the force of its spring so as not to move a pallet during reverse travel toward the input position 30 as more fully shown in FIG. 28.

The driving system 50 also includes a propelling system 58 which comprises a drive motor 60 coupled through a drive gear box 62 to a drive shaft 64 The propelling system 58 also includes sets of sprockets, chains, clutches and related hardware which cause cable drums 66 and 68 to be rotated by drive motor 60. The sprockets, chains and clutches cause the cable to be wound in one direction on cable drum 66 to pull the driver 50 toward the unload position 32. They also cause the cable to be wound in the other direction on a cable drum 68 to pull the driver 50 away from the load position 32 and toward the input position 30. The cable is supported by a pulley 70 at the input end of the load support structure 22 and by a pulley 72 at the unload end of the load support structure 22.

The tram 54 can travel at fixed or variable speeds in forward and reverse directions. The tram should travel at a speed in the forward direction toward the unload position 32 which does not upset loads being moved. It can travel more rapidly back, if desired, toward the input position 30 to be available to move other loads, since it will not be pushing anything while moving in this direction. For example, tests on a prototype conveyor have shown that typical loads can be moved toward the unload position at a speed of about 30 feet per minute by the tram 54, whereas the tram 54 can be returned to the input position at a speed of about 100 feet per minute.

The tram 54 can be moved by cable, chain, belt, a driving screw or other convenient means. It can also be propelled by a motor contained within it, thereby eliminating the separate propulsion system 58 shown, will be more fully explained below with respect to FIGS. 23–24. Where a propelling system 58 is used which is separate from the tram, it can be mechanical, electrical, pneumatic, hydraulic, or any combination of these. If desired, forward and reverse motions could each be accomplished with separate drive systems. The propelling system 58 which is shown and described with respect to FIG. 1 is merely one of many possible propulsion systems which can be used in accordance with this invention.

The conveyor system 20 includes a control system 74 shown in the form of a zone control system by way of illustration. The zone control system responds to the input sensor 42, the staging sensor 44, the unload sensor 46 and the filled sensor 52 to cause the driver 50 to move one or more loads to the unload position 32 whenever the unload position is empty. Thus, in the embodiment of this invention shown in FIG. 1, the control system 74 is coupled in some convenient manner, indicated by coupling line 76, to the drive motor 60 and the wiring to its power source to turn it on and off and adjust its speed. The input sensor 42, the staging sensor 44 and the home sensor 55 are shown schematically to be coupled to the control system 74 through sensor line 78, while the unload sensor 46, the filled sensor 52 and the end sensor 53 are shown schematically to be coupled to the control system 74 through sensor line 82.

Operation of Conveyor System

A brief summary of the operation of the conveyor system 20 is as follows:

The control system 74 responds to the sensors coupled to it to cause the driving system 50 to move one or more loads, located elsewhere on the conveyor 20, to the unload position 32 of the rails 24 whenever the unload position 32 is empty. The control system 74 also causes the driving system 50 to move a load from the input position 30 to the staging position 34 in the load storage area if the unload position 32 is full. As long as the unload position 32 remains full, each load is pushed from the staging position 34 and along the rails 24 by each successive load. This continues until the filled sensor, shown as the sensor 52 for the zone control system shown in FIG. 1 and FIG. 2, determines the preselected portion of the conveyor structure has been filled by the stored loads which have been stacked on the rails 24. Alternatively, the input sensor 42 and the unload sensor 46 could have been used with a counter in a count control system, as shown in FIG. 4, as a filled sensor in place of sensor 52. With either type of control system, when a load is removed from the unload position 32, the controller 74 causes the driver 50 to move the stacked loads toward the unload position until a load is sensed by the unload sensor, indicating the unload position has been filled once again.

The detailed operation of the control system 74 with respect to loads being moved on the conveyor system 20 is best understood by referring to FIG. 2. A schematic diagram of the load support structure 22 is shown at the top of FIG. 2. FIG. 2 also shows a representation of the control system 74 in the form of a series of control functions represented by boxes 86 through 114. Each of the control functions can be performed by binary or analog electromechanical switching devices, or by binary or analog solid state switching devices, along with associated circuitry. The switching devices and associated circuitry monitor and respond to the status of the various sensors used for the conveyor system 20 and cause the tram 54 to move back and forth along the length of the rails 24 or stop the tram 54, as required. By way of example a programmable logic controller ("PLC"), relay logic, discrete component logic or a computer or similar device can be used to perform the various control functions described. In the preferred embodiment a PLC was used to provide the control functions. Acceptable PLCs for this purpose include but are not limited to the Sysmac C200H Programmable Controller manufactured by Omron Electronics, Inc.; the SLC 500™ Family of Small Programmable Controllers manufactured by Rockwell Automation of Allen-Bradley Company; Melsec Models K0E and K2E Programmable Controllers manufactured by Mitsubishi Electric Corporation; and the PROSEC T2 Programmable Controller manufactured by Toshiba Corporation.

The control functions 86 through 114 are interconnected by arrows which represent the output of the control functions. These outputs depend on the positions of loads on the conveyor system 20 as indicated by signals from the input sensor 42, staging sensor 44, unload sensor 46 and filled sensor 52. It should be understood, however, that the diagram of the control functions 86 through 114 shown in FIG. 2 is merely one configuration of a control system which can perform the required actions of the conveyor system 20 in accordance with this invention. Those skilled in the art will recognize that many alternative control systems can be used for this purpose. Referring initially to FIG. 2, the various switches, switching devices and circuitry used in turning on power to control system 74 are indicated by control function 86. The control system 74 can also include, if desired, switches, switching devices and circuitry enabling an operator to choose either automatic operation of the driving system 50 of this invention or a manual operation of the driving system 50.

In accordance with this invention, a control function 88 determines whether the unload position 32 on the conveyor, monitored by the unload sensor 46, is open. If it is, control function 94 is activated to cause the driver 50 to move a load to the unload position 32. Detection of a load by the unload sensor 46 stops the driving system 50 from moving the load. The control function 88 operates in this manner through control function 94 any time there is no load at the unload position, either when power is first turned on for the conveyor system 20 or at any time thereafter. This is referred to below as the basic run operating sequence. The function of control function 88 may be supplemented by control function 90, as explained below, when a load is at the input of the conveyor system 20.

When power is first turned on, if unload detector 46 does not detect a load at unload position 32, the control function 88 causes control function 94 to move any loads which are on the conveyor system 20 at that time, until one of these loads is detected by the unload detector 46. The pair of arrows between control function 94 and control function 95 indicates that during operation of control function 94 there is a continuous monitoring of whether a load has reached the filled position, detected by the filled sensor 52, without somehow being detected by the unload sensor 46. If in fact the filled sensor 52 indicates that the position it monitors is no longer open, the arrow from logic function 96 shows that the driving system 50 of FIG. 1 is stopped, thereby stopping the movement of loads. The arrow from control function 96 to control function 98 means that the direction of operation of the driving system 50 is reversed. The tram 54 of FIG. 1 then returns to the home position monitored by the home sensor 55, as indicated by arrow 97. Arrow 97 leads to a pair of arrows 101 and 105 between control functions 88 and 90 to indicate that once the tram 54 is at the home sensor 55 both control functions 88 and 90 can operate once again.

The pair of arrows 101 and 105 between control functions 88 and 90 means that there is a continued monitoring by these two control functions to determine whether there is a load at the input sensor 42 or whether there is or is not a load at unload sensor 46. As indicated above, even without a load at control function 90, if a load is removed from the conveyor system 20, leaving unload sensor 46 open, control functions 88 and 94 cause the tram 54 in FIG. 1 to move loads already on the conveyor toward the unload position 32, until the unload sensor 46 determines a load is there.

The pair of arrows between control function 94 and control function 100 means that during operation of control function 94 there is a continuous monitoring of whether the tram 54 of the driver 50 has reached the end sensor 53 without having the load detected by either the unload sensor 46 or the filled sensor 52. The tram 54 would normally reach the end sensor 53 when the conveyor is empty. It could also occur in the event of a malfunction, such as a malfunction of the sensors 46 and 52 or their associated circuitry.

If the tram 54 reaches the end sensor 53, the arrow to control function 102 shows that the driving system 50 of FIG. 1 is stopped, and its tram 54 is no longer moving. The arrow to control function 104 indicates that the tram 54 is then returned to the home position 55. The arrow 103 extends from control function 104 to basic run lockout control function 107. Since the unload sensor 46 is open at this time, control function 107 allows the tram 54 to moved forward only when a load is detected by the input sensor 42. This is shown by arrow 109 to control function 90. Thus, the tram is activated only by a new load placed on the conveyor 20 until after the tram 54 is moved once again to fill the unload position 32.

The control functions 95 and 100 also assist in minimizing the malfunction of the conveyor system and the risk of damage to conveyor loads in the event that the loads are not stopped at the positions of the unload sensor 46 or the filled sensor 52. The tram 54 normally reaches the end sensor 53 when there are no loads on the conveyor. However, if this occurs a second time without having a load sensed by the unload detector 46, a failure has occurred. This failure is detected by a failure lockout control function 111 which is connected to control function 104 by arrow 117. In the preferred embodiment of this invention, if the tram has been detected by the end sensor 53, its direction reversed so that it is detected by the home sensor 55 and then detected a second time by the end sensor 53 before the driving system is reversed by a load being detected by the unload sensor 46 with a filled sensor 52, the failure lockout control function 111 determines a failure has occurred. The failure lockout control function 111 turns off the control power to the failed conveyor system as indicated by arrow 115 between control function 111 and power control function 86.

When a load is placed at the input position 30 its presence is detected by input sensor 42 and a signal is coupled from control function 90 to control function 92 which uses unload sensor 46 to determine whether the unload position 32 is open. If the answer is yes, control function 94 is activated to cause the driving system 50 of FIG. 1 to move the load until a load is detected by unload sensor 46. At this time, the driving system 50 is stopped, as indicated by control function 96. Since the tram 54 is the load moving mechanism of the driving system 50, the tram 54 is then returned to the home position 55, as shown by control function 98 and arrow 97 which contacts arrows 101 and 105. In further accordance with this invention control functions 90, 92 and 106 activate control function 108 to cause the driver 50 of FIG. 3 to move loads from the input position 30 to the staging position 34 when the unload position is full, until a preselected portion of the load support structure of the conveyor system 20 is filled.

Referring now more specifically to control functions 90 and 92, if a load is detected by the input sensor 42, and the unload sensor 46 determines that the unload position is not open, the control function 106 is activated to determine whether the conveyor filled position, sensed by filled sensor 52, is open. If the answer is yes, control function 108 causes the tram 54 of the driver 50 in FIG. 1 to move the load past staging sensor 44. At this position the driver 50 is stopped. The pair of arrows between control functions 108 and 110 indicates that while a load is being moved past staging sensor 44 there is a continuous monitoring to determine whether the filled position sensed by filled sensor 52 is open.

As an alternative to using the staging sensor 44 to stop the drive from moving a load, a timer could be used to activate the drive for a time required to move a load from the input position to a staging position in the load storage area when desired to do so. As long as the filled position is open, successive loads can be moved until each is past the staging sensor 44. Each succeeding load pushes the previous loads away from the staging position 34 and toward the unload position 32 until the load at the unload position is pushed forward so as to be detected by the filled sensor 52. Once the filled sensor 52 of control function 110 determines that the area adjacent it is no longer open, the "No" arrow shows the driving system 50 is stopped by the control function 96. The driving system 50 is then activated to move the tram 54 in the reverse direction by the control function 98, returning the tram 54 to the home position 55.

Referring once again to control function 90, assume a load is detected by the input sensor 42. Through control function 92 the unload sensor 46 determines the unload position 32 is not open, and the control function 106 determines through the filled sensor 52 that the filled position is not open. The "No" arrow from the control function 106 shows that the control function 112 is activated. If the staging sensor 44 is open, control function 114 causes the load at the input position 30 to be moved by the driving system 50 on the conveyor system 20 until the load is detected by staging sensor 44. At that point the driving system 50 is stopped by control function 96. Control function 98 reverses the direction of the driving system 50 and returns the tram 54 to the home position 55. Thereafter no further loads can be moved on the conveyor 20 until a load is removed.

The arrow 113 from the "No" terminal of control function 112 to the arrows 101 and 105 between control function 88 and control function 90 shows that these control functions are now ready to cause the loads on the conveyor 20 to be moved forward as soon as a load is removed from the conveyor 20.

Examples of Movement of Loads

Figure 3:
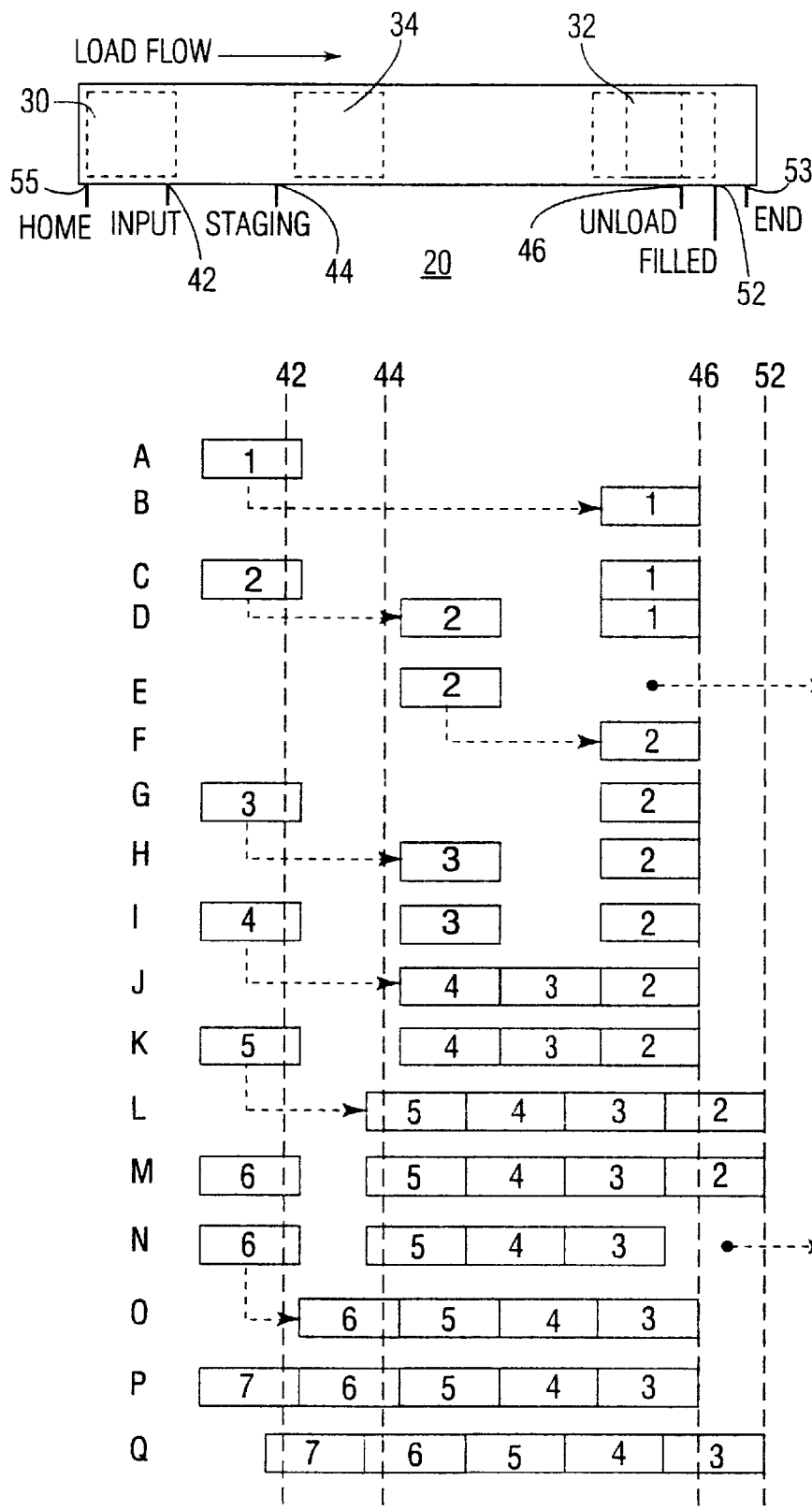
FIG. 3 is a flow diagram showing the movement of loads on the conveyor system of FIG. 1 using a zone control system shown in FIG. 2.

A schematic diagram of the conveyor system 20 is included at the top of FIG. 3. Rows A through Q below this schematic diagram show by way of arrows and the change of location of blocks the movement of loads from the input position 30 to and/or through the staging position 34 to the unload position 32 of the conveyor system 20.

Referring to FIG. 2 along with Row A of FIG. 3, assume that when the control system 74 is turned on, there is no load anywhere on the conveyor system 20. The initial operation of control function 88, the basic run sequence, causes control function 94 to move the tram 54 until it is detected by control function 100 through end sensor 53. Control function 102 stops the driving system 50. Control function 104 reverses the direction the driving system 50 to cause the tram 54 to return to its home position, detected by home sensor 55. Basic run lockout 107 does not allow control function 88 to operate until a load has been moved by the control system 74.

Load 1 is now placed into the input position 30 where it is detected by input sensor 42. Control function 90 of FIG. 2 determines input sensor 42 has a load present and through control function 92 and unload sensor 46 looks to see if the unload position is open. The answer is "yes", sensor 46 is open. Control function 92 causes control function 94 to move load 1 along the conveyor 20 until it is detected by the unload sensor 46, as shown in Row B of FIG. 3. As load 1 is being moved to the unload sensor 46, control function 94 monitors control function 95 to see if filled sensor 52 detects a load. Control function 94 also monitors control function 100 to see if the end sensor 53 detects the presence of the tram 54, shown in FIG. 1.

Once load 1 is detected by the unload sensor 46, as shown in Row B, control function 96 is activated to stop the driving system 50 from moving tram 54. The driving system 50 is then reversed by control function 98, causing the tram 54 of FIG. 1 to be returned to its home position by control function 98 where it is detected by home sensor 55.

In Row C, load 2 is placed at the input position 30 where it is detected by control function 90 through input sensor 42. Control function 92 determines in response to unload sensor 46 that the unload position is not open. This negative answer activates the control function 106 which determines that filled sensor 52 is open, meaning the conveyor is not filled. Thus, control function 108 is activated by control function 106 and causes load 2 to be moved past staging sensor 44 by the driving system 50 of FIG. 1. At this point movement stops in the staging position of the conveyor as shown in Row D of FIG. 3. In the illustrated embodiment of this invention, the driving system 50 in FIG. 1 is then stopped by control function 96. Control function 98 causes driving system 50 to return tram 54 to a position where it is detected by its home sensor 55.

Referring now to Rows E and F, in Row E load 1 is removed from the conveyor. Control function 88 senses that unload sensor 46 is now open and thus that the unload position 32 is open. Control function 88 enables the control function 94 to cause the driving system 50, through the tram 54, to move load 2 from the staging position 34 to the unload position 32 where load 2 is detected by the unload sensor 46. The driving system 50 is then stopped by control function 96, and thereafter control function 98 causes driving system 50 to return the tram 54 to the home position 55.

Rows G and H show how the control system 74 of FIG. 2 moves load 3 from the input position 30 to the staging position 34, just as it moved load 2 in Rows C and D.

Referring now to Rows I and J, along with FIG. 2, control function 90 detects load 4 at the input position 30 through input sensor 42, while control function 92 determines through unload sensor 46 the unload position 32 is not open. Since the conveyor system 20 is not filled, control function 106 enables control function 108 to move load 4 past the staging sensor 44 and toward the staging position 34. As load 4 is moved toward the staging position, it pushes load 2 toward load 2. In the conveyor configuration shown in FIG. 3 load 3 does not move load 2. Once load 4 passes staging sensor 44, control function 96 stops its movement and control function 98 causes the tram 54 to be returned to its home position 55, as explained above.

Referring to Row K, when load 5 is detected at the input position 30 by control function 90, control function 92 determines the unload position 32 is not open, while control function 106 determines the filled position is open. Since load 4 has previously moved past staging sensor 44, staging sensor 44 is open. As seen in Row L, control function 108 moves load 5 until control function 110 determines, through filled sensor 52, that the load support structure 22 of the conveyor 20 is filled. At that time, control function 96 stops the driving system 50 and control function 98 causes the driving system 50 to return the tram 54 to the home position 55.

Row M of FIG. 3 shows load 6 is placed on an otherwise loaded conveyor. Its presence is detected at input sensor 42, activating control function 90. Control function 92 determines that the unload sensor 46 is not open. Control function 106 determines that the filled sensor 52 is not open, and control function 112 determines that the staging sensor is not open, either. The arrow 113 from the "No" terminal of control function 112 means that the control system 74 does not cause the driving system 50 to move the loads at this point in time. The control function 88 and control functions 90 and 92 are prepared to operate if the unload position 32 becomes open.

Referring to Row N of FIG. 3, and referring again to FIG. 2, when load 2 is removed from the conveyor system 20, control function 88 determines that the unload position is open. As shown in Row O, control function 94 then causes the driving system 50 of FIG. 1 and its tram 54 to move all of the loads on the conveyor until load 3 is detected at the unload sensor 46. The driving system 50 is stopped at this point in the operation of control system 74 by control function 96. The tram 94 is returned to the home position 55 through the operation of control function 98 on the driving system 50.

Referring to Row P of FIG. 3, a load 7 is placed on conveyor 20 and is detected by control function 90 through input sensor 42. Control function 92 determines through unload sensor 42 that load 3 is at the unload position 32. However, control function 106 detects through filled sensor 52 that the conveyor system 20 is not filled. Control function 108 then causes driving system 50 to move load 7 plus loads 3 through 6 until load 3 reaches the filled position, determined by filled sensor 52. See Row Q. Control function 110 causes the movement of the load to stop by activating control function 96 when load 3 reaches the filled position and is detected by filled sensor 52.

Referring again to row Q, load 7 is still detected by input sensor 42 so that control function 90 reacts to it. However, the unload sensor 46 is not open. Thus, control function 92 activates control function 106 which in turn activates control function 112 because the filled sensor 52 is also not open. Since the staging sensor 44 is not open, either, no action is taken by control function 112. Arrow 113 extending to arrows 101 and 105 indicates the control system 74 will operate the conveyor 20 once again when unload position 30 is open, as detected by unload sensor 46.

If desired, a separate sensor can be used to sense a load at each load storage position between the input position 30 and the unload position 32. The staging sensor 44 would not be used for its previously described purpose. The individual sensors could be used, in conjunction with control function 108, to enable control function 108 to determine, for example, the open load storage position which was closest to (or farthest from) the unload position. The control function would then cause the tram to push the next load at the input position to the desired open load storage position. Similarly, control function 112 would determine if any load storage position was open through the use of these load storage position sensors. Control function 112 would signal Control function 114 to cause the tram to push a load from the input position 30 to the desired open position.

Count Control System

FIG. 4 shows a control system 74 in the form of a count control system. A schematic diagram of the conveyor 20 in the form used for the count control system is included at the top of FIG. 4. Note that no filled sensor is required at the unload end of the conveyor system 20. A count control system of this type can preferably include a counter which retains the count upon removal of power. Alternatively a non-retaining counter can be used.

Like FIG. 2, FIG. 4 shows a control system 74 in the form of a series of control functions represented by boxes, consisting of control functions 116 through 146. Each of these control functions operates in the manner similar to corresponding control functions shown in FIG. 2, except for functions 118 and 120 which are portions of a counter 121. As in FIG. 2, the control functions 116 through 146 of FIG. 4 are interconnected by arrows that represent the output of the control functions, in response to the input sensor 42, the staging sensor 44 and the unload sensor 46. However, the count control system 74 shown in FIG. 4 determines the conveyor is filled when the counter 121 reaches a predetermined load count, indicating a predetermined number of loads have been placed on the conveyor system 20.

Control function 116 detects a load placed at input position 30 through input sensor 42. This causes one count to be added to counter 121 through function 118 and control function 124 to be activated. On the other hand, control function 122 operates when unload sensor 46 detects a load is removed from the unload position 32. This causes the count of counter 121 to be reduced by one through function 120 and control function 126 to be activated.

The balance of the control system 74 is configured in a manner and operates in a manner similar to the zone control system shown in FIG. 2, with the exception of substituting a counter for the filled sensor. In the count control system shown in FIG. 4, control function 138 (corresponding to control function 106 of FIG. 2) responds to counter 121 to determine whether the conveyor system 20 has been filled.

When a load is placed at the input position 30, its presence is detected by control function 116 through the input sensor 42. Control function 116 causes the function 118 of counter 121 to add one count. Additionally, control function 124 is actuated and through unload sensor 46 determines whether unload position 32 is open. If the answer is yes, control function 126 is activated to cause the driving system 50 of FIG. 1 to move the load until a load is detected by the unload sensor 46. At that time, the driving system 50 is stopped by control function 128. The driving system 50 reverses the direction of movement of the tram 54, and the tram 54 is returned to the home position 55 by control function 130. The arrow 97 from the control function 130 which splits to the parent arrows between control functions 116 and 122, shows the control system 74 will then operate either if a load is added at the input position 30 as detected by input sensor 42, or if a load is removed from the unload position as detected by the unload sensor 46.

The control functions 132, 134 and 136 operate in the same manner as control functions 100, 102 and 104 shown in FIG. 2. Their purpose is to stop the driving system 50 from operating whenever the tram is detected at the end sensor 53 and thereafter return the tram to the position of the home sensor 55. This would occur if the driving system 50 is operated without a load on the conveyor or if the unload sensor 46 somehow fails to detect the presence of the load at the unload position 32.

Assuming once again that a load is placed at the input position 30, the load is detected by the control function 116 and one count is added through function 118 to the counter 121. If the control function 124 determines the unload sensor 46 is not open, the control function 138 then determines whether the counter 121 has reached the filled count. If it has not, control function 140 activates the driving system 50 to cause it to move the load past a staging sensor 44 to the staging position 34. Once this occurs, control function 128 stops driving system 50, and control function 130 causes driving system 50 to return the tram 54 to the position of the home sensor 55.

Control function 142 can be used to protect the conveyor system 20 from a potential malfunction of the staging sensor 44 and/or the counter 121. If somehow the control function 138 causes the control function 140 to operate the driving system 50 after the filled count has been reached, or if a load is not detected by the staging sensor 44 before the tram 54 of FIG. 1 reaches the end of the conveyor, control function 142 stops the operation of the driving system 50 when the tram 54 reaches the position of the end sensor 53.

Assume once again that a load has been added to the input position 30, detected by the control function 116, the count of the counter 121 has been increased by one and the control function 124 determines the unload position 46 is not open. If the filled count has been reached, control function 138 causes control function 144 to determine whether sensor 44 is open. If it is, control function 146 causes the driving system 50 to move the load until it is detected by the staging sensor 44. At that time, the driving system 50 is stopped and the tram 54 is returned to the home sensor 55. If a load is removed from the unload position 32 and out of the path of unload detector 46, control function 122 causes function 120 to subtract one count from counter 121. The arrow from function 120 to the input of control function 124 indicates that control function 124 looks to see if the unload position is open. If the answer is "yes" and the count is not zero, it then causes driving system 50 to move the loads on the conveyor system 20 until a load is detected at the unload sensor 46. Control function 128 then stops driving system 50, and control function 130 causes the tram of driving system 50 to be returned to the home position 55. The control system 74 can thereafter operate the conveyor 20 either if a load is added at its input position 30 or if a load is removed from its unload position 32.

Multiple Conveyors

Due to the features of conveyor systems built in accordance with this invention, a number of them can advantageously be used in series with one another. In this configuration the load support structure of each successive conveyor system includes a portion of the load support structure of the immediately preceding conveyor system. As a result, the unload position of the immediately preceding conveyor system overlaps with and becomes the input position of each successive conveyor system. As will be illustrated below, this enables the unload position of the last conveyor in the series to be dominant.

When the unload position of the last conveyor is emptied, loads will first be moved along that last conveyor to fill its emptied unload position, the same as showed in FIG. 3. As a result the input position of the last conveyor is open. This input position is also the unload position of the preceding conveyor. Then loads will be moved along the preceding conveyor to fill its unload position, and its input position will become open. Loads will continue to be moved successively from conveyor to conveyor until they are stacked one behind another to fill the last conveyor. And, if necessary due to the number of loads, the loads will be stacked in succession on each preceding conveyor as the conveyors become filled.

Figure 5:
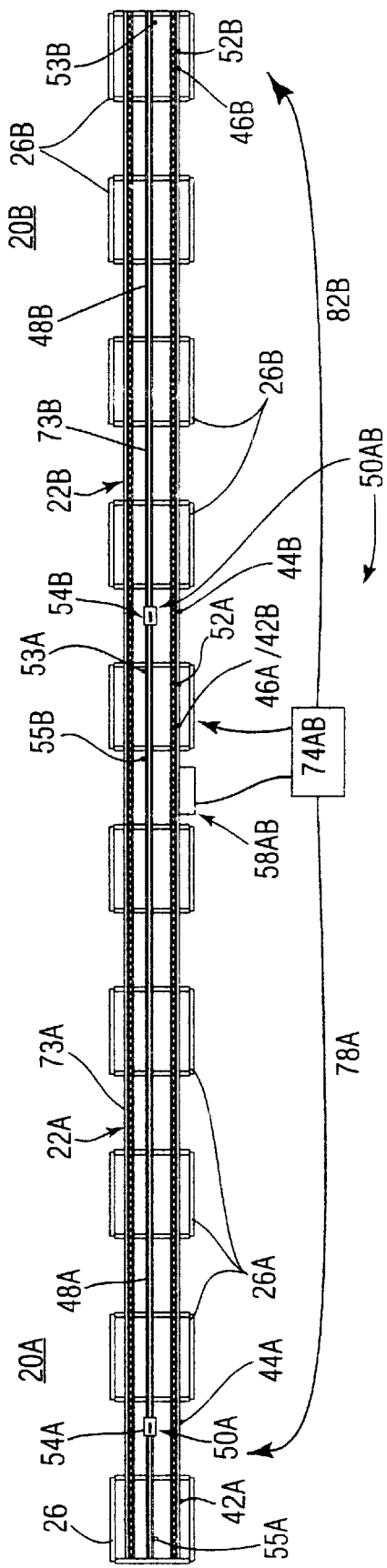
FIG. 5 is a top view of a multiple conveyor system constructed in accordance with one embodiment of this invention.

FIG. 5 shows a pair of conveyors installed in series in accordance with the principles of this invention. For the sake of convenience, the first conveyor, called conveyor system 20A or conveyor A, uses the identifying numerals showed in FIG. 1 with the letter "A" following each of them, while the second conveyor, called conveyor system 20B or conveyor B, uses the identifying numerals from FIG. 1 followed by the letter "B." Each of the conveyor systems 20A and 20B is built and operates in accordance with the features of the conveyor system shown in FIG. 1. However, the driving systems 50A and 50B include self contained trams 54A and 54B, respectively. Each of these trams has a motor and an associated gear box built into it to propel the trams 54A and 54B through their respective channels 73A and 73B. The trams can receive their power from batteries which are part of each tram or from power pick-up systems which have power conductors mounted on the load support structures 22A and 22B. The driving systems 50A and 50B do not use the propulsion system 58 shown in FIG. 1 with its cable, cable drums 66 and 68, sprockets 70 and 72 and other components which move the tram 54 back and forth along the load support structure 22.

As indicated above, the load support structure 22A of conveyor system 20A includes a portion of the load support structure 22B of conveyor system 20B. The control system 74AB uses the same sensor as both the unload sensor 46A of conveyor system 20A and the input sensor 42B of the conveyor system 20B. Since the conveyor systems 20A and 20B have a joint zone control system 74AB, the filled sensor 52A for conveyor 20A is located to the right of the unload/input sensor 46A/42B.

As will be explained in more detail below, it is important to the functioning of conveyor 20A that the filled sensor 52A is not blocked by loads on conveyor 20B when conveyor 20B has received all the loads it can store. If filled sensor 52A is blocked before conveyor 20A is filled, the number of loads which can be stored on that conveyor will be limited.

FIG. 5 shows the end sensor 53A near the unload end of tram track 73A, while the home sensor 55B is located near the input end of conveyor system 20B. Since the unload end of conveyor 20A overlaps with the input end of conveyor 20B, all of these sensors are located in close proximity to one another.

Figure 6:
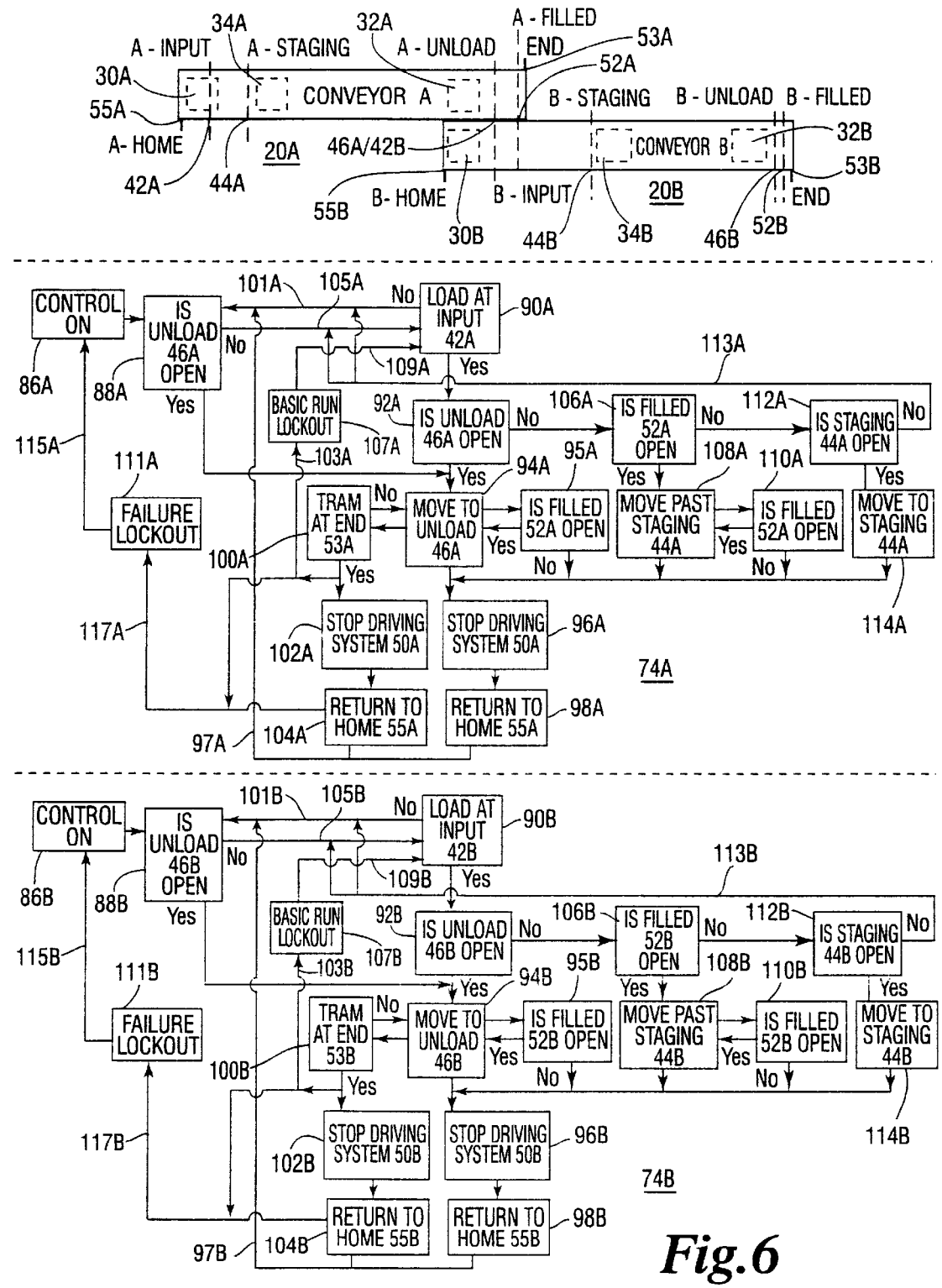
FIG. 6 is a block diagram of a zone control system for the conveyor system shown in FIG. 5 and is constructed in accordance with one embodiment of this invention which produces the load flow shown in FIG. 7.

FIG. 6 is a block diagram showing zone control system 74AB divided into two sections 74A and 74B to be used for the pair of conveyors 20A and 20B shown in FIG. 5. A schematic diagram of the pair of conveyors is shown at the top of FIG. 6. The individual conveyors 20A and 20B are offset from one another in FIG. 6 to clearly illustrate the overlap of the unload position of conveyor system 20A with input position of the successive conveyor 20B. Additional conveyors could be added in series with the conveyors 20A and 20B in accordance with the principles of this invention by causing the input position of each succeeding conveyor to overlap the unload position of the previous conveyor.

The control functions of control systems 74A and 74B are identical to the control functions of control system 74 which were shown in FIG. 2 and explained previously. The numerals identifying the control functions shown in FIG. 2 are used in FIG. 6, except that the numerals identifying the control functions included in control system 74A for conveyor system 20A have the letter "A" following each of them, while the numerals identifying the control functions of control systems 74B of conveyor system 20B have the letter "B" following them.

Figure 7:
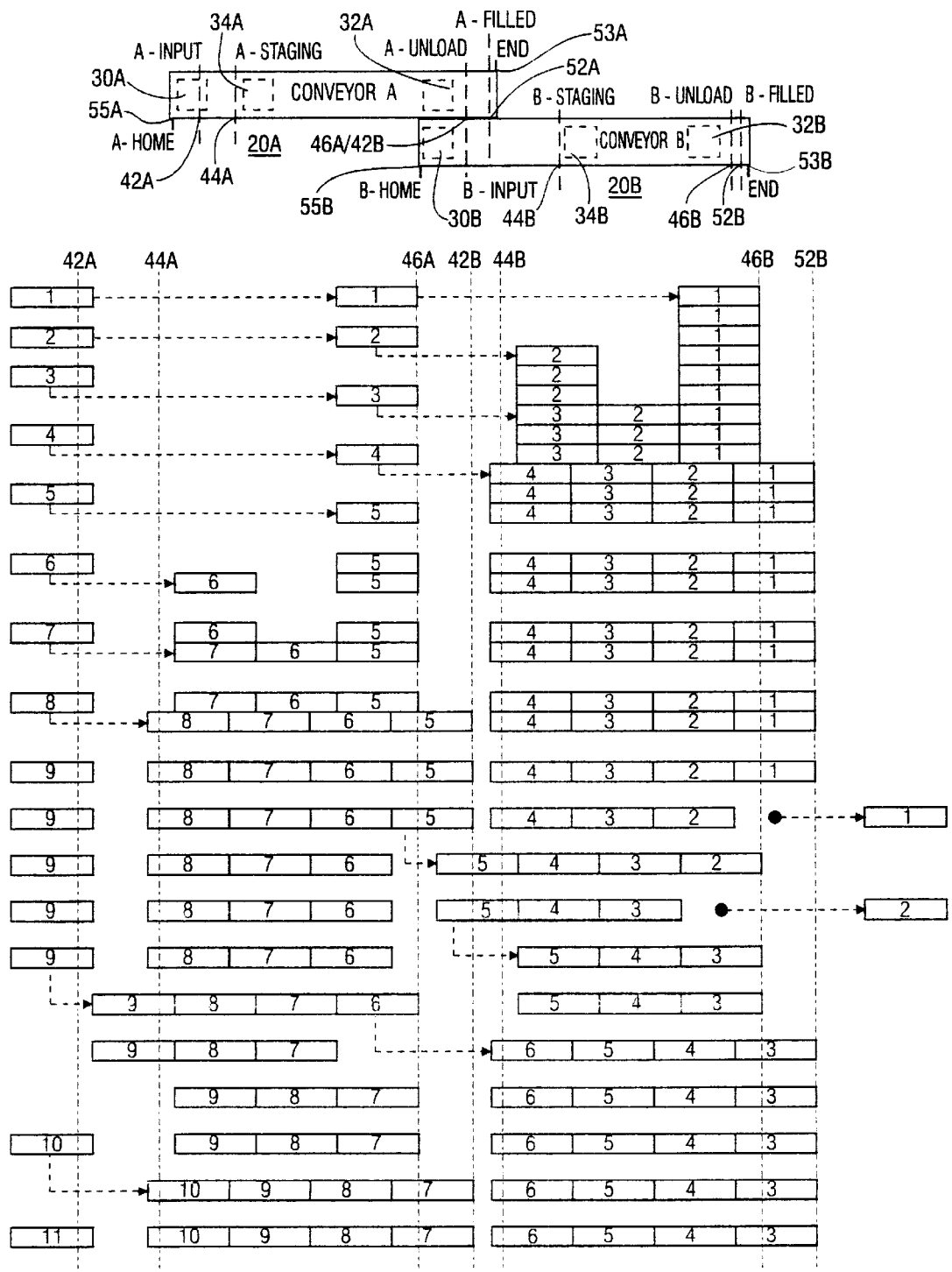
FIG. 7 is a flow diagram showing the moving of loads on the double conveyor system of FIG. 5 using a zone control system shown in FIG. 6.

FIG. 7 is a diagram showing the flow of loads along conveyor systems 20A and 20B of FIG. 5. It has the same schematic diagram of the dual conveyor system of FIG. 5 at the top of it that was included at the top of FIG. 6. Since conveyor system 20A precedes conveyor system 20B, loads are placed onto the input position 30B of conveyor system 20B through movement along the conveyor system 20A.

Assume load 1 is the first load placed on either conveyor as shown in row A of FIG. 7. Load 1 is moved from the input position 30A to the open unload position 32A, which is also the input position 30B for conveyor 20B. Referring to FIG. 6, this occurs when load 1 is detected by control function 90A through input sensor 42A. Control function 90A causes control function 92A to activate control function 94A since unload sensor 46A, which is also input sensor 42B, is open. Control function 94A then causes driving system 50A of FIG. 5 to move load 1 to unload input position 32A/30B where it is detected by unload/input sensor 46A/42B. Control function 96A stops driving system 96A, and control function 98A causes tram 54A to be returned to home sensor 55A in the same manner as similar components operate in FIG. 2.

As shown in row B of FIG. 7, load 1 is then at the input position 30B of conveyor 20B. As a result, control function 90B causes control function 92B to determine, through unload sensor 46B, that unload position 32B is open. As shown in row C of FIG. 7, control function 94B causes driving system 50B to move load 1 to the unload position 32B where its presence is detected by unload sensor 46B. The driving system 50B is stopped by control function 96B and the tram 54B is returned to home sensor 55B as explained below with respect to similar control functions in FIG. 2.

Load 2 is placed into load position 30A on conveyor system 20A as shown in row D of FIG. 7. Control function 90A of FIG. 6 determines through input sensor 42A that the load is present and causes control function 92A to determine whether unload sensor 46A is open. Since the answer is yes, control function 94 moves load 2 to the unload position 32A where load 2 is detected by unload/input sensor 46A/42B. As indicated above, control function 96 now stops driving system 50A and control function 98 causes the tram 54A to be returned to home sensor 55A.

Since the unload position 32A is also the input position 30B of conveyor 20B, load 2 is detected by control function 90B through input sensor 42B. Since control function 92B determines that unload sensor 46B is not open, control function 106B determines through filled sensor 52B, which is open, that the conveyor 20B is not filled. Thus, control function 108B moves load 2 past staging sensor 44B where the load is stopped and the tram 54B returned to the home sensor 55B as indicated above.

As seen in rows G through I, unload 3 is placed on input position 30A where it is detected by input sensor 42A, it is moved to the unload/input position 32A/30B by control system 74A of conveyor A and from that position to the staging position 34B by control system 74B in the same manner as load 2 was moved. In the course of this movement, load 3 pushes load 2 toward load 1.

Referring now to rows J through L, load 4 is also moved from input position 30A where it is detected by input sensor 42A, to unload/input position 32A/30B and from there unto conveyor B in the same manner as loads 2 and 3. Control function 108B causes load 4 to be moved along conveyor B, load 4 pushes load 3, load 2 to the extent that load 1 reaches filled sensor 52B so that control function 11 OB causes control function 96B to stop the driving system 50B from moving these loads any farther. The tram 94B is returned by control function 98B to the position where it is detected by home sensor 55B.

Referring now to rows M and N, when load 5 is placed in input position 30A, control function 90A determines its presence through input sensor 42A, control function 92A detects through unload sensor 46A that the unload position 32A is open. As a result, load 5 is moved by control function 94A to unload/input position 32A/30B where load 5 is detected by unload/input sensor 46A/42B. As a result, control function 96A stops load 5 from being moved any further.

Control system 74B of conveyor B, on the other hand, does not move load 5 at this time. While control function 90B detects load 5 with input sensor 42B, control function 92B determines that load 1 is at unload sensor 46B and control function 106B determines that load 1 is also at filled sensor 52B. Since the filled sensor 52B is not open, load 5 cannot be moved toward the stage sensor 44B.

Loads 6 through 9 fill conveyor A, as shown in rows P through V, in the same manner as loads 3 through 6 filled conveyor 20 of FIG. 2 as shown in rows G through M of FIG. 3. Thus, the operation of the various control functions to fill conveyor 20A, will not be repeated.

Referring now to row AA, load 1 is removed from conveyor system 20B. Control function 88B detects through unload sensor 46B that the unload position 32B is not filled. See FIG. 6. As a result, control function 94B causes the driving system 50B to move load 5, sensed by the input sensor 42B, and load 4, load 3 and load 2 on conveyor system 20B until load 2 is detected by unload sensor 46B.

The movement of load 5 in row BB of FIG. 7 has caused it to clear unload sensor 46A, leaving it open. This is detected by control function 88A through unload sensor 46A. It is also detected by control function 92A. However, control function 94A cannot move load 9, load 8, load 7 or load 6 because load 5 is detected by filled sensor 52A, thereby automatically actuating control function 96A so as to prevent the movement of these loads. A time delay can be built into function 94A so as to allow function 95A to lock out the movement of the loads before control function 94A can get the movement started.

No further movement can take place on the conveyor systems 20A and 20B until load 2 is removed from conveyor 20B as shown in row CC of FIG. 7. The removal of load 2 opens the unload sensor 46B. Through control function 88B, control function 94B actuates the driving system 50B to move load 5, load 4 and load 3 on conveyor 20B until load 3 is detected by unload sensor 46B. See row DD of FIG. 7. At that point in operation control system 96B stops the driving system 50B. Control system 98B reverses the direction of operation of the driving system 50B to return tram 54B to the position of home sensor 55B.

The movement of load 5 has caused it to clear the full sensor 52A. Thus, control function 90A responds to load 9 at the input sensor 42A and control function 92A detects that unload function 46A is open. At this point, control function 94A is actuated to move loads 6 through 9 until load 6 is detected by unload/input sensor 46A/42B as shown in row EE. Row FF shows how load 6 is moved on conveyor system 20B until such time as it pushes load 3 to the filled sensor 52B. This movement occurs as control function 90B responds to load 6 at input sensor 42B, with control function 92B determining through unload sensor 46B that the unload position 32B is not open and control function 106B determining that the filled sensor 52B is open. Thus, control function 108B moves load 6 past staging sensor 44B until such time as load 3, which along with loads 4 and 5, is being pushed by load 6.

Unload sensor 46A is now open, although there is no load at the input position of conveyor system 20A. As a result, control function 88A enables control function 94A to cause the driving system 50A to move loads 7, 8 and 9 along conveyor A until load 7 reaches the unload position of conveyor A and is detected by unload sensor 46A. See row GG.

When load 10 is placed at the input of conveyor system 20A, input sensor 42A causes control function 90A to be actuated. Control function 92A determines through unload sensor 46A the unload position is not opened, while control function 106A indicates that filled sensor 52A is open. As a result, load 10 is moved on conveyor system 20A until such time as it pushes load 7, through loads 8 and 9, until the load 7 is detected by the filled sensor 52A. When load 11 is placed at the input position of conveyor system 20A, neither it nor any of the loads 3 through 10 on conveyor system 20A and 20B move since none of the sensors on these two systems is open at this time.

Figure 8:
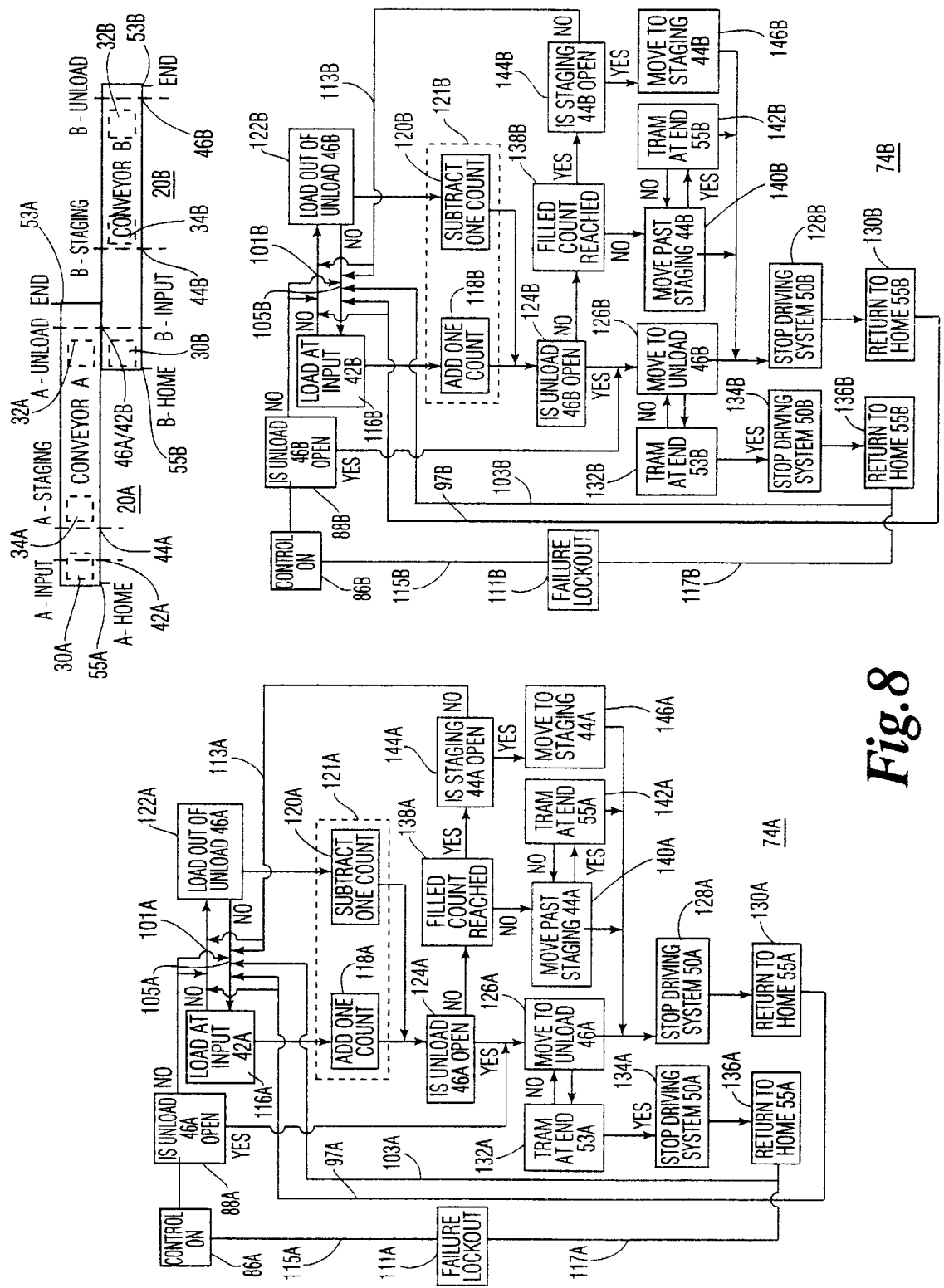
FIG. 8 is a block diagram of a count control system for a double conveyor system constructed in accordance with another embodiment of this invention.

FIG. 8 shows a block diagram of a count control system 74AB used to control the pair of conveyors 20A and 20B installed in series as shown in FIG. 5. As was explained with regard to FIG. 4, the count control systems shown in FIG. 8 do not require filled sensors 52A and 52B which were used with regard to the zone control system shown in FIG. 6. The control functions and counters of the count control systems are marked at the same numerals used for the identical functions and counter shown in FIG.4, except that those relating to count control system 74A for conveyor system 20A have the numeral "A" following each of them, while those relating to the count control system 74B for conveyor 74B have the better "B" following them. Each of these count control systems 74A and 74B operates in a manner identical to the count control system 74 shown in FIG. 4. However, as shown in FIG. 5, the input position of conveyor system 20B overlaps the unload position of conveyor 20A.

Figure 9:
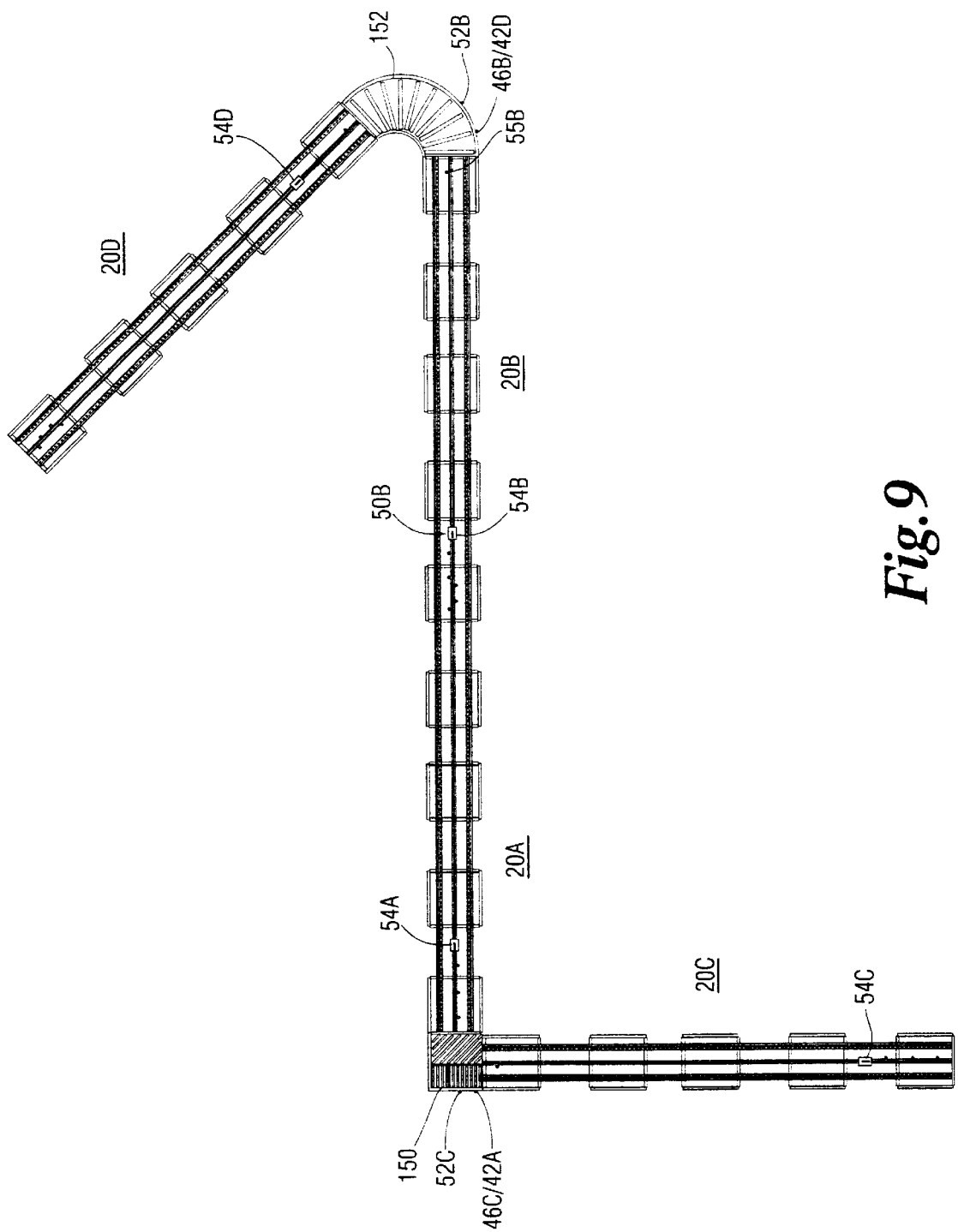
FIG. 9 shows a layout of a multiple conveyor system built in accordance with this invention.

The purpose of FIG. 9 is to show that a conveyor can be built using any number of conveyor systems incorporating the principles of this invention as may be desired. Additionally, the direction of flow of loads may be changed between adjacent conveyor systems incorporating principles of this invention, using techniques well known to those skilled in the art of designing conveyors. Thus, FIG. 9 includes a schematic diagram showing conveyors 20A and 20B of FIG. 5 connected directly in series with one another. Each of these conveyor systems may be of any length desirable for the application at hand, or additional conveyors can be connected directly in series with one another. Using the principles of this invention, the input position of conveyor 20B is the unload position of the immediately preceding conveyor 20A.

Conveyor system 20C is connected in series with conveyor system 20A, but it is installed at a right angle to it. Thus, loads must be delivered at the right angle from conveyor system 20C to conveyor system 20A by any of the various mechanisms known to those skilled in the art. In FIG. 9, the right angle delivery is accomplished by a powered roller conveyor 150. The powered roller conveyor may be a "C" square model of the Q50 line shaft line roller conveyor manufactured by Speedways Conveyors, Inc.

Conveyor system 20D is connected in series with conveyor system 20B, but at an angle to it which is shown to be a 45 degree angle. Another conveying mechanism 152 is used to enable loads to be conveyed at this angle from conveyor 20B to conveyor 20D. This mechanism can be a curved model of the Q50 line shaft drive roller conveyor manufactured by Speedways Conveyors, Inc. However, any mechanism known to those skilled in the art to convey loads at a forty-five degree angle could be used.

The conveyors 20A, 20B, 20C and 20D are substantially identically zone control conveyors using a driving system having self-contained trams. The various components of these conveyors are shown using the numerals which identify similar components on conveyor 20 in FIG. 1, with each numeral followed by the letter A, B, C, D, which is used to identify that specific conveyor. However, it can be seen that the unload sensor/input sensor 46C/42A for conveyors 20C and 20A are located on conveying mechanism 150, as is filled sensor 52C. This enables loads to be brought unto conveying mechanism 150 where they can be conveyed at a right angle unto conveyor A.

Similarly, conveyor mechanism 152 comprises part of the unload position of conveyor 20B and the input position of conveyor 20D. The unload sensor/input sensor 46B/42D of conveyors 20B and 20D are located at positions on conveying mechanism 152 to which loads can be pushed by tram 54B of conveyor 20B. At this position a conveying mechanism 152, such as a powered roller conveyor, can transfer the loads unto conveyor 20D.

Figure 10:
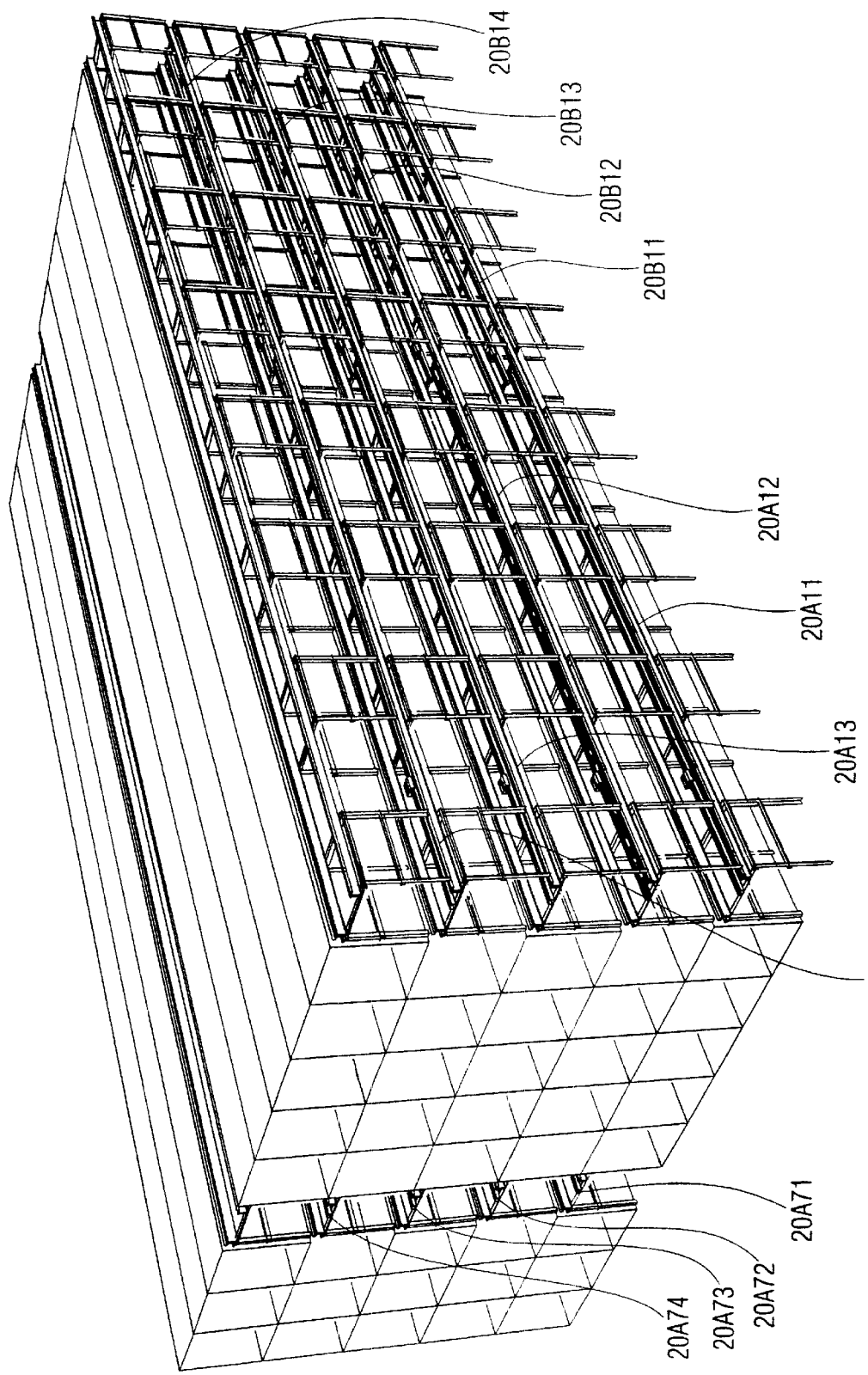
FIG. 10 is plan view, shown in perspective, of a multiple conveyor system showing a plurality of conveyors side-by-side horizontally and stacked vertically.

FIG. 10 shows the use of the conveyor system of this invention for the installation of many conveyors in an area such as a shipping facility or a warehouse or any installation where it is desirable to store a large number of loads on a number of different columns and rows of storage. As shown in FIG. 10 each conveyor system has two conveyors connected in series, although there is no limit to the number of conveyors which can be installed in series with one another in accordance with this invention. Any number of rows of conveyor systems can be placed next to one another due to the compact construction of the conveyor system using the self-contained tram. As shown, the conveyor systems of this invention can be installed above one another on storage racks to take advantage of storage space above the floor. The conveyors can be installed horizontally or substantially horizontally as described below, with no need to have a significant slope on the installed conveyors to move the loads. Thus, significant storage space is not lost in a warehouse or shipping facility where these conveyors are installed above one another.

FIG. 10 shows a series of columns of storage racks which are four levels high. As depicted in the first column of racks, each level of storage racks includes conveyor systems installed in series with one another in accordance with the principles of this invention. The first conveyor of the conveyor system in the first column of conveyors at the lowest or first level of the storage racks is marked 20A11, whereas the second conveyor system in series with it in the first row and at the first level is marked 20B11. Similarly, the first conveyor in the first row of the second level is marked 20A12, while the second conveyor at this row and level is marked 20B12. The conveyor systems on the third level of the first row are marked 20A13 and 20B13, whereas the conveyor systems on the fourth level of the first row are marked 20A14 and 20B14. The ends of the four levels of racks and their respective conveyors in the seventh row are also shown by way of demonstration. The ends of the first conveyors at the four levels of the seventh row are marked 20A71, 20A72, 20A73 and 20A74 respectively.

Each of these conveyor systems shown in the configuration of FIG. 10 can be constructed in accordance with the series conveyor systems shown in FIG. 5. Each system of two conveyors connected in series is self-contained and used in accordance with this invention to allow the conveyor systems to be compact. It is contemplated that many conveyor systems of this type will include their own dedicated trams. However, those skilled in the art will recognize that it is possible to enable conveyor systems built in accordance with this invention to share trams which would be moved from one conveyor system to another as the need arises to move loads within the various conveyor systems. In either event, loads can be moved independently in any conveyor system at any level of any column of storage racks.

Driving System

FIGS. 11–22 show one of many types of driving systems that can be used in a powered conveyor system designed and constructed in accordance with this invention. This driving system includes a power circuit shown in FIG. 11 for providing power to a single tram motor. It also includes a control system shown as a programmable controller ("PLC") set forth in FIGS. 12–22. This power circuit and control system are both shown by way of example only and are not intended to limit the scope of this invention.

Figure 11:
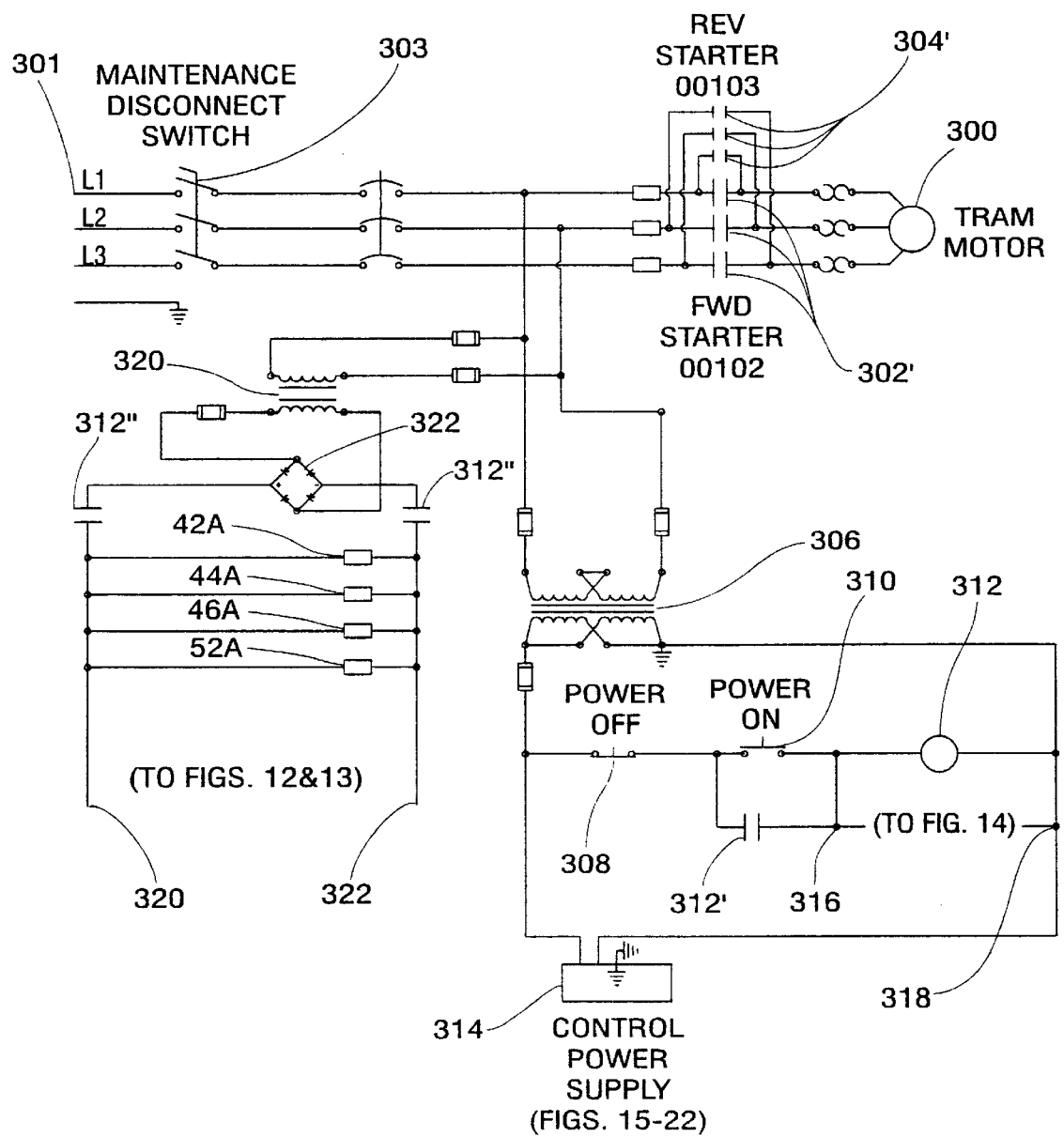
FIG. 11 is a wiring diagram of an electrical circuit used with a programmable logic controller ("PLC") shown in FIGS. 12–22 to control a tram motor for a tram drive shown in accordance with this invention.

FIG. 11 is a diagram of a preferred embodiment of a power circuit for tram motor 300 used for the conveyor system 20A shown in FIGS. 5 and 6. This power circuit applies three phase AC power from a power source 301 to the motor 300. This power is supplied by passing current through a maintenance disconnect switch, a circuit breaker and a set of fuses, whose operation is well known to those skilled in the art. Power is further supplied through forward starter switches 302 or reverse starter switches 304, as set forth below, and through overload protection which is also well known to those skilled in the art. One version of a self-contained tram in which the tram motor 300 can be used is shown below in FIGS. 23–26. The self-contained tram uses a single motor to move loads forward to the appropriate positions on the conveyor and to reverse the direction of the tram and return it to its home position to thereafter move one or more additional loads.

Thus, the control system 74A used to operate the tram motor 300 controls the operation of forward starter switches 302 to cause the motor to move in a forward direction or to stop moving. It also controls the reverse starter switches 304 to cause the motor to move in a reverse direction or to stop moving. In this preferred embodiment of the invention the tram stops moving when it reaches the home position or when there is a failure lockout.

Since the motor 300 is shown to be connected to three phase AC voltage, the direction of motor rotation is reversed when the starter switches 302 and 304 exchange the connections of two of the three phases of voltage on two of three windings of the tram motor 300. Alternatively, a DC motor could be used with a battery or any other convenient DC power source to provide the necessary current to deliver power to the motor. The direction of rotation of the DC motor would obviously be reversed by reversing the polarity of the voltage on the windings of the tram motor.

AC power is applied through a pair of fuses and transformer 306 and through a normally closed power off switch 308 and a normally open power-on switch 310 to a motor control relay (MCR) 312. The MCR 313 controls the switches 312' shown below. Power is also applied to a control power supply 314 which provides power for the controls shown in FIGS. 15 through 22. A switch represented as a set of normally open relay switches 312' is shown to be connected across the power-on switch 310. The switches 312' are connected to a terminal 316 while a terminal 318 is connected to the other side of the transformer 306. The voltage across the terminals 316 and 318 provide power to motor starters in output layouts shown in FIG. 14.

Power is also provided through a pair of fuses and a transformer 320 to a rectifier 322 where it is converted to DC power. The rectifier 322 is connected through a normally open switches 312" to terminals 320 and 322 which are connected to input layouts in FIGS. 12 and 13. For sake of illustration, input sensor 42A, staging sensor 44A, unload sensor 46A, and filled sensor 52A are shown connected across the terminals 320 and 322 in FIG. 11.

When the disconnect switch 303 is closed and power is supplied from power source 301, the normally open switch 302' and 304' do not permit power to be applied to the tram motor 300. When the power on switch 310 is actuated, the motor control relay 312 is energized, causing the switch 312' to close so as to bypass the power switch 310. Power is then applied across the contacts 316 and 318 to the output layouts in FIG. 14. Energizing the motor control relay 312 also closes the switch 312" causing DC voltage to be applied across the terminals 320 and 322 and the input layouts in FIGS. 12 and 13. Power will continue to be applied to the input and output layouts of FIGS. 12—14 until power off switch 308 is actuated, thereby de-energizing motor control relay 312 and opening the contacts 312' and 312".

Introduction to PLC

Figure 12:
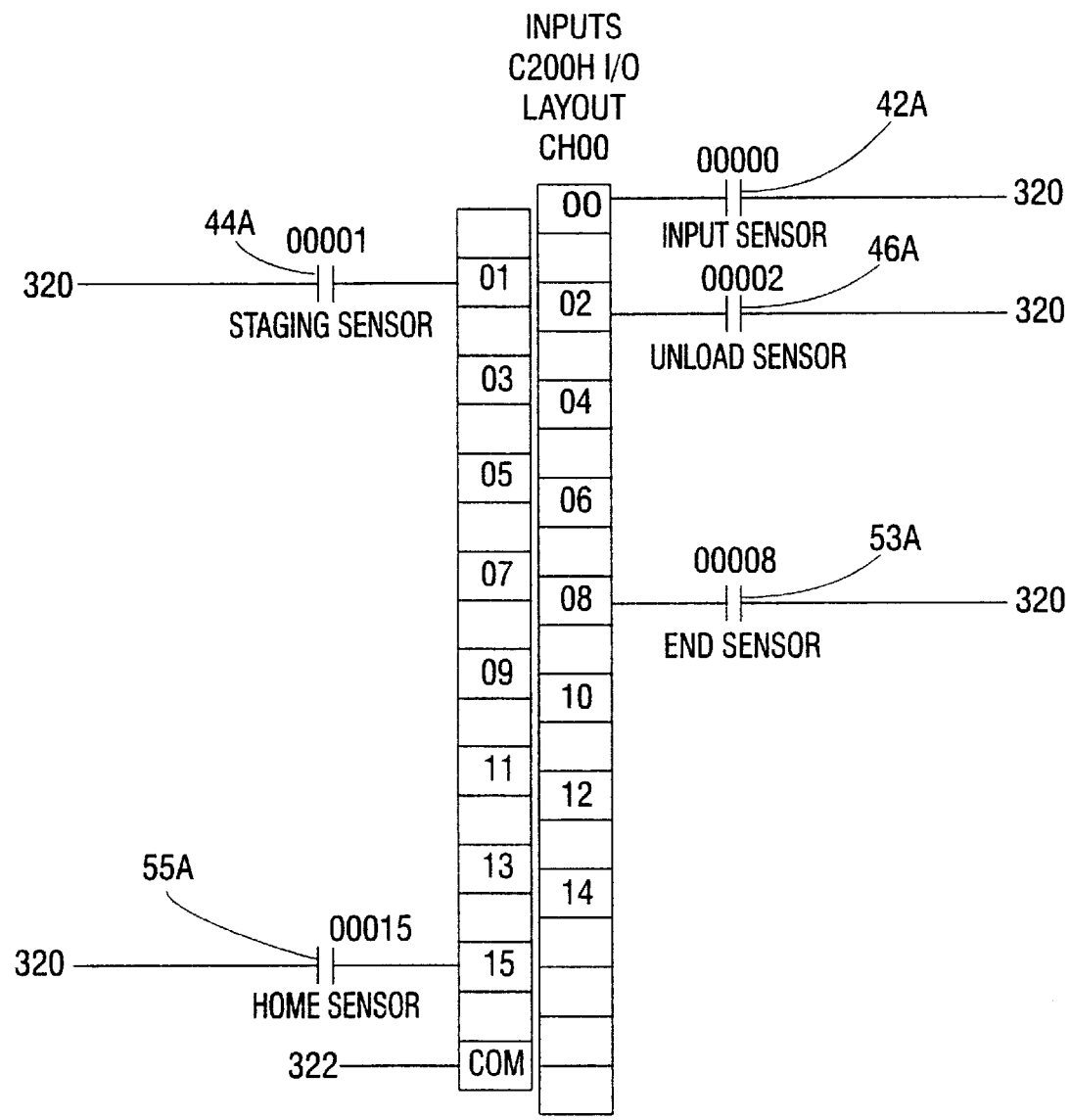
FIG. 12 shows an input channel of a PLC which controls the tram driving motor in the wiring diagram shown in FIG. 11.
Figure 13:
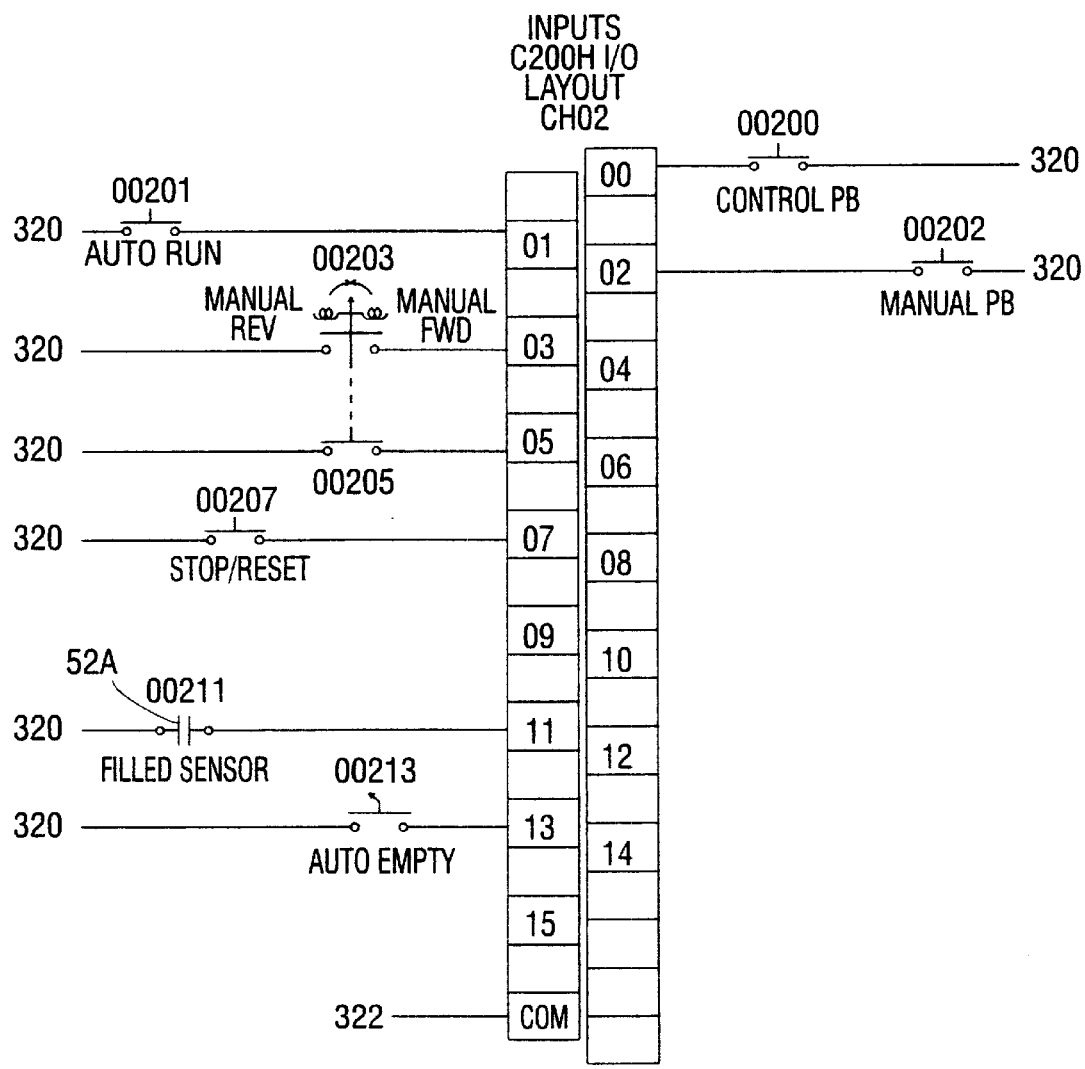
FIG. 13 shows an input channel of a PLC which controls the tram driving motor in the wiring diagram shown in FIG. 11.
Figure 14:
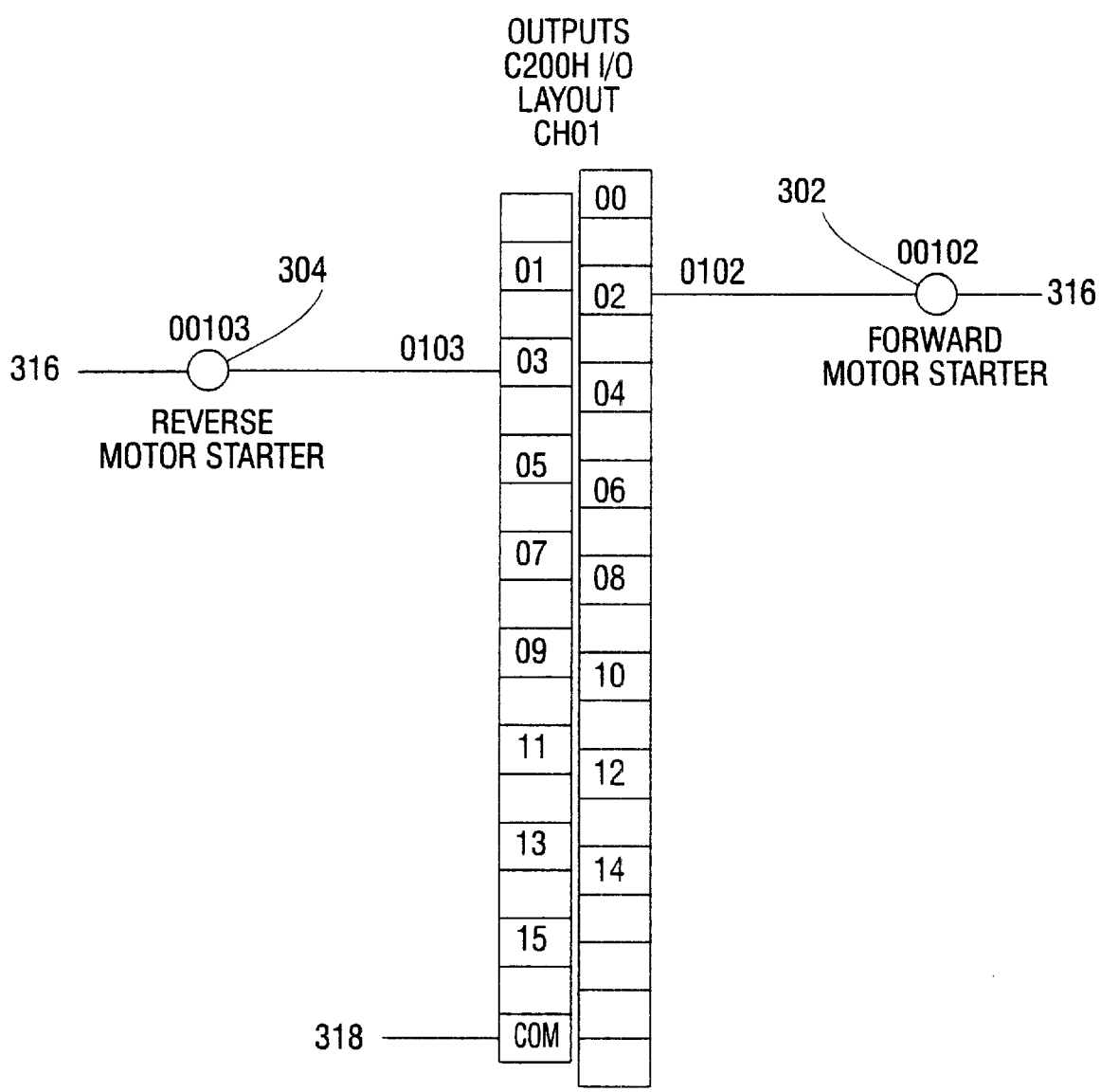
FIG. 14 shows an output channel of a PLC which controls the tram driving motor in the wiring diagram shown in FIG. 11.

The control used in the illustrated embodiment of this invention is the SYSMAC C200H Programmable Controller sold by Omron Electronics, Inc. This PLC is a solid state control device. It controls processes and systems by being programmable to accept input information which it processes according to previously programmed control functions so as to energize or de-energize certain output devices such as motor starters. FIGS. 12–14 show the structure of input/output ("I/O") channels on which input and output devices are mounted. These I/O channels are connected to the PLC to enable the programs written for the PLC to provide the various control functions according to the status of the loads placed on and taken off the conveyor.

The I/O channels shown in FIGS. 12–14 have individual input and output devices each mounted at one of 16 bits in each channel. Each bit, and thus the input or output device mounted at the bit, is identified with respect to the PLC by a five digit number. The first three digits indicate the layout channel on which a device is located. The last two digits of the numeral show the location of the input or output device on the particular 16-bit layout channel. The input devices used to control conveyor 20A are shown at various locations on input layout channels shown in FIGS. 12 and 13. The output devices which control the self-contained tram are shown mounted on the output layout channel shown in FIG. 14. If additional conveyors are to be controlled, additional input and output devices would be installed on FIGS. 12–14 to accommodate these conveyors.

By way of example, the input devices mounted in the layout channel CH00 shown in FIG. 12 have the numerals "000" as the first three numerals in their five digit PLC identifying number. Input sensor 42A has the numerals "00" as the last two identifying numerals in its PLC identifying number, signifying that it is in the "00" position in that layout channel. Unload sensor 46A is in position 02 which is indicated by the two numerals "02". Thus, the five digit number identifying the input sensor 42A is 00000, whereas the identifying number for unload sensor 46A is 00002. Referring to output layout channel CH02 shown in FIG. 13, filled sensor 52A is designated by the numerals "11". Its five digit identifying number is 00211. The other devices in the channels CH00, CH01 and CH02 are numbered accordingly.

Internal output components of the PLC include internal outputs which act as internal relays and internal timers. An internal relay ("IR") is depicted in FIGS. 15–22 by a pair of parentheses with a five numeral identifying number over it and a descriptive term beneath for the sake of clarity. Internal timers are depicted by a set of vertical dotted lines with the letters "TIM" between them. Beneath the letters a three numeral number identifies the timer, and beneath that number is another number designating how many tenths of a second the timer will count after it is energized before actuating the devices which it controls. For example, in FIG. 17B on logic rung 00005, the last component at the address 00008 is timer TIM058. It times for "0020" tenths of a second, or two seconds, before operating.

The name and the five digit identifying number for each component used in the PLC control, and the four digit identifying number for timers, are set forth in Table A. Also shown is the number of the figure in which each component is energized by the PLC.

TABLE A

Figure 15:
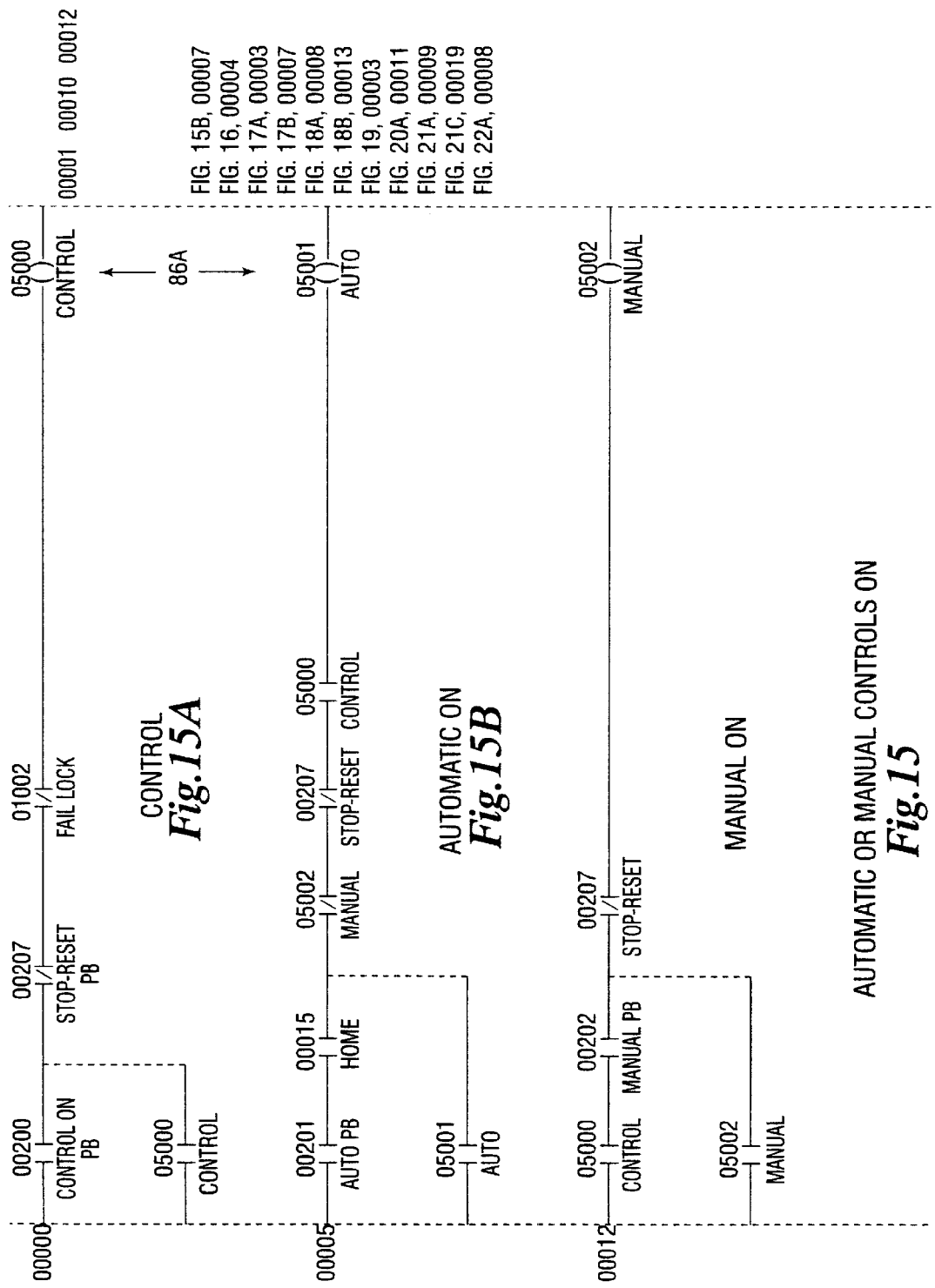
FIG. 15 is a ladder diagram of controls for the automatic operation and manual operation control functions.
Figures 18, 18A, 18B:
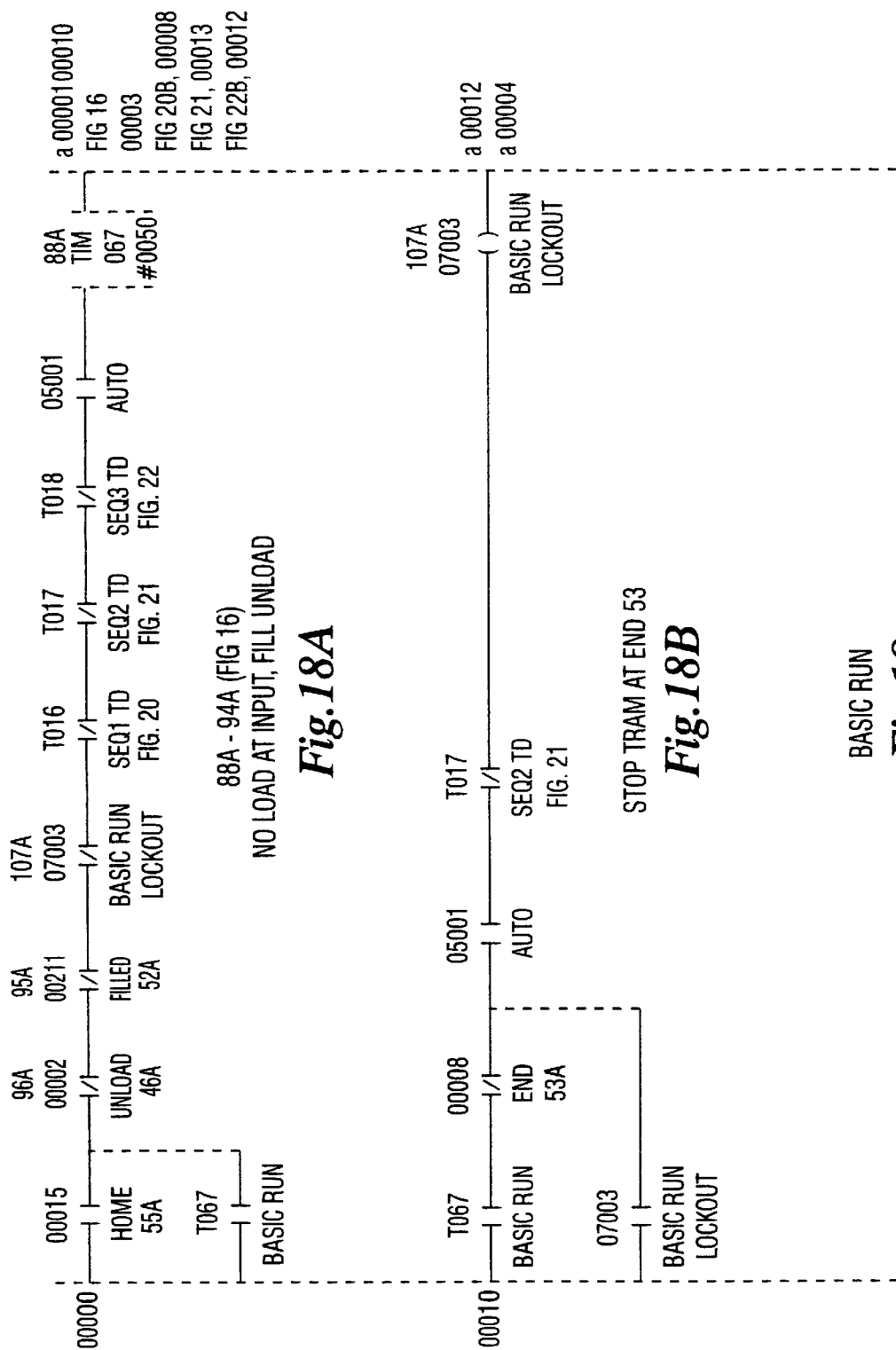
FIG. 18 is a ladder diagram of controls for a tram basic run which moves loads on the conveyor to the output position each time the output position is empty.
Figure 19:
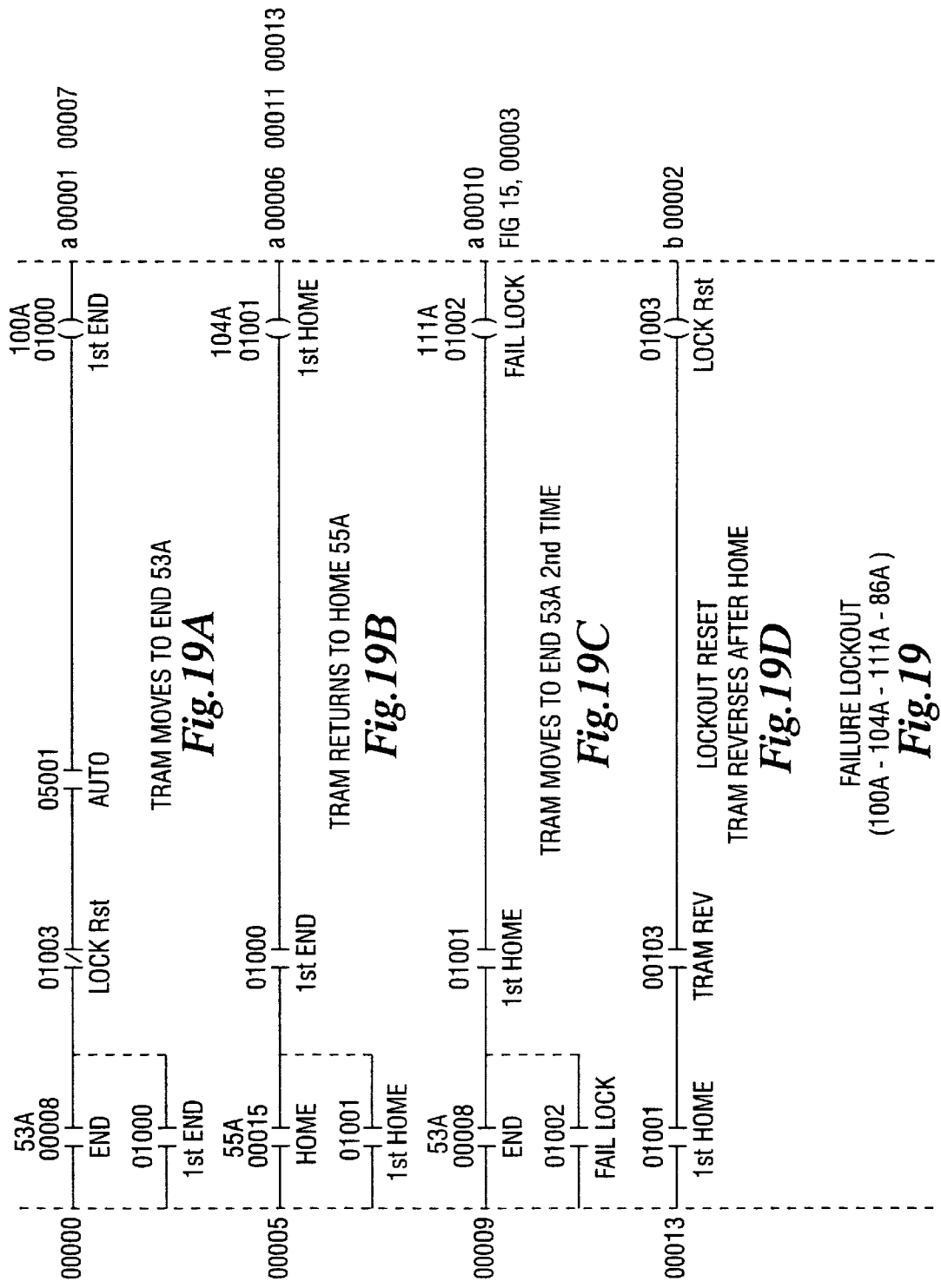
FIG. 19 is a ladder diagram of controls for a failure lockout which prevents the control system from operating if the tram reaches the end sensor twice in a row before moving a load.
Figure 20:
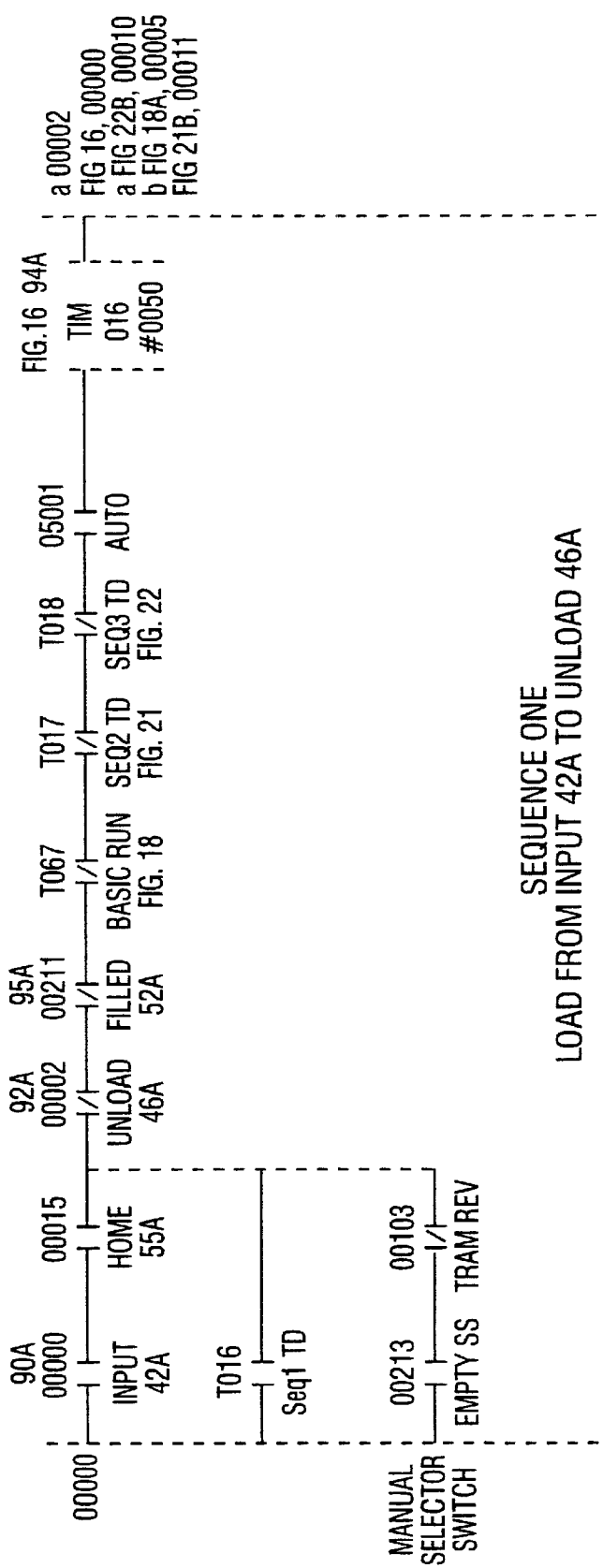
FIG. 20 is a ladder diagram of controls for moving a load from the input position until an empty unload position is filled.
Figure 21:
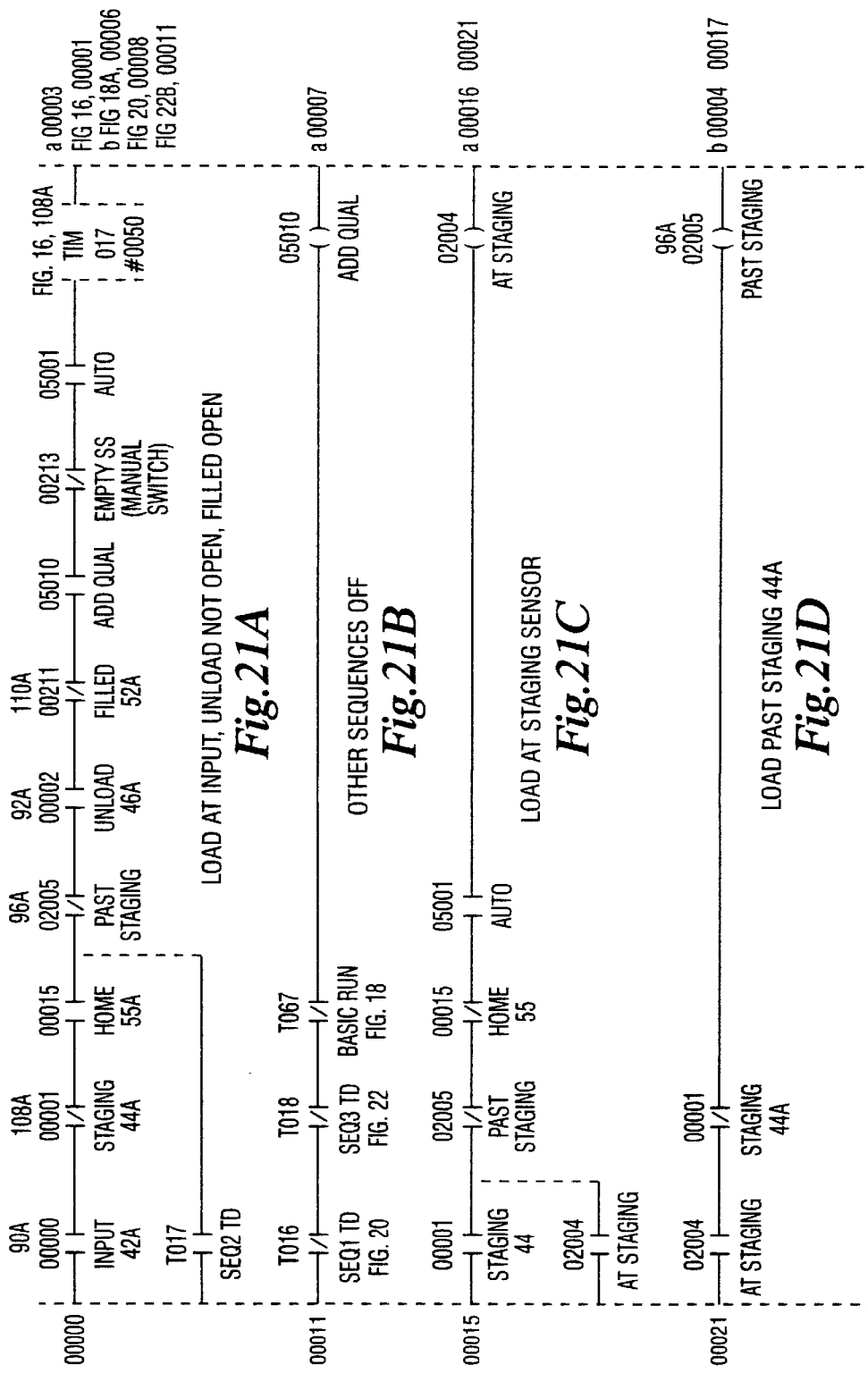
FIG. 21 is a ladder diagram of controls for moving a load beyond the staging position whenever the unload position is filled, until the conveyor is filled.
Figure 22:
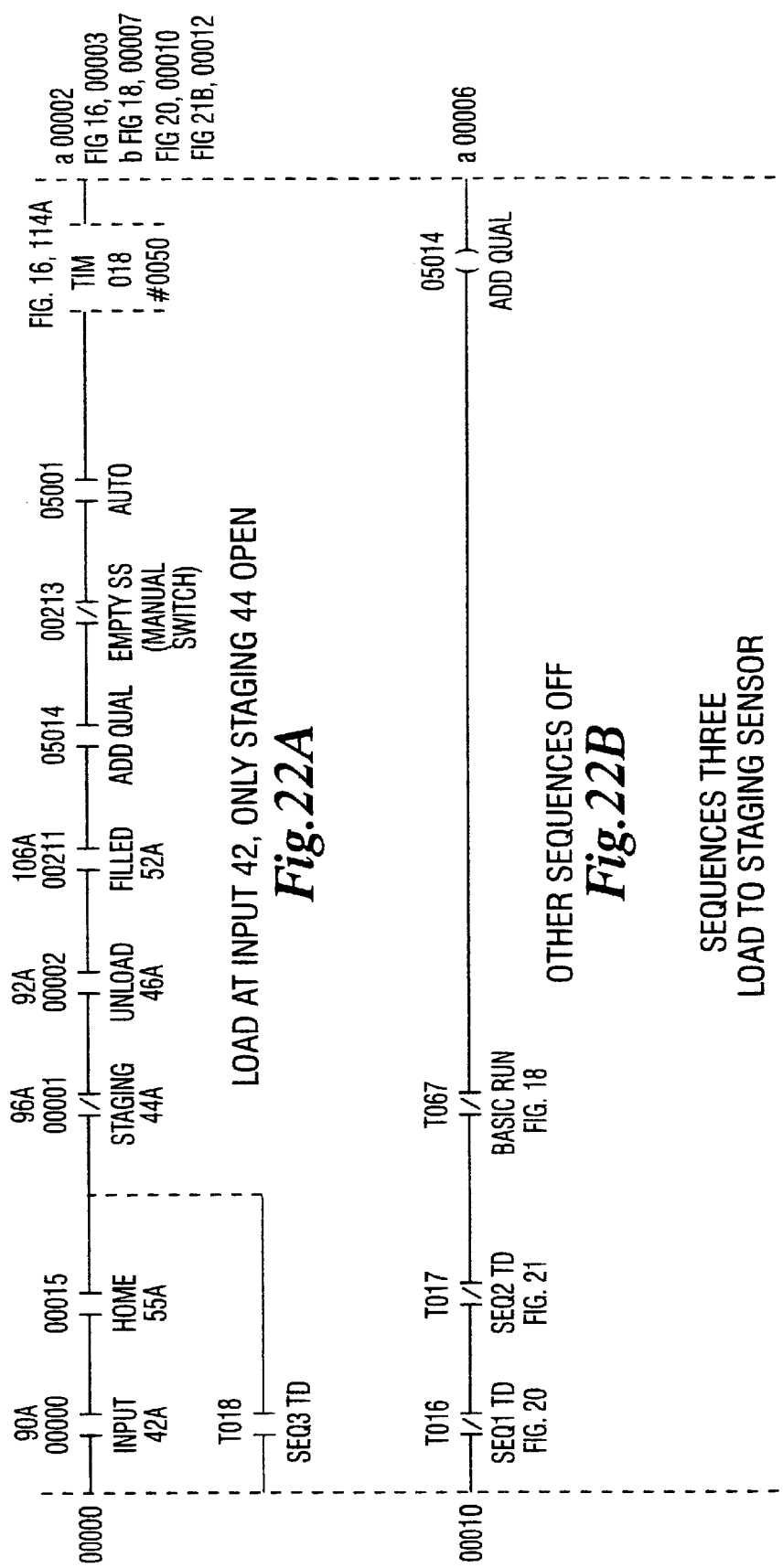
FIG. 22 is a ladder diagram of controls for moving a load from the input position to the open staging position when the conveyor is otherwise filled.

| | NUMERAL | COMPONENT | |
|---|---|---|---|
| Inputs | 00000 | Input Sensor 42 | FIG. 12 |
| | 00001 | Staging Sensor 44 | " |
| | 00002 | Unload Sensor 46 | " |
| | 00008 | End Position Sensor 53 | " |
| | 00015 | Home Position Sensor 55 | " |
| Outputs | 00102 | Tram Forward Starter | FIG. 14 |
| | 00103 | Tram Reverse Starter | " |
| | 00200 | Control On Push Button | FIG. 13 |
| | 00201 | Automatic Push Button | " |
| | 00202 | Manual Run Push Button | " |
| Inputs | 00203 | Reverse Manual Switch | " |
| | 00205 | Forward Manual Switch | " |
| | 00207 | Stop-Reset Push Button | " |
| | 00211 | Filled Sensor 52 | " |
| | 00213 | Empty Selector Switch | " |
| | 01000 | 1st End Recognition | FIG. 19 |
| | 01001 | 1st Home Recognition | " |
| | 01002 | Failure Lockout | " |
| | 01003 | Lockout Reset | " |
| Internal | 02004 | Staging Sensor Monitor | FIG. 21 |
| Relays | 02005 | Past Staging Sensor | " |
| | 05000 | Logic Operating Control | FIG. 15 |
| | 05001 | Automatic Operation | " |
| | 05002 | Manual Operation | " |
| | 05010 | Additional Qualifiers, Sequence 2 | FIG. 21 |
| | 05014 | Additional Qualifiers, Sequence 3 | FIG. 22 |
| | 07002 | Set-Up Reverse | FIG. 17 |
| | 07003 | Basic Run | FIG. 18 |
| | T016 | Tram Control Sequence 1 Time Delay | FIG. 20 |
| Internal | T017 | Tram Control Sequence 2 Time Delay | FIG. 21 |
| Timers | T018 | Tram Control Sequence 3 Time Delay | FIG. 22 |
| | T058 | Tram Control Reverse Time Delay | FIG. 17 |
| | T067 | Basic Run Time Delay | FIG. 18 |

The identifying number of each component is placed above that component whenever it is shown in FIGS. 15–22. A brief identification of the function of each component is written beneath it for the sake of clarity. The numbers of the control functions shown in FIG. 6A are placed beneath corresponding components or logic rungs in FIGS. 15–22.

Each component mounted on one of the I/O layout channels of FIGS. 12–14 has one or more inputs it controls in the horizontal logic rungs of the ladder diagrams shown in FIGS. 15–22. Each of these inputs is identified by the identifying numeral of the component by which it is controlled. Each of the various inputs is depicted as a pair of parallel lines, as if they were electromechanical relay contacts rather than programmable solid state components. The inputs can be either normally open ("NO") when they are unenergized, as shown by the pair of parallel lines, or normally closed ("NC") when unenergized, as shown by the pair of parallel lines with a diagonal line across them. The inputs themselves reverse their state represented in the program when their controlling device is activated. Thus a normally open ("NO") input becomes closed when its controlling device is activated, and a normally closed ("NC") component becomes open when its controlling device is activated.

In FIGS. 15–22 the various inputs are shown as being installed in horizontally extending logic rungs between a bus line on the left hand side of the figure and an output device, such as an internal relay or a timer or a direct output, on the right hand side of the figure adjacent the opposite bus line. All inputs must become "closed" between the bus line and the output device of a logic rung before the output device on the logic rung can be activated or energized and change the status of all the input devices it controls throughout the PLC.

In accordance with a convention established by the manufacturer of the PLC, each of the FIGS. 15–22 has the position of each of the inputs and output devices numbered consecutively with a five digit number, starting at the left hand end of the top logic rung of each figure with the number 00000. Inputs in parallel with one another are numbered consecutively. Where two or more inputs are in series with one another and are connected in parallel with one or more inputs in a logic rung, the dotted vertical line forming the parallel connection is numbered as well.

The number of the first input in each logic line of FIGS. 15–22 is placed in the left hand margin of each of the figures. The right hand margin next to each output device has a list of each location in the current figure, or in another figure of the PLC if designated, of inputs controlled by that output device.

Functions Performed by PLC

For the sake of continuity, refer to FIG. 6A which is a block diagram of the control system 74A that controls the movement of a tram 54A, shown schematically in FIG. 5, which has a self-contained motor traveling with it. FIG. 6A refers to the various FIGS. 15–22 of the PLC which perform the logic functions shown in FIG. 6A.

The basic control functions provided in the logic diagrams of each of FIGS. 15–22 are as follows:

Control On FIG. 15

The program shown in FIG. 15 includes a ladder diagram for determining whether the automatic controls of FIGS. 16–22 will be turned on in response to actuation of control on push button 00200 of FIG. 13, which has NO input in FIG. 15A, and automatic push button of 00201 of FIG. 13, having an NO input in FIG. 15B. Together, FIGS. 15A and 15B provide the control on function 86A shown in FIG. 6A. FIGS. 15A and 15C provide a manual operation alternative to control on function 86A.

Actuating the control on push button 00200 of FIG. 13 normally energizes control IR 05000 allowing the program shown in FIG. 15A to execute. The NO control input 05000, connected as an OR circuit in parallel with control on switch 00200, becomes closed when IR 05000 is energized. It bypasses the switch 00200 to latch on the logic rung program shown in FIG. 15A after the control on push button 00200 is no longer actuated.

The control program shown in FIG. 15A can be executed and remain executed as long as stop reset push button 00207 is not actuated, which would open the NC input 00207, and as long as the failure lock out IR 01002 of FIG. 19C is not activated, which would open NC failure lockout input 01002.

The program shown in FIG. 15B is ready to execute if the control program in FIG. 15A is active, thereby closing NO control input 05000. Additionally, the tram on the conveyor must be detected by the home sensor 55A of FIG. 6A, thereby closing NO home input 00015. Additionally, the manual operation program shown in FIG. 15C 15 cannot be operating so the manual IR 05002 is not energized; and the stop reset push button 00207 shown in FIG. 13 cannot be actuated. These conditions keep closed the NC manual input 05002 and the NC stop reset input 00207.

The automatic push button 00201 can now be actuated so the NO input 00201 is closed and the program of FIG. 15B is thereby executed, actuating automatic on IR 05001. The NO automatic on input 05001 is connected in an OR circuit about the NO automatic push button input 00201 and the home sensor input 00015, bypassing these inputs and locking on the automatic on program of FIG. 15B once it has executed. The right hand margin of FIG. 15B shows that each of the figures of the PLC representing the major primary control functions of the PLC, has an input controlled by the automatic on IR 05001.

Powered conveyor systems usually also require the ability to be operated manually. Once the program shown in FIG. 15A has been executed and control IR 05000 is activated, NO control input 05000 at position 00012 in FIG. 15C is closed. Manual push button 00202 of FIG. 13 can then be actuated to execute the program of FIG. 15C to provide manual operation of the powered conveyor system, as long as the stop reset button 00207 of FIG. 13 is not actuated to open NC input 00207. The manual on IR 05002 is activated with the execution of the program in FIG. 15C, causing NO input 05002, connected in an OR circuit about control input 05000 and manual push button input 00202, to latch on the program of FIG. 15C into a manual operating mode.

Actuating the stop reset button 00207 of FIG. 13 turns off both the automatic controls and the manual controls by opening NC inputs 00207 at position 00002 in FIG. 15A, at position 00009 in FIG. 15B and at position 00015 in FIG. 15C. Operation of the failure lockout program in FIG. 19C, which is the equivalent of control function 111A of FIG. 6A as explained below, also turns off the automatic controls by energizing IR 01002. This opens NC contact 01002 at position 00003 in FIG. 15A, de-energizing control IR 05000. A de-energized IR 05000 allows NO input 05000 at position 00010 in FIG. 15B to become open, de-energizing automatic IR 05001 so that the automatic controls are no longer turned on.

Figure 16:
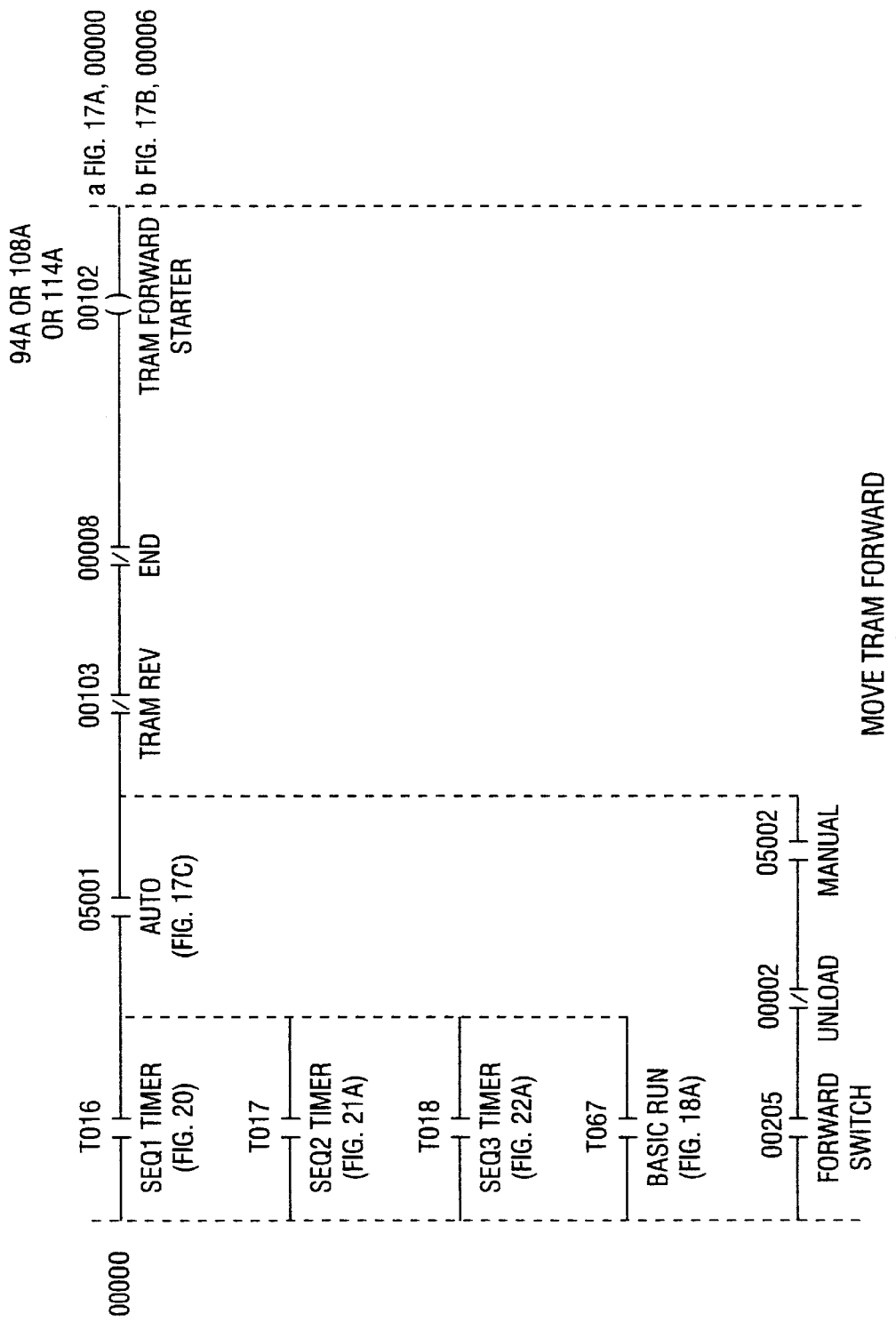
FIG. 16 is a ladder diagram of controls for the tram forward movement function.

Move Tram Forward FIG. 16

FIG. 16 shows a program for causing the tram to move forward in response to the logic of other programs of the PLC which automatically operate the tram, thereby performing the control functions 94A, 108A or 114A. Alternatively, the program causes the tram to move forward as a result of manual operation by a person who controls the conveyor. The number of each of the figures, FIG. 18A, FIG. 20, FIG. 21A, and FIG. 22A, which automatically controls one of the NO inputs in the OR circuit on the left hand side of FIG. 16, is written under that NO input. When a particular NO input in that OR circuit is closed by energization of the internal timer in one of these figures, the tram forward starter output 0102 is energized. Referring to FIG. 11, energization of the forward starter output 0102 within the PLC closes the NO switch 302' between the power source 301 and the motor 300, starting the operation of the motor in a forward direction. One of the logic functions 94A, 108A or 114A of FIG. 6A is thus actuated, moving the tram. This presupposes the Automatic On ladder rung of FIG. 15B is energized, closing NO input 05001 in FIG. 16, and the tram is not in reverse, nor is the tram at the end of the conveyor. Thus, NC inputs 00103 and 00008 in FIG. 16 are allowed to remain closed.

As shown in FIG. 16 and in FIG. 6A, it is also these NO inputs in the OR circuit of FIG. 16 which ultimately perform the control function 96. They stop the forward movement of the tram whenever the purpose of that movement, such as filling the unload position or the filled position of the conveyor, has been fulfilled.

The bottom logic rung of the OR circuit of FIG. 16 provides for forward manual movement of the tram on the conveyor. The unload sensor 46 energized as input 00002 in FIG. 12, must not detect a load at the unload position 32 of FIG. 6A, thereby allowing NC input 00002 to remain closed. Additionally, the manual operation IR 05002 of FIG. 15C must be energized, thereby closing NO input 05002 of FIG. 16. Once the forward manual switch 00205 of FIG. 13 is actuated, the tram forward starter 00102 is activated to move the tram forward. The tram forward starter 00102 remains actuated as long as tram is not in reverse and is not at the end position 53 thereby allowing the NC inputs 00103 and 00008 to remain closed. If the operator discontinues actuating the forward manual switch 00205, the forward manual input 00205 is open, de-energizing the tram forward starter IR 00102. The switch 302' in FIG. 11 is opened, disconnecting the tram motor from the power source 301. The tram is stopped.

Return/Reverse Tram FIG. 17

FIG. 17 shows a program for performing the control functions 98A or 104A of FIG. 6A by causing the tram to return to the home sensor 00015 energized in FIG. 12 and shown as home sensor 55A in FIG. 6A. This program automatically reverses the tram motor when the tram motor stops going forward due to the operation of the programs in one of FIGS. 18, 20, 21 or 22. FIG. 17C also includes a program for manually reversing the direction of movement of the tram.

The program shown in FIG. 17A sets up the automatic reversal of the direction of movement of the tram motor each time the tram is being automatically moved forward, away from the home sensor 55A of FIG. 6A. When tram forward starter IR 00102 of FIG. 16 is activated, moving the tram in a forward direction, NO tram forward input 00102 of FIG. 17A is closed. Since the tram is moving, it is away from the home sensor 55A of FIG. 6A. Thus NC home input 00015 remains closed. If the control system is in automatic operation, automatic IR 05001 is actuated, thereby closing NO automatic input 05001. Set reverse IR 07002 is activated, causing NO switch 07002, in the OR circuit with tram forward input 00102, to be locked on. Thus, the set reverse IR 07002 remains activated even if the tram is no longer moving forward, resulting in the return of the NO tram forward switch 00102 to return to the open position.

The set reverse IR 07002 also closes the NO set reverse input 07002 in FIG. 17B. Even though the PLC is in automatic operation, thereby closing NO automatic input 05001, the actuation of the tram forward starter 00102 in FIG. 16 opens the NC tram forward input 00102 of FIG. 17B to prevent the execution of the ladder rung program of FIG. 17B. However, once the tram forward IR 00102 is deactivated in FIG. 16, the NC tram forward switch 00102 of FIG. 17B returns to its NC position.

The program of FIG. 17B is then executed, actuating timer 058. This timer 058 runs for two seconds, ensuring that the tram has stopped its forward movement, before it closes the reverse time delay switch T058 in FIG. 17C to execute that program and actuate tram reverse output 00103, which is reverse motor starter 304' energized in FIG. 14. This closes reverse motor starter switch 304', also as switch 00103 in FIG. 11.

Taken together, FIGS. 17A, 17B and 17C perform as control functions 98A and 104A of FIG. 6A.

FIG. 17C also enables an operator to manually cause the tram to move in the reverse direction. The reverse manual switch 00203, energized in FIG. 13, must be actuated at a time when the tram is not detected by the home sensor 55A, so that NC home input 00015 remains closed. It must also be actuated at a time when manual IR 05002 of FIG. 15C is actuated, closing manual input 05002 in FIG. 17C. The reverse movement of the tram is discontinued whenever (1) the reverse manual switch 00203 is no longer actuated, allowing NO input 00203 to assume its NO status, or (2) when the tram reaches home sensor 55A, causing NC home input 00015 to become open, or (3) if the manual operation IR 05002 of FIG. 15C is no longer actuated, allowing NO manual input 05002 to resume its NO state.

Basic Run FIG. 18

FIG. 18 shows a program which can produce the basic run function of control function 88A of FIG. 6A so as to move a load on the conveyor to the unload position. The load is moved by actuating function 94A (FIG. 16) whenever the unload position is empty. That is, this program causes the tram to fill the unload position of the conveyor whenever this position is emptied in spite of the fact that there is no load at the input position of the conveyor. Briefly, FIG. 18A energizes the timer TIM 067 which performs its timing function for five seconds if the tram is at the home position 55A of the conveyor and if the unload sensor 46 and the filled sensor 52A are open. The timer TIM 067 is energized as long as none of the other operating sequences of the conveyor are turned on. After five seconds the timer TIM 067 moves the tram forward by activating an input T067 that controls the OR circuit in FIG. 16.

In more detail, in FIG. 18A, the NO home input 00015 is closed when the tram is at the home sensor 55A. If the unload and filled positions of the conveyor are not filled, the NC unload input 00002 and NC filled input 00211 remain closed. The NC basic run lockout input 07003, actuated by FIG. 18B, must also remain inactivated. Additionally, the other three forward movement function sequences shown in FIGS. 20, 21 and 22 must remain inactivated so that the inputs from their timers T016, T017 and T018, respectively, remain in their NC conditions. Assuming the control is in Automatic On condition so that NO input 05001 is closed, the timer TIM 067 is actuated. After timing for five seconds to ensure that all the conditions which energize this logic rung are continuous, timer TIM 067 actuates the inputs which it controls as shown to the right of it.

Input T067, forming the OR circuit with home input 0015, locks on the basic run function even though the tram leaves the home position. This occurs when the tram forward starter 00102 of FIG. 16 is actuated by TIM 067 closing the NO input T067 in the OR circuit FIG. 16, thereby moving the tram away from the home sensor of the conveyor. Normally, the basic run function of FIG. 18A is stopped when a load reaches the unload position, activating unload sensor 46 and fulfilling function 96A. Alternatively, activating the filled sensor 52A opens the NC input 00211, fulfilling the purpose of control function 95A.

The basic run lockout function 107A is performed by FIG. 18B. Once the basic run function of FIG. 18A causes the tram of the conveyor to move forward, if the movement of the tram is stopped by the end sensor 53A, FIG. 18B will not allow the basic run function to operate until after a load is moved following the placement of a previous load at the unload position.

The basic run lockout of FIG. 18B is actuated if the conveyor is in the Automatic On condition, closing NO input 05001, and the tram is not at the end position so that the NC input 00008 remains closed, and the basic run timer of FIG. 18A has timed out, closing NO input T067. Additionally, the timer TIM 017 of FIG. 21A must be and remain inactivated so that NC input TO17 remains closed. This turns on the basic run lockout IR, opening NC input 07003 of FIG. 18A. This prevents the basic run sequence from operating once again. NO input 07003 of FIG. 18B is connected in an OR circuit about NO input T067 and NC input 00008. Thus, these inputs are bypassed when the basic run lockout IR 07003 is actuated. Either the Automatic On control must be turned off, or the tram must be moved forward for the operation of FIG. 21A to activate timer TIM 017 to open NC input T017 in FIG. 18B. As indicated above, this prevents the basic run function 88A from operating once it has caused the tram to reach the end of the conveyor, until another load is moved after a load has been placed at the unload position of the conveyor.

Failure Lockout FIG. 19

FIG. 19 shows a program which performs the failure lockout function 111A of FIG. 6A. It does so by turning off the control on function 86A of FIG. 6A, found in the program shown in FIG. 15, by determining if the tram reaches the end sensor 53A a first time (control function 100A of FIG. 6A), and in FIG. 19B determines the tram returns to the home sensor 55A (control function 104A of FIG. 6A) and determines through FIGS. 19C and 19D that the tram was not reversed after reaching home sensor 55A before it reached the end sensor 53A.

In more detail, in FIG. 19A, the NO end input 00008 is closed when the tram is at the end sensor 53A. The NC lockout reset input 01003 is closed as long as the ladder rung FIG. 19D is not actuated, and NO automatic operation input 05001 is closed when the PLC is in automatic operation. Thus, FIG. 19A is actuated when a first tram is detected by the end sensor 53A, thereby actuating 1ST end recognition IR 01000. This causes NO 1ST end input 01000 in FIG. 19A to close, thereby locking on the program in FIG. 19A when the tram is moved away from end sensor 53A and NO input 00008 opens.

Referring to FIG. 19B, actuation of IR 01000 closes NO 1ST end input 01000. Thus, when the tram reaches home input 55A after it has been detected by the end sensor 53A, NO home input 00015 is closed, actuating 1ST home recognition IR 01001. This causes NO 1ST home recognition input 01001 in the OR circuit of FIG. 19B to close, thereby locking on FIG. 19B after the tram is no longer detected by the home sensor 55A of FIG. 6A.

Additionally, 1ST home recognition IR 01001 closes NO home recognition inputs 01001 in both FIGS. 19C and 19D. FIG. 19C also includes a NO end sensor input 00008 which is in series with the now-closed 1ST home recognition input 01001. Thus, FIG. 19C is actuated, thereby actuating failure lockout function 111A of FIG. 6A, if the tram reaches the end sensor 53A after FIGS. 19A and 19B have been actuated.

However, referring to FIG. 19D, if the tram is reversed after it returned to the home sensor and actuated FIG. 19B, and before it reaches end sensor 53A, the failure lockout circuit is reset and is not actuated. Since NO 1ST home recognition input 01001 is closed with the activation of FIG. 19B, the NO tram reverse input 00103, activated by the energization of the program in FIG. 17C, energizes the lockout reset program when the tram moves in reverse, thereby closing the NO input 00103. This energizes lockout reset IR 01003 and causes the lockout reset input 01003 in FIG. 19A to open. As a result, 1ST end recognition IR 01000 is de-energized. Thus, NO 1ST end recognition input 01000 in FIG. 19B is opened, de-energizing 1ST home recognition IR 01001 of FIG. 19B which causes NO 1ST home recognition input 01001 of FIG. 19C to open. As a result, the failure lockout IR 01002 will not be energized and will not turn off the PLC control on circuits in FIG. 15 the next time the tram reaches the end sensor 53A. This program will execute the failure lockout anytime the tram reaches the end sensor in two successive forward moves.

Move Load From Input to Unload FIG. 20

FIG. 20 shows a program for the first of three sequential functions which move a load from the input position 42A of FIG. 6A to another position on the conveyor 20A. The other two programs are shown in FIGS. 21 and 22. The ladder logic program in FIG. 20 performs control function 90A by recognizing a load at the input sensor 42A and performs function 92A by recognizing when the unload sensor 46A is open. FIG. 20 also activates FIG. 16 when the unload sensor 46A is open to cause FIG. 16 to perform function 94A of moving the load from the input sensor 42A to the unload sensor 46A.

Referring in more detail to FIG. 20, this program can operate as long as none of the other three control function sequences which move loads forward on the conveyor are operating. Thus, the NC basic run input T067 from FIG. 18, sequence two time delay input T017 from FIG. 21 and sequence three time delay input T018 from FIG. 22 must remain closed. Additionally, the PLC must be an automatic operation, causing the NO automatic operation input 05001 to be closed.

Referring to the left hand side of the program in FIG. 20, the NO input sensor input 00000 performs control function 90A by closing whenever a load is detected in the input position by load sensor 42A of FIG. 6A. The tram 54A must also be at home sensor 55A at this time, closing home sensor input 00015. Referring again to FIG. 20, the NC unload input 00002 remains closed as long as there is no load detected at the unload sensor 46A of FIG. 6A. FIG. 20 is thus activated, energizing tram control sequence one time delay TIM 016. This timer counts for five seconds to ensure that the various sensors in FIG. 20 have detected existing load and tram conditions of the conveyor 20A are true. After the five second period the program of FIG. 20 actuates control function 94A by closing NO tram control sequence one input T016 in the OR circuit of FIG. 16 to activate tram forward starter 00102 to act as control function 94A of FIG. 6A.

The load is now moved from the input position 30A toward the unload position 32A until the unload position 32A is filled, as determined by NC unload input 00002. This input performs the control function 96A by stopping the operation of the driving system for the conveyor 20A. Throughout the course of the operation of FIG. 20, NC input 00211 determines whether the filled sensor 52A is open. If it is not, that is if NC filled sensor 00211 detects a load, the NC input 00211 opens to inactivate the program of FIG. 20. Thus, NC filled input 00211 acts as control function 95A of FIG. 6A.

After timer TIM 016 of FIG. 20 completes its five second timing interval, it not only activates the forward movement by causing FIG. 16 to be energized, but it also closes NO input T016 in the OR circuit on the left side of FIG. 20. Closing the NO input T016 allows FIG. 20 to remain activated when the driving system moves the tram away from the home sensor 55A and moves the load away from the input sensor 42A of FIG. 6A. NO input TO16 remains closed until TIM 016 is no longer energized, that is when a load is detected at unload sensor 46A. This opens sequence one timer input T016 in FIG. 16, de-energizing tram forward start IR 00102, acting as control function 94A of FIG. 6A, thereby stopping the tram. As explained above, stopping the tram activates FIGS. 17B and 17C which reverses the tram and moves it to the home position 55A in FIG. 6A.

The bottom portion of the OR circuit of FIG. 20 also includes an input 00213 which responds to a manually operated selector switch which is normally used to manually move loads on the conveyor so as to enter the conveyor. The NC tram reverse input 00103 will open if the tram is operating in a reverse direction under the control of the programs of FIG. 17, thereby preventing the manual selector switch 00213 from operating the conveyor system 20 while the tram is moving in a reverse direction.

Move Load to Staging Position Past Staging Sensor of FIG. 21

FIG. 21 shows ladder logic programs for the second sequence of control functions which continue to fill the conveyor 20A after the unload position has been filled as determined by unload sensor 46A. FIG. 21A performs the function 90A of determining if there is a load at the input position and function 92A of determining there is a load at the unload position, as well as function 106A of determining the conveyor is not filled. Assuming each of these three determinations is answered in the affirmative, FIG. 21A causes the timer TIM 017 to time for five seconds and then move the tram and the load, performing function 108A by actuating FIG. 16 to move the load from input sensor 42A past staging sensor 44A to position 34A. See FIG. 6A.

Referring in more detail to FIG. 21, FIG. 21B merely determines when any of the other programs which move the tram forward, shown in FIGS. 18, 20 and 22, are operating and prevents FIG. 21A from operating when any of the others are. Thus, the NC sequence one timer delay input TO16 from FIG. 20, NC sequence three time delay input T018 from FIG. 22, and basic run time delay input T067 from FIG. 18 remain closed when these programs are not operating and thus are not moving the tram forward. As a result, IR 05010 is actuated, closing NO input 05010 in FIG. 21A. Additionally, the PLC must be in automatic operation, causing the NO automatic operation input 05001 to be closed.

Referring to the lefthand side of the program in FIG. 21A, the NO input sensor input 00000 performs control function 90A (FIG. 6A) by closing whenever a load is detected in the input position by load sensor 42A of FIG. 6A. The NC staging input 00001 remains closed in FIG. 21A as long as there is no load detected at the staging sensor 44A of FIG. 6A. The tram must also be at the home position 55A at this time, closing the NO home sensor input 00015. The NC past staging input 02005 remains closed because the load past staging program of FIG. 21D remains unenergized until a load moves past the staging sensor 44A of FIG. 6A.

FIG. 21A is thus activated, energizing tram control sequence two time delay TIM 017. This timer counts for five seconds to ensure that the various sensors whose outputs are used in FIG. 21A have detected true existing load and tram conditions of the conveyor 20A. After the five second period the program of FIG. 21A actuates control function 108A of FIG. 16 by closing NO tram control sequence two input TO17 in the OR circuit of FIG. 16. Note that the activation of sequence two time delay TIM 017 also closes input T017 in an OR circuit of FIG. 21A. When closed, the OR circuit enables TIM 017 to remain actuated after a tram moves a load away from the input position 42A, causing NO input position input 00000 and NO home input 00015 to become open, and when NC staging input 00001 becomes open as a load reaches the staging sensor 24A.

The program shown in FIG. 21C is actuated when the load reaches the staging sensor 44 at a time when the PLC is in automatic operation. The load at the staging sensor closes NO input 00001, while automatic operation of the PLC closes NO input 05001. As indicated above with respect to FIG. 21A, NC past staging input 02005 remains closed because load past staging IR 02005 of FIG. 21D remains unenergized until a load moves past staging sensor 44A in FIG. 6A. Since the tram is moving the load when staging sensor 44A is first actuated, the NC home input 00015 is closed. The at staging IR 02004 is then actuated in FIG. 21C, thereby closing NO at staging input 02004 in FIG. 21D. Additionally, the NO at staging input 02004 in the OR circuit of FIG. 21C is closed, bypassing the staging input 00001 so that the at staging IR remains actuated after the load is no longer detected by the staging sensor 44A and thus the NO input 00001 is opened.

The detection of the load at the staging sensor 44A first opens NC staging input 00001 in FIG. 21D. The activation of the at staging IR 02004 when the load is detected by the staging sensor 44A, as explained above, closes the NO at staging contact 02004 in FIG. 21D. However, the past staging IR 02005 is not actuated until the staging sensor 44A no longer detects a load, thereby closing NC staging input 00001. When this occurs, the program of FIG. 21D causes the tram to stop moving the load so that the load stops shortly after clearing the staging sensor 44A. The load is stopped at this point because activation of the past staging IR 02005 opens NC past staging contact 02005 shown immediately after the OR circuit in FIG. 21A. The program of FIG. 21A is thus opened, inactivating timer TIM 017. This causes NO sequence two timer input T017 in FIG. 16 to become open, inactivating the tram forward starter IR 00102, acting as control function 108A in FIG. 6A, which stops the tram from moving forward. As indicated above, turning off the tram forward starter IR 00102 activates FIGS. 17B and 17C which reverses the tram and moves it toward the home position 55A.

Actuating the past staging IR 02005 also opens the NC past staging input 02005 located after the OR circuit in FIG. 21C. This opens FIG. 21C, inactivating the at staging IR 02004, which in turn causes NO at staging input 02004 to open, thereby inactivating the past staging IR 02005. The inactive past staging IR 02005 closes the NC past staging inputs 02005 in both FIG. 21A and FIG. 21C, placing these programs in a condition to be activated once again.

Move Load to Staging Sensor FIG. 22

FIG. 22 shows a program for the third of the three sequential functions which move the load from the input position 42A on conveyor 20A of FIG. 6A to another position on the conveyor 20A, i.e. to the staging sensor 44A. The ladder logic program of FIG. 22 performs the control function 90A of FIG. 6A by recognizing a load at the input sensor 42A and performs the function 92A by recognizing when the unload sensor 46A detects that a load is present. It also performs function 106A by determining that the filled sensor 52A is not open.

FIG. 22B performs the same function for FIG. 22A that FIG. 21B performed for FIG. 21A. It allows FIG. 22A to operate only when the other programs which could make the tram move forward are not operating. Thus, the NC sequence one input TO16 from FIG. 20, the NC sequence two input TO17 from FIG. 21 and the NC basic run input T067 from FIG. 18 must remain closed so that add qual IRO 5014 is actuated, thereby closing NO input 05014 of FIG. 22A. Additionally the PLC must be in automatic operation, causing the NO automatic operation input 05001 to be closed.

Referring the lefthand side of FIG. 22A, the NO input sensor input 00000 performs the control function 90A (FIG. 6A) by closing whenever a load is detected in the input position by load sensor 42A of FIG. 6A. The tram must also be at the home position 55A at this time, closing the NO home sensor input 00015. The NC staging input 00001 remains closed in FIG. 22A as long as there is no load detected at the staging sensor 44A of FIG. 6A. In addition, the NC manual switch input 00213 must remain closed, indicating that the conveyor 20A is not being operated by the manual switch.

Under these conditions, the program of FIG. 21A is activated, energizing tram control sequence three time delay TIM 018. This timer counts for five seconds to ensure that the various sensors whose outputs are used in FIG. 22A have detected true existing load in tram conditions of the conveyor 20A of FIG. 16. After the five second period the program of FIG. 22A actuates control function 114A of FIG. 16 by closing sequence three timer input TO18. The activation of sequence three time delay TIM 018 also closes input T018 in an OR circuit shown at the left side of FIG. 22A. When closed, this OR circuit enables TIM 018 to remain actuated after a tram moves a load away from the input position 42A, causing NO input position input 00000 and NO home input 00015 to become open.

The program of FIG. 22A becomes inactivated when a load reaches staging position 44A, thereby inactivating sequence three timer TIM 018 which opens sequence three timer input T018 of FIG. 16. This inactivates tram forward starter 00102 and inactivates control function 114A at the right side of FIG. 6A. As a result of turning off the tram forward starter IR 00102, the programs of FIGS. 17B and 17C are activated to reverse the tram and move it toward the home position 55A.

Tram Systems

Figure 23:
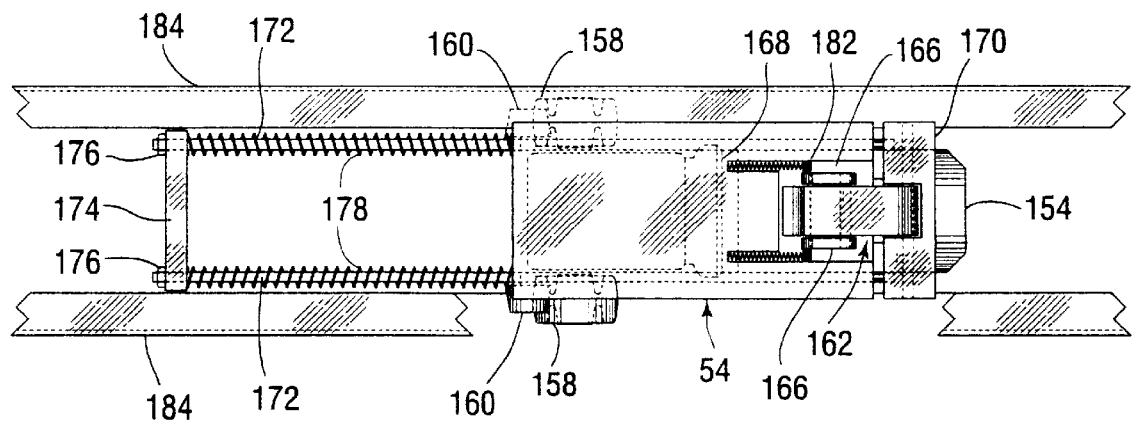
FIG. 23 is a top view, partially cut away, of a self-contained tram which can be used to move loads on the conveyor system of this invention.
Figure 24:
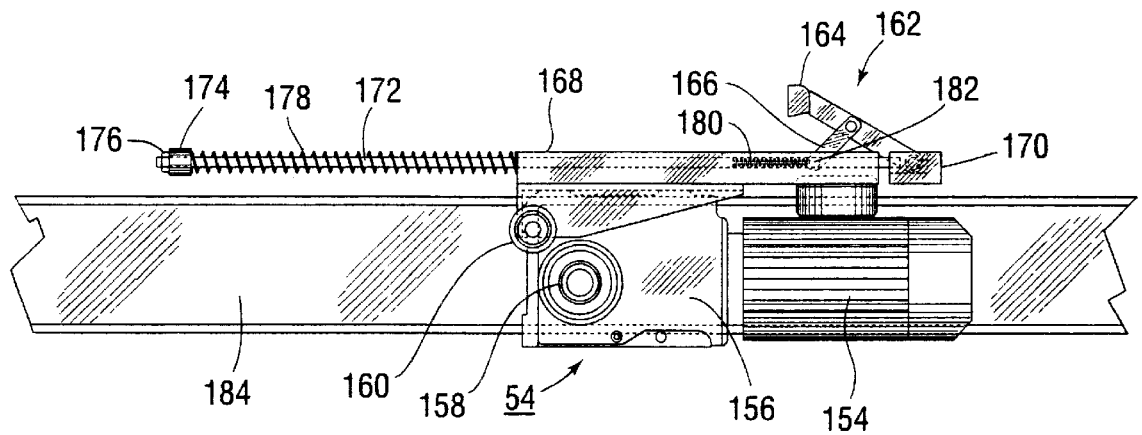
FIG. 24 is a side view, partially cut away, of the self-contained tram drive shown in FIG. 5.

FIGS. 23 to 26 show one embodiment of a self-contained tram which can be used to move loads on conveyor systems built in accordance with this invention. Referring to FIGS. 23 and 24, tram 54 comprises a motor 154 connected to a gear box 156 which has a pair of drive wheels 158 that contact the lower portion of channels 184 in which the tram 54 operates and a pair of idle wheels 160 which contact the upper portion of the channels 184. The tram includes a load engaging device which can push pallets or other loads along the length of the conveyor system and then deflect to a lower position so as not to engage loads while moving in the reverse connection. It is also desirable to have the load engaging device released from the load it is attempting to push if the load is greater than some maximum which is to be pushed by the tram.

Referring to FIGS. 23 and 24, the load engaging device 162 includes a toggle mechanism comprising load engaging member 164 and sliding members 166. The load engaging device 162 is mounted between a stationary member 168 attached to the top of gear box 156 and a movable member 170. Each side of the stationary member 168 has a hole drilled through it to accommodate a guide pin 172 which passes through the stationary member 168 and is fastened to the movable member 170 so as to support it.

The other end of each guide pin 172 is attached to an end bar 174 which is fastened to the guide pins by nuts mounted on screw threads cut onto the ends of the guide pins 172. Each guide pin passes through the inside of a retractor spring 178 which is mounted between one end of the stationary member 168 and the end bar 174.

The load engaging device 162 includes a set of springs 180, each of which is mounted in a spring retaining pocket within the stationary member 168. A cross member 182 is attached between the sliding members 166 and contacts one end of the springs 180, enabling the springs 180 to push the cross member 182 toward the movable member 170 and raise the load engaging member 164 of the load engaging device 182.

Figure 25:
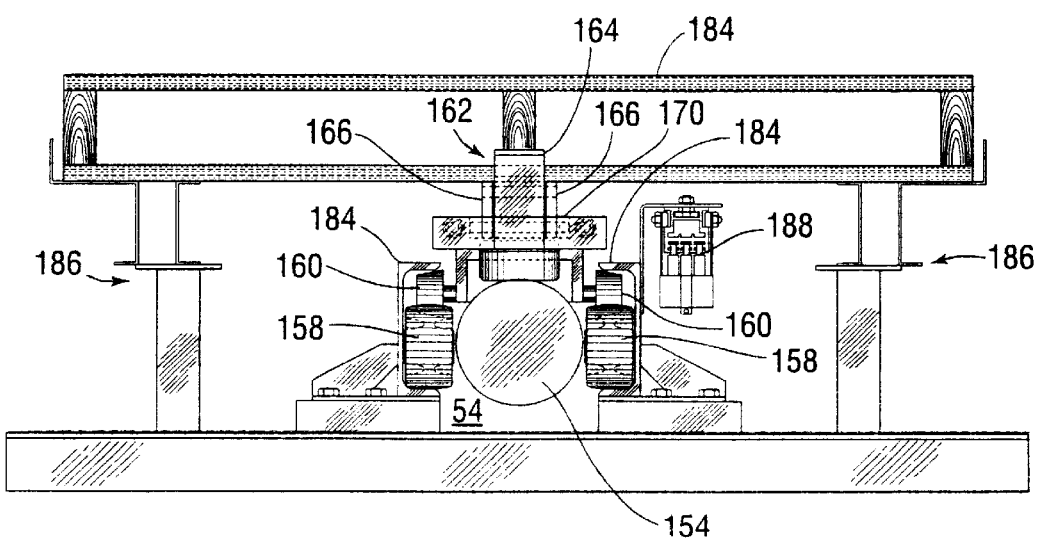
FIG. 25 is a rear view of the self-contained tram shown in FIG. 5 which is depicted in relation to the channel in which it is mounted and the rails of the conveyor with respect to which it is used.
Figure 26:
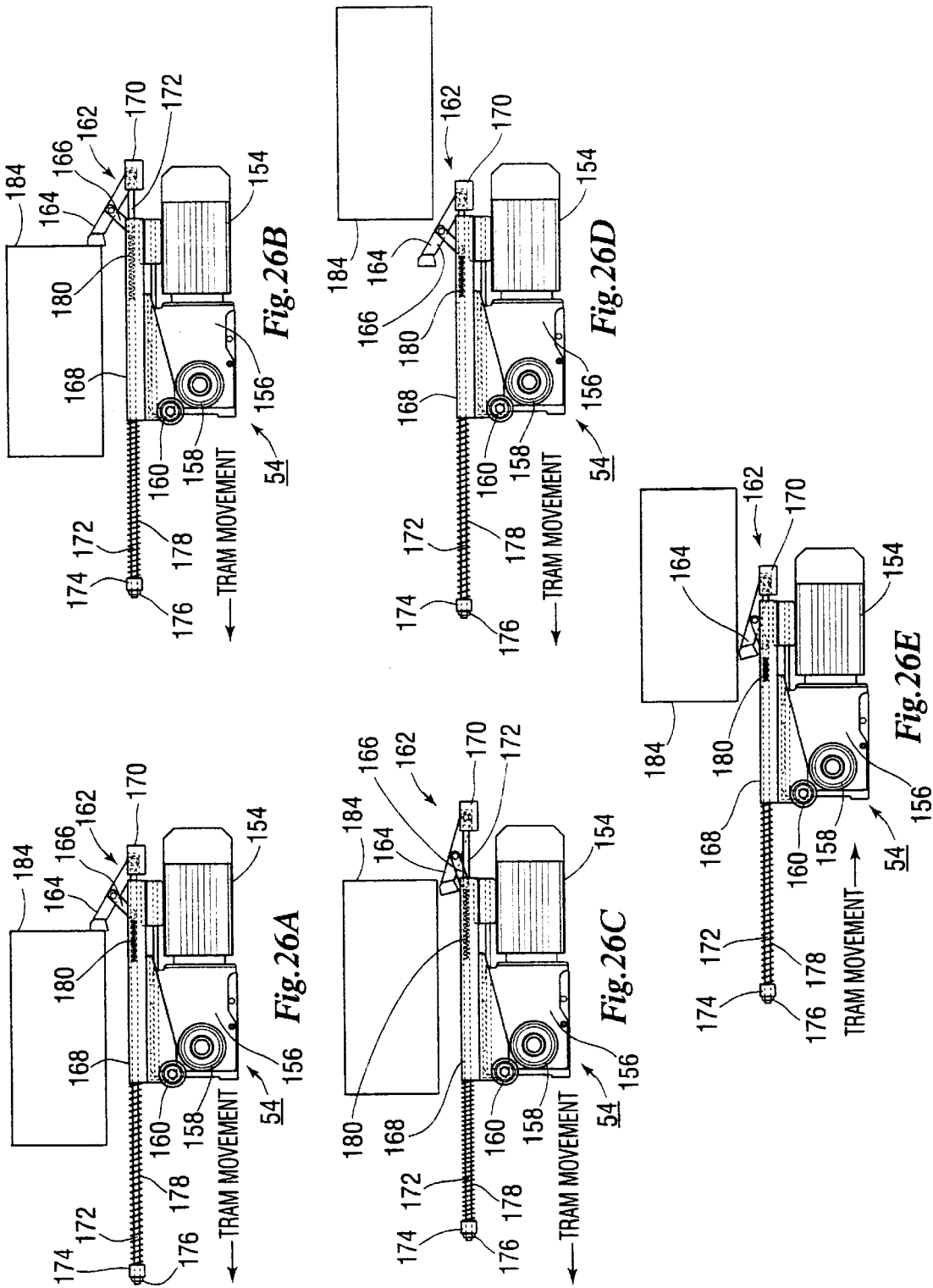
FIGS. 26A–E depict the actuation of the tram dog of the self-contained tram drive of FIG. 23 during various phases of the operation of the conveyor system.
Figure 34:
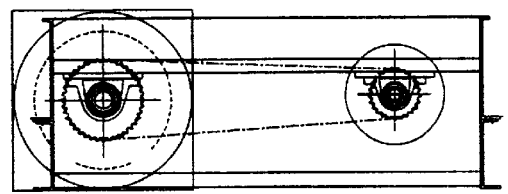
FIG. 34 is an orthographic right side view of the tram driving mechanism shown in FIG. 31.
Figure 31:
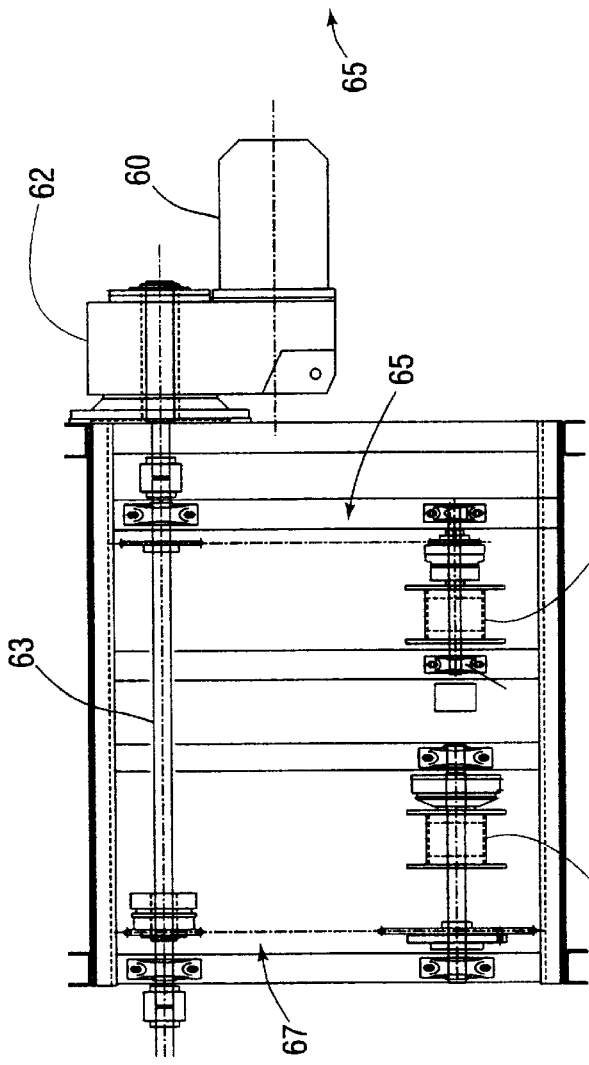
FIG. 31 is a top view of a tram driving mechanism which can be used for the tram drive shown in FIG. 30.
Figure 32:
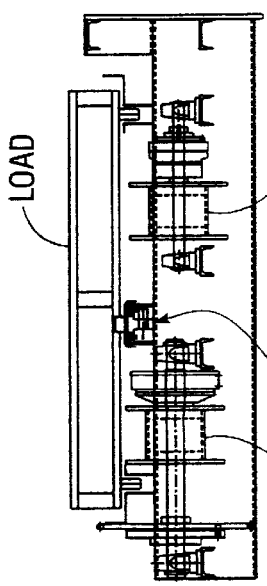
FIG. 32 is an orthographic front view of the tram driving mechanism shown in FIG. 31.
Figure 33:
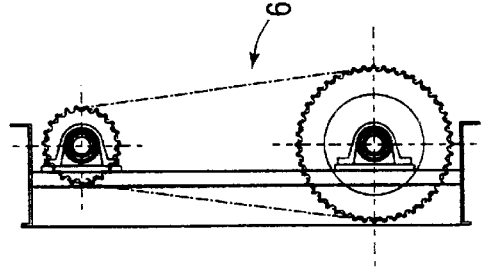
FIG. 33 is an orthographic left side view of the tram driving mechanism shown in FIG. 31.

FIG. 25 is a rear view of the self-contained tram shown in FIGS. 23 and 24. FIG. 25 shows the load engaging member 164 of the load engaging device 162 contacting a load shown as a pallet 184 which is supported on both sides by side rail assemblies 186. A power connector 188 is shown attached to one of the channels 184 used to mount the tram 54. Power can be supplied to the motor either through a commutator connected between the motor 154 and the power connector 188 or by way of batteries, not shown, which would be added to the tram.

FIGS. 26A–26E should be referred to with regard to the operation of the tram 54. The load 184 is shown schematically as a block in these figures. Starting with FIG. 26A, the load engaging device 164 contacts the right end of the load 184. The resistance to movement provided by the inertia of the load 184 is coupled through load engaging member 164 to the movable member 170 of the load engaging device 162. The movable member 160, which is attached to one end of each of the two guide pins 172, is restrained from moving to the right as shown in FIG. 26A by the force of reactor springs 178 on the end bar 174. As long as the spring force of the reactor springs 178 is greater than the force produced by the inertia of the load 184, the load engaging member 164 remains in contact with the right side of the load 184 and moves the load 184 to the left along a conveyor as the tram 54 moves within its mounting channels.

Referring now to FIG. 26B, if the force produced by the load 184 begins to exceed the spring force of the springs 178, the movable member 170 of the loading engaging device 162 moves to the right. This movement results from a compression of the springs 178 between the stationary member 168 and the end bar 174.

As the movable member 170 moves to its right, the sliding members 166 of the toggle mechanism within load engaging device 162 pulls the load engaging member 164 down toward the stationary member 168. Referring to FIG. 26C, when the load 184 is so great that it overcomes the spring force of the springs 178, the movable member 170 moves farther to the right and the sliding member 166 pulls the load engaging member 164 beneath the bottom surface of the load 184. The tram 54 can then move beneath the load 184 which is too large for the tram 54 to push. As seen in FIG. 26D, after the tram 54 passes beyond the load the load engaging member 164 no longer contacts the bottom surface of the load 184. The spring force of the retractor springs 178 acting on the rods 172 then moves the movable member 170 to the left. This causes the load engaging member 164 to return to its normal operating position.

As discussed above, a tram used on a conveyor according to this invention moves in one direction to push loads to required positions and moves in the opposite direction to return to another position from which it will operate once again.

Referring to FIG. 26E, as the tram 54 reverses and travels beneath a load, the backside of load engaging member 164 contacts the load. The force of the load is in a direction which causes the load engaging member 164 to pivot within its mounting on movable member 170 and force sliding members 166 against each of the springs 180 mounted within the stationary member 168. This allows the load engaging member 164 to move beneath the load 184 and contact its bottom surface until such time as the top of the load engaging member 164 clears the load 184 and resumes its normal position.

FIGS. 27–29 depict a tram of the type which can be used with a cable propulsion system such as the propulsion system 58 shown in FIG. 1. The propulsion system 58 is shown schematically in FIG. 30. It includes the pair of cable drums 66 and 68, each of which has one end of a cable 69 which rolls and unrolls about it as the tram 54 moves first in a forward direction and then in a return direction along the conveyor. The cable is wound about sprockets 70 and 72 which support it at the ends of the travel of the tram 54.

Referring now to FIGS. 27–29, the tram 54 includes a tram body 200 which is mounted on wheels 202 which support it within a track or channel within which it is mounted. The tram 54 also includes side wheels 204 which engage the two sides of the track or channel.

The tram 54 further includes a load engaging device 206 which is pivotally mounted about a pin 208 within a portion of the tram body 200. A spring 210 which is also mounted about the pin 208 engages the load engaging device 206, pushing it in a clockwise direction which forces it against shear pin 212. If the force against the load engaging member 164 becomes too great while it is pushing a load along a conveyor, the shear pin 212 fails, allowing the load engaging device 206 to rotate clockwise away from the load so that the tram 54 can pass beneath the load. Additionally, as the tram 54 is returned after moving a load, the back end of the load engaging device 206 can contact any loads within its path and can then move in a counter clockwise direction so that it can pass beneath the loads.

FIGS. 31–34 are included to show the basic structure of the components of the propulsion system 58. Drive motor 60 is shown connected to drive gearbox 62. A shaft 63 couples the power from the gearbox 62 and through to sprocket mechanisms 65 and 67 which enable sets of chains to deliver power to the drums 68 and 66, respectively.

Figure 35:
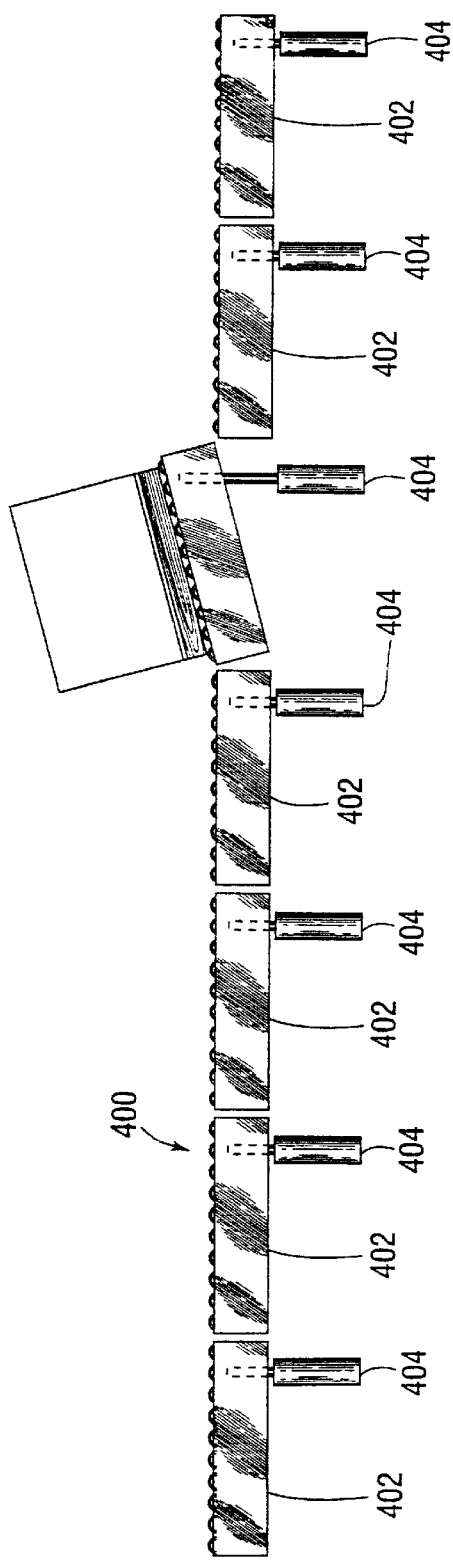
FIG. 35 shows a conveyor system which can be operated according to this invention using another type of drive mechanism.
Figure 36:
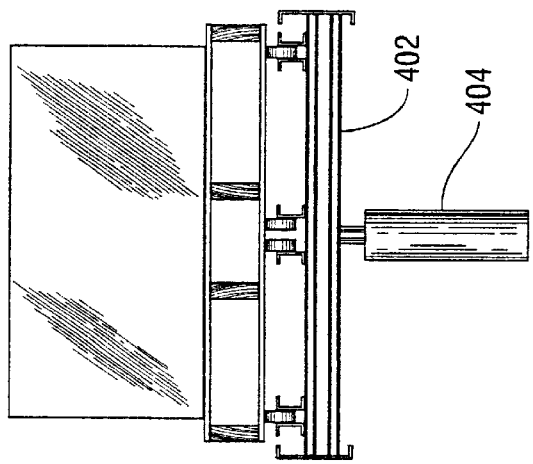
FIG. 36 is a rear view of the conveyor system shown in FIG. 35.

Loads can be propelled along a conveyor made in accordance with this invention through the use of any convenient mechanism and without using a tram. By way of example, FIGS. 35 and 36 show a propulsion system of a conveyor 400 which consists of a series of conveyor sections 402 which can be pivoted in a counter clockwise direction by lifting mechanisms 404. Each of the conveyor sections can be pivoted sequentially to move a load along the conveyor to a desired location in accordance with the principles of this invention.

Those skilled in the art will recognize that the various features of this invention described above can be used themselves or in combination to produce a conveyor system. Additionally, this invention has been explained with respect to the details, arrangements of components and control steps of specific embodiments which have been described and illustrated to explain the nature of this invention. Many modifications and changes can be made to this invention by those skilled in the art without departing from its spirit and scope. Thus, the appended claims are intended to be interpreted to cover such equivalent conveyor systems as do not depart from the spirit and scope of this invention.

What is claimed is:

1. A conveyor system that can store loads while moving the loads between an input position and an unload position, comprising, in combination:

(a) a load support structure including load supporters which enable loads to be moved, said load support structure having an input position at which loads can be placed onto said conveyor system and an unload position at which loads are stopped and from which loads can be removed from said conveyor system, said load support structure also having a load staging position located between the input position and the unload position;

(b) an input sensor which senses a load at the input position, an unload sensor which senses a load at the unload position, a staging sensor which senses a load at the staging position, and a filled sensor which determines when a pre-selected portion of said load support structure has been filled with loads;

(c) a propulsion system which is operated only when said sensors indicate that at least one load should be moved to another position on said load support system and is inactivated after the movement of the at least one load has stopped.

(d) a control system responsive to said sensors to cause said propulsion system to move a load which is on said load support structure to the unload position of said load support structure whenever the unload position is empty and to cause said propulsion system to move a load located at the input position to the staging position of said load support structure whenever the unload position is full, until such time as said filled sensor determines the pre-selected portion of said conveyor support structure has been filled.

2. A conveyor system according to claim 1 in which said filled sensor includes a sensor which can determine when at least a portion of a load has moved past the unload position so that when the unload position is full, said control system causes said propulsion system to move successive loads from the input position to the staging position of said load support structure until such time as at least a portion of a load is detected past the unload position.

3. A conveyor system according to claim 2 in which said control system prevents said propulsion system from moving a load from the staging position after a portion of a load is detected past the unload position until a load is removed from the unload position.

4. A conveyor system according to claim 1 in which said filled sensor includes a counter and sensors coupled to said counter which change the count of said coupler in one direction when a load is placed on the input position of said load support structure and change the count in a second direction when a load is removed from the unload position of said load support structure.

5. A conveyor system according to claim 4 in which said filled sensor determines the pre-selected portion of said load support structure has been filled with loads when said counter reaches a pre-determined count in the first direction, and said propulsion system does not move a load to the staging position until a load is removed from the unload position and the count in the first direction is reduced below the pre-determined count.

6. A conveyor system according to claim 1 in which said control system causes said propulsion system to stack additional loads contiguous one another, starting at the staging position, while said unload sensor senses a load in the unload position, and when said unload sensor senses a load is removed from the unload position, said controller causes said propulsion system to move the stacked loads toward the unload position until a load is sensed by said unload sensor.

7. The conveyor system according to claim 1 in which said propulsion system comprises a driver which reciprocates on said load support structure and can only move loads in one direction on said load support structure during normal operation, from the input position toward the unload position.

8. A conveyor system that can store loads while moving the loads between an input position and an unload position, comprising, in combination:
 (a) a load support structure including load supporters which enable loads to be moved, said load support structure having an input position at which loads can be placed onto said conveyor system and an unload position at which loads are stopped and from which loads can be removed from said conveyor system, said load support structure also having a load storage area located between the input position and the unload position;
 (b) a plurality of sensors which include an input sensor which senses a load at the input position, an unload sensor which senses a load at the unload position, and a filled sensor which determines when a pre-selected portion of said load support structure has been filled with loads;
 (c) a propulsion system which is operated only when said sensors indicate that at least one load should be moved to another position on said load support system and is inactivated after the movement of the at least one load has stopped.
 (d) a control system responsive to said sensors to cause said propulsion system to move a load which is in said load support structure to the unload position of said load support structure whenever the unload position is empty and to cause said propulsion system to move a load located at the input position to the load storage area of said load support structure whenever the unload position is full, until such time as said filled sensor determines the pre-selected portion of said conveyor support structure has been filled.

9. A conveyor system according to claim 8 in which said filled sensor includes a sensor which can determine when at least a portion of a load has moved past the unload position so that when the unload position is full, said control system causes said propulsion system to move successive loads from the input position to the storage area of said load support structure until such time as at least a portion of a load is detected past the unload position.

10. A conveyor system according to claim 8 in which said control system prevents said propulsion system from moving a load from the storage area after a portion of a load is detected past the unload position until a load is removed from the unload position.

11. A conveyor system according to claim 8 in which said filled sensor includes a counter and sensors coupled to said counter which change the count of said coupler in one direction when a load is placed on the input position of said load support structure and change the count in a second direction when a load is removed from the unload position of said load support structure.

12. A conveyor system according to claim 11 in which said filled sensor determines the pre-selected portion of said load support structure has been filled with loads when said counter reaches a pre-determined count in the first direction, and said propulsion system does not move a load to the storage area until a load is removed from the unload position and the count in the first direction is reduced below the pre-determined count.

13. A conveyor system according to claim 8 in which said control system causes said propulsion system to store additional loads contiguous one another in the storage area, while said unload sensor senses a load in the unload position, and when said unload sensor senses a load is removed from the unload position, said controller causes said propulsion system to move the stored loads toward the unload position until a load is sensed by said unload sensor.

14. The conveyor system according to claim 8 in which said propulsion system can only move loads in one direction on said load support structure during normal operation, from the input position toward the unload position.

* * * * *